United States Patent
Kawamura

(10) Patent No.: US 9,823,488 B2
(45) Date of Patent: Nov. 21, 2017

(54) ZOOM LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 204 days.

(21) Appl. No.: 14/813,414

(22) Filed: Jul. 30, 2015

(65) Prior Publication Data
US 2016/0062095 A1 Mar. 3, 2016

(30) Foreign Application Priority Data

Aug. 28, 2014 (JP) .................. 2014-174110

(51) Int. Cl.
*G02B 15/14* (2006.01)
*G02B 27/64* (2006.01)
*G02B 15/173* (2006.01)

(52) U.S. Cl.
CPC ......... *G02B 27/646* (2013.01); *G02B 15/173* (2013.01)

(58) Field of Classification Search
CPC .... G02B 27/646; G02B 15/173; G02B 15/14; G02B 9/34; H04N 5/23287; H04N 5/2328; G03B 2205/0015; G03B 2205/0046
USPC ....... 359/684, 686, 687, 462, 557, 554, 774; 396/55
See application file for complete search history.

(56) References Cited

U.S. PATENT DOCUMENTS

| 5,579,171 A * | 11/1996 | Suzuki | G02B 27/646 |
| | | | 359/554 |
| 8,659,832 B2 | 2/2014 | Takemoto | |
| 2011/0122507 A1* | 5/2011 | Seo | G02B 15/173 |
| | | | 359/687 |

(Continued)

FOREIGN PATENT DOCUMENTS

| JP | 2011-099964 | 5/2011 |
| JP | 2011-158599 | 8/2011 |
| JP | 2012-27217 | 2/2012 |

(Continued)

OTHER PUBLICATIONS

German Search Report dated Jul. 25, 2016; Application File No. 10 2015 113 655.4.
Japanese Official Action—2014-174110—dated May 23, 2017.

*Primary Examiner* — Bumsuk Won
*Assistant Examiner* — Collin X Beatty
(74) *Attorney, Agent, or Firm* — Young & Thompson

(57) ABSTRACT

A four-group or five-group zoom lens consists of, in order from the object side, a positive first group being fixed during magnification change, a negative second group being moved during magnification change, one or two middle groups including a positive mp lens group being moved during magnification change, and a positive rearmost group being fixed during magnification change. Zooming is effected by changing all distances between the adjacent groups. The rearmost group consists of, in order from the object side, a positive front group, a negative middle group, and a positive rear group. Air spaces between the front and middle groups, and between the middle and rear groups are constant during zooming and focusing. The front group includes at least two positive lenses and at least one negative lens. Image stabilization is effected by shifting the middle group perpendicu- (Continued)

larly to the optical axis. The zoom lens satisfies given condition expressions.

16 Claims, 37 Drawing Sheets

(56) References Cited

U.S. PATENT DOCUMENTS

| 2012/0062993 | A1* | 3/2012 | Li | G02B 15/173 |
| | | | | 359/557 |
| 2013/0229564 | A1* | 9/2013 | Saori | G02B 15/173 |
| | | | | 348/340 |

FOREIGN PATENT DOCUMENTS

| JP | 2012-118097 | 6/2012 |
| JP | 2014-35480 | 2/2014 |
| JP | 2014-126766 | 7/2014 |

* cited by examiner

FIG.1    EXAMPLE 1
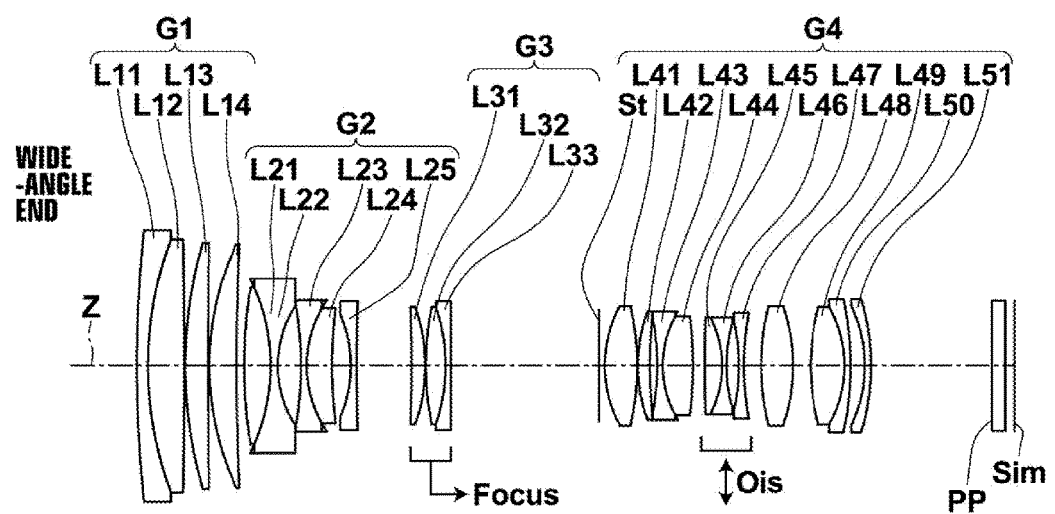
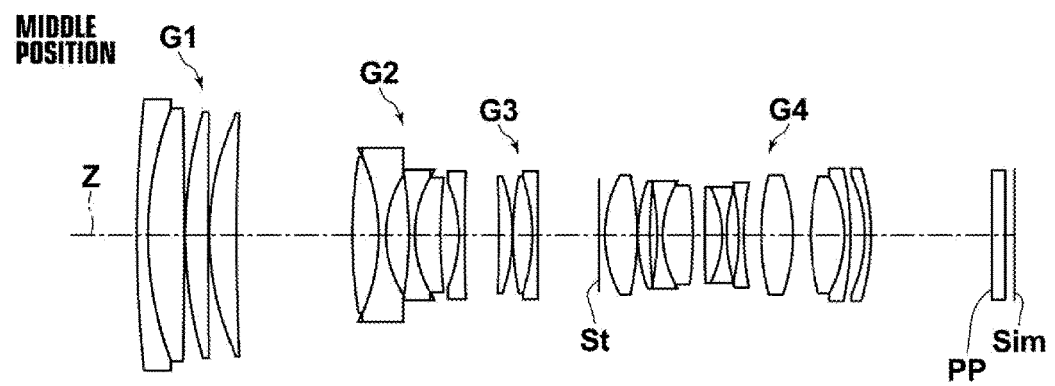
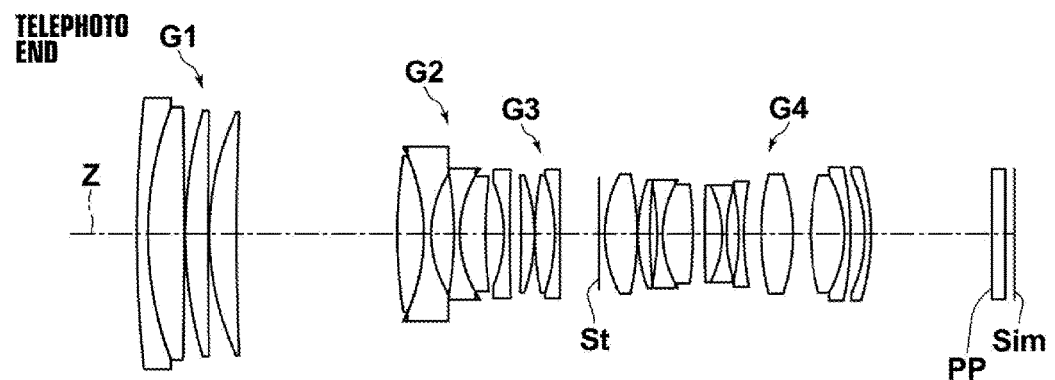

FIG.2 EXAMPLE 2
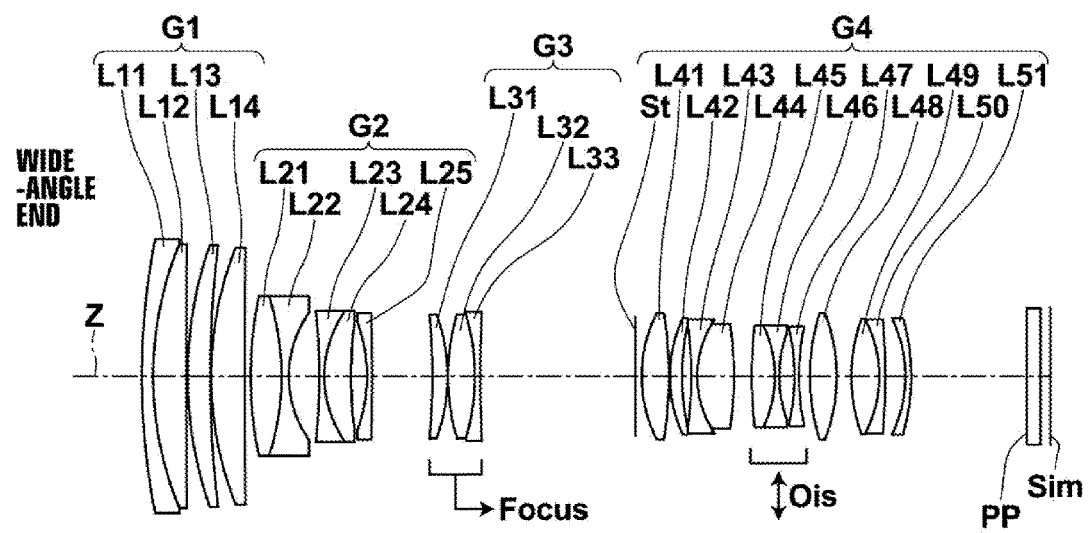
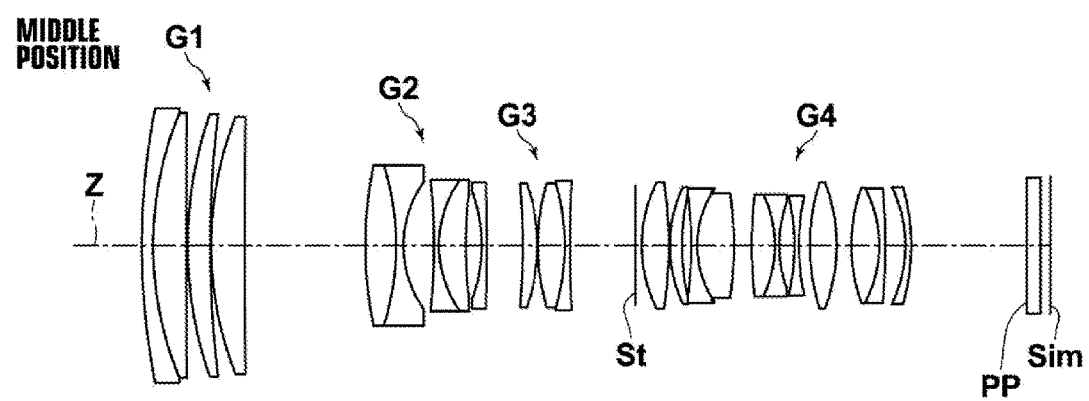
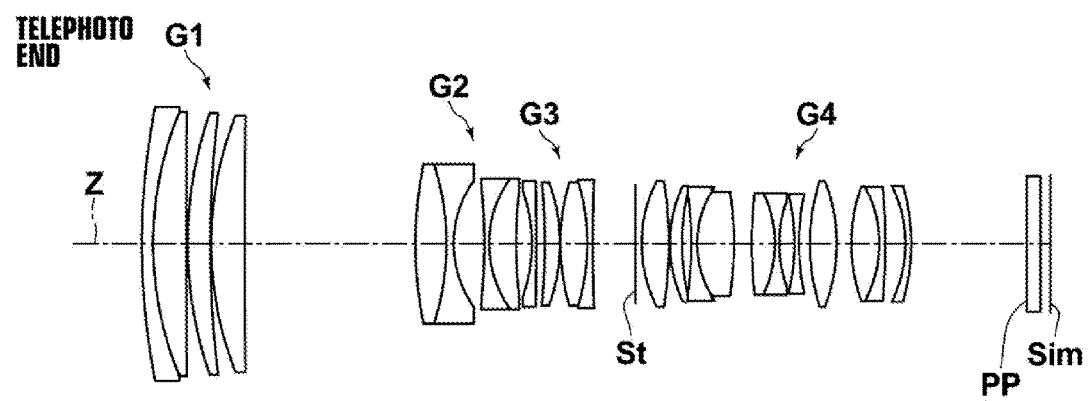

FIG.3  EXAMPLE 3
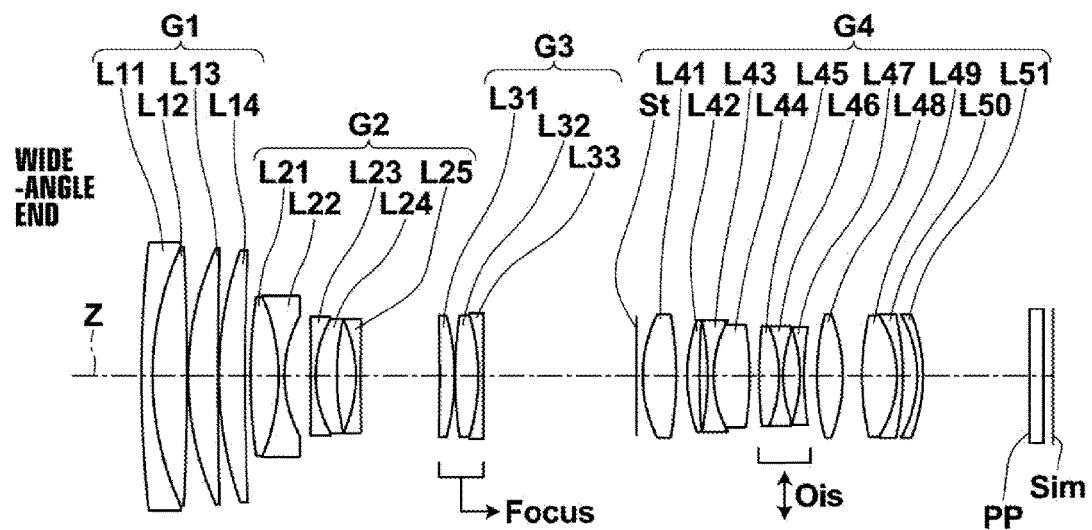
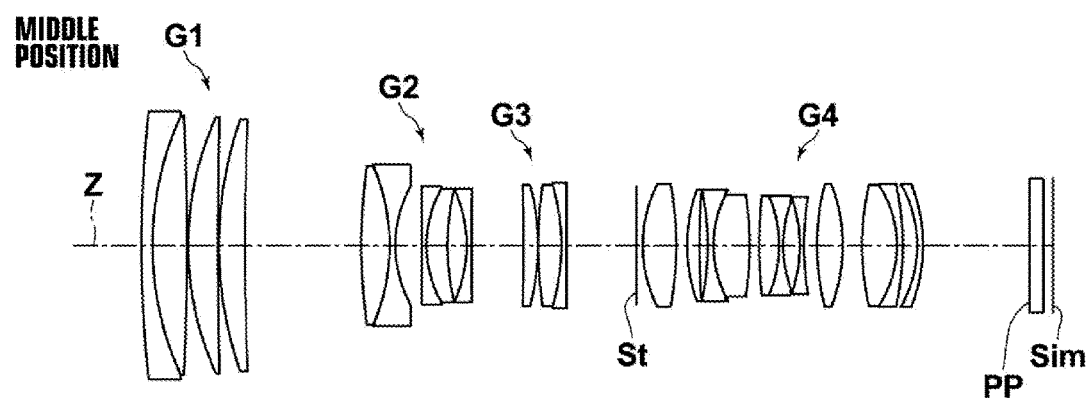
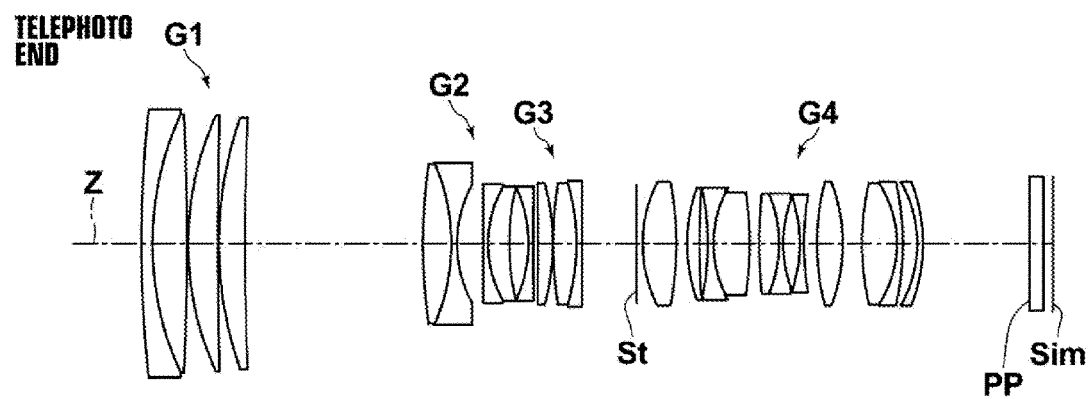

FIG.4
<u>EXAMPLE 4</u>
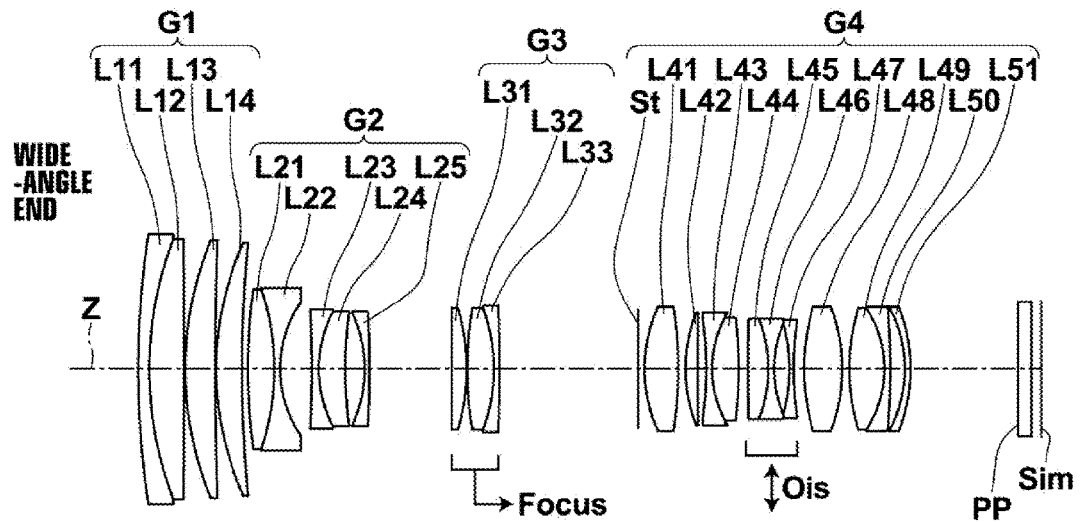
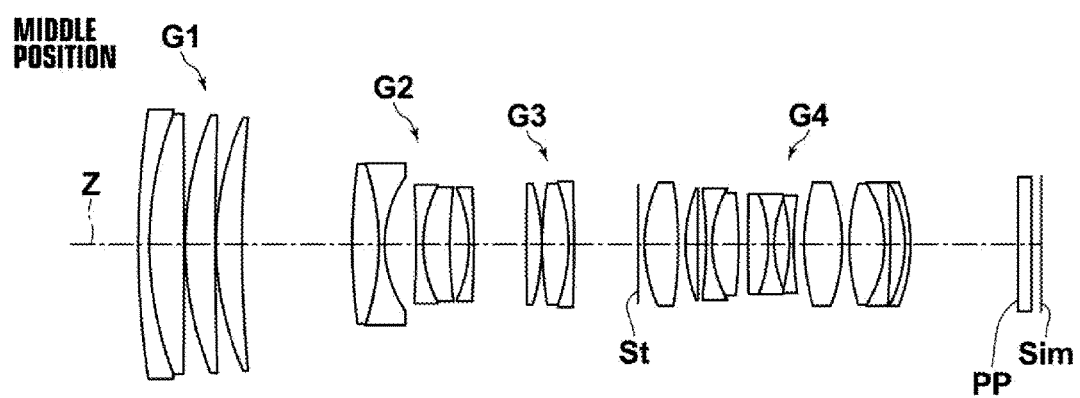
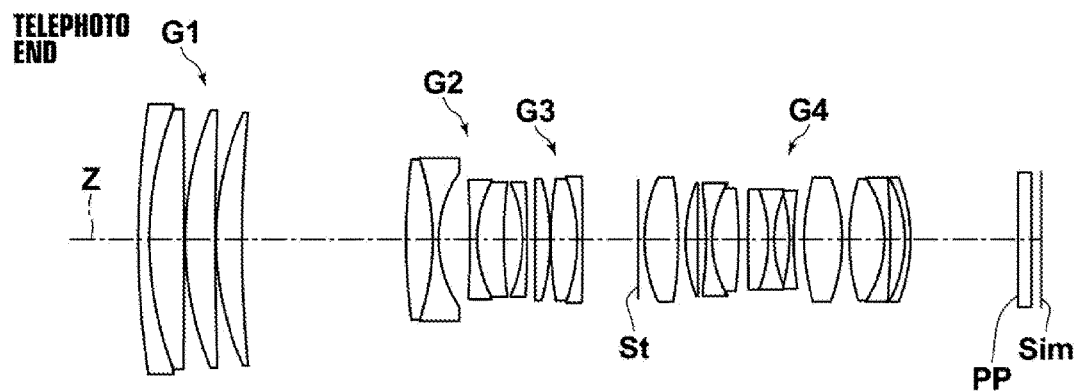

FIG.5 EXAMPLE 5
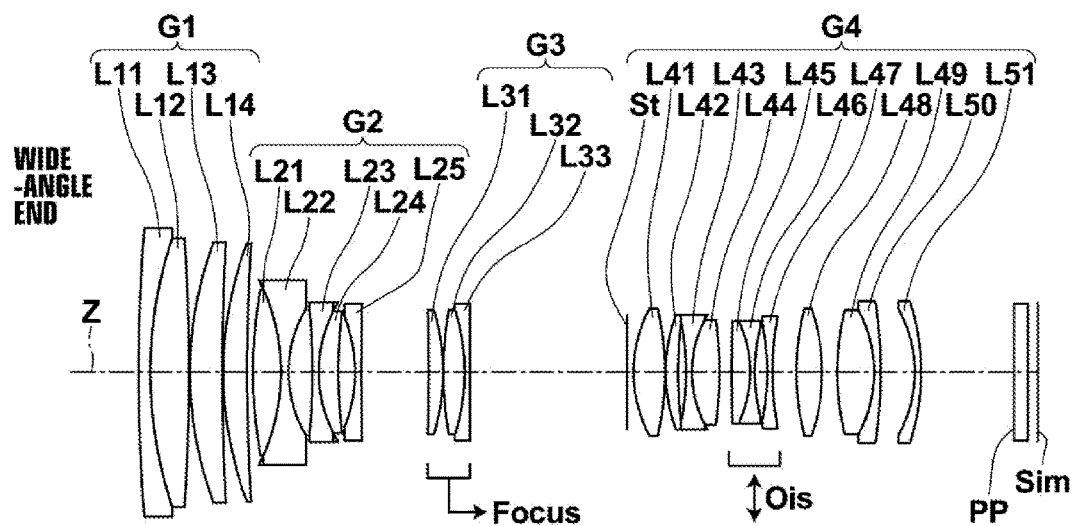
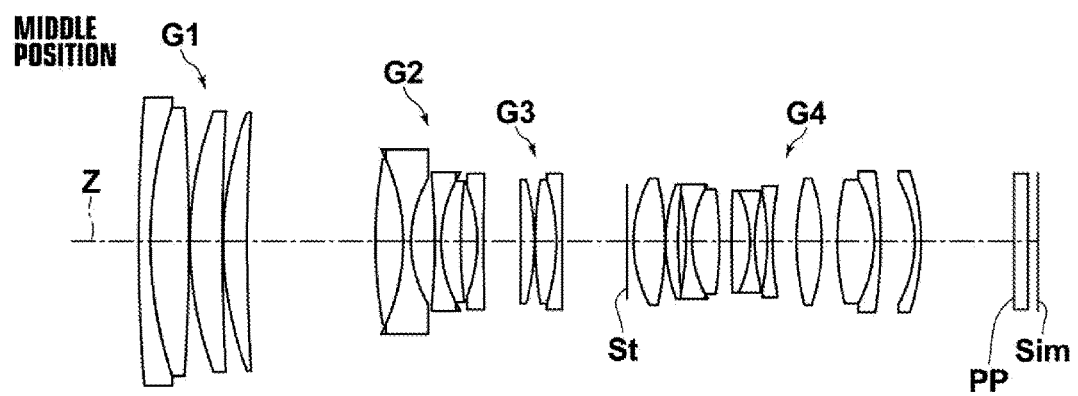
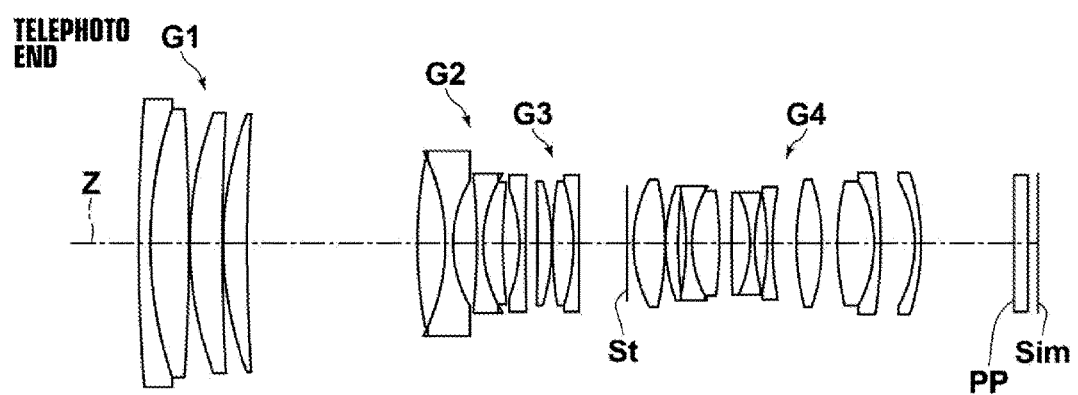

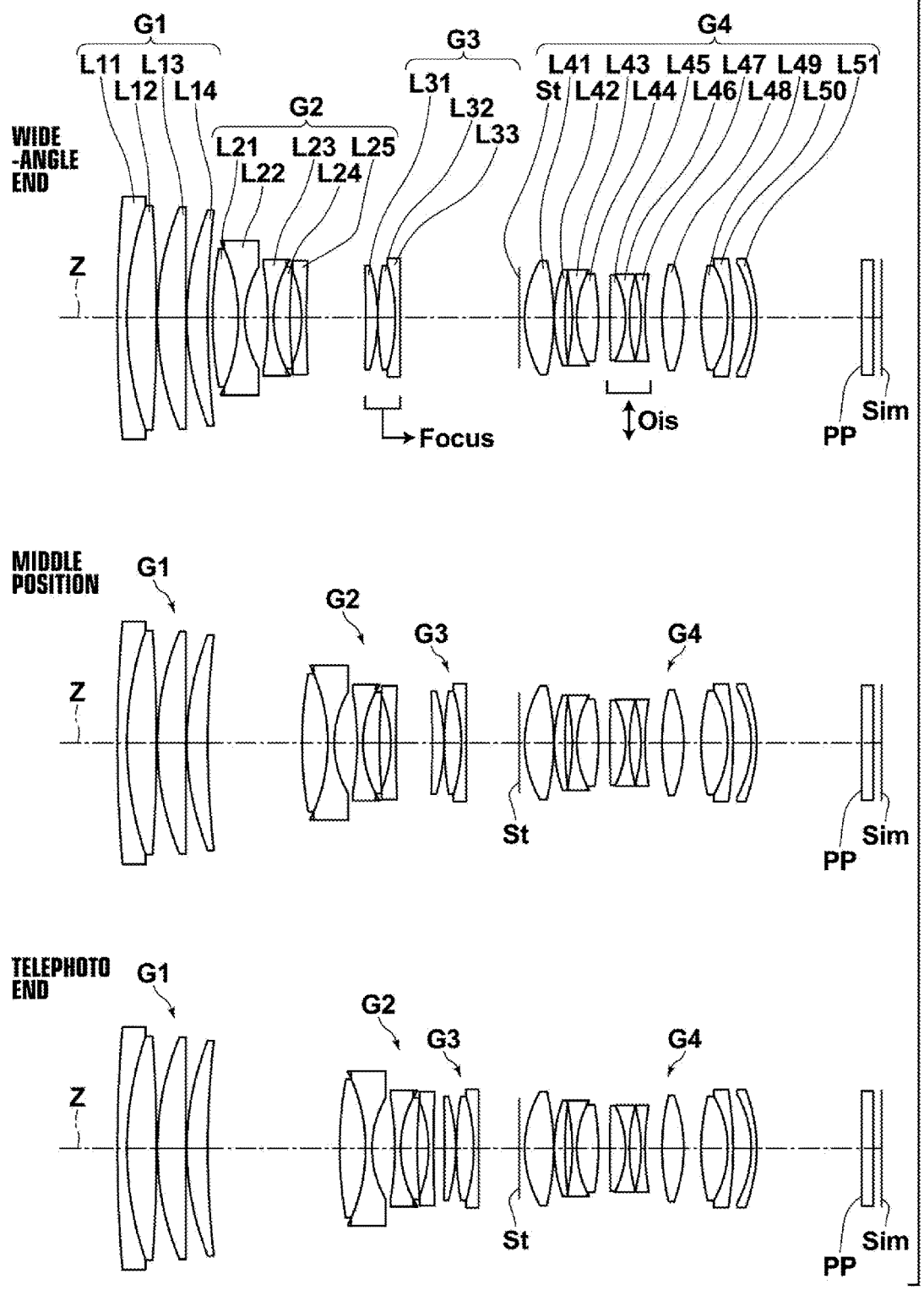

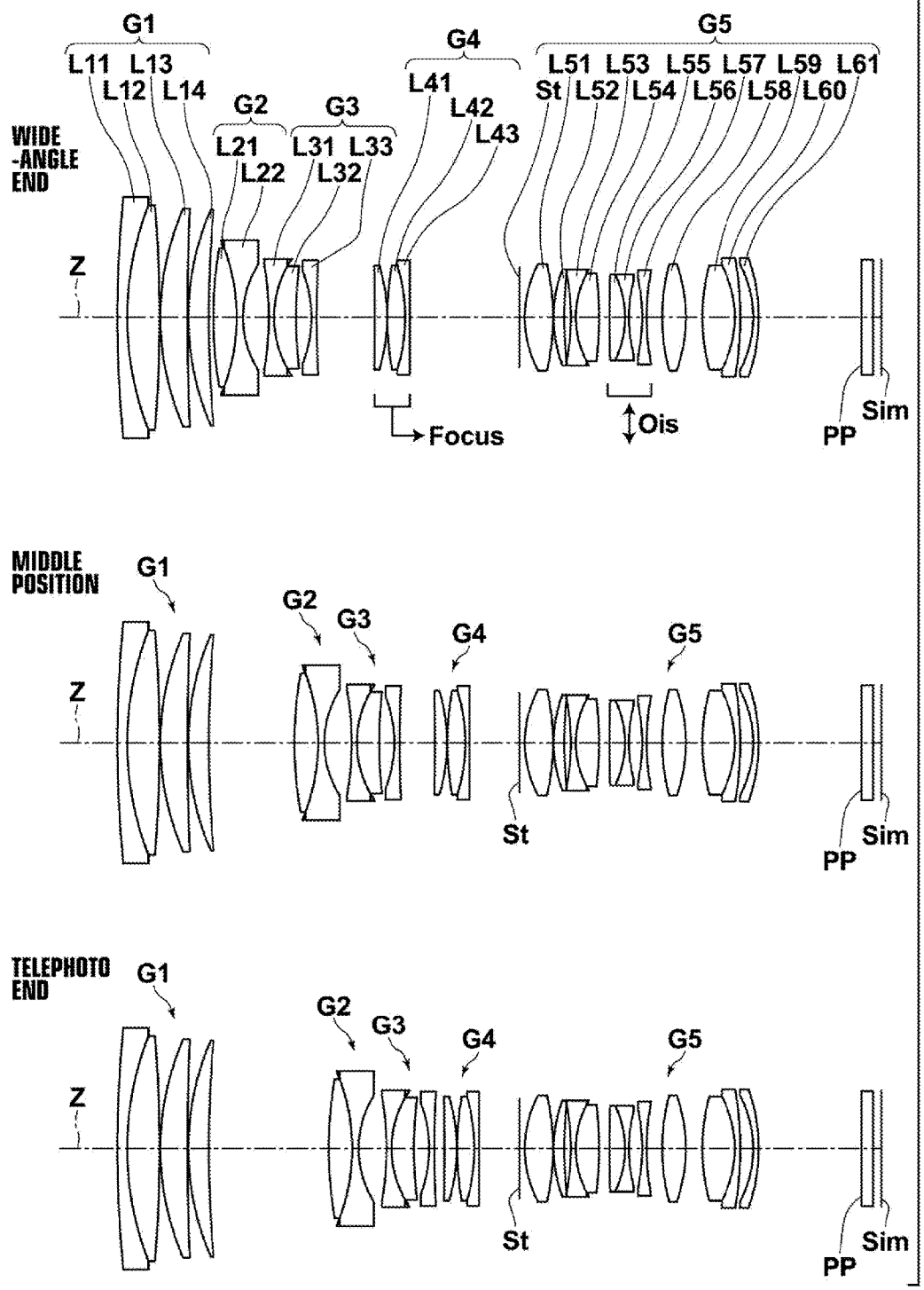

FIG.8 EXAMPLE 8
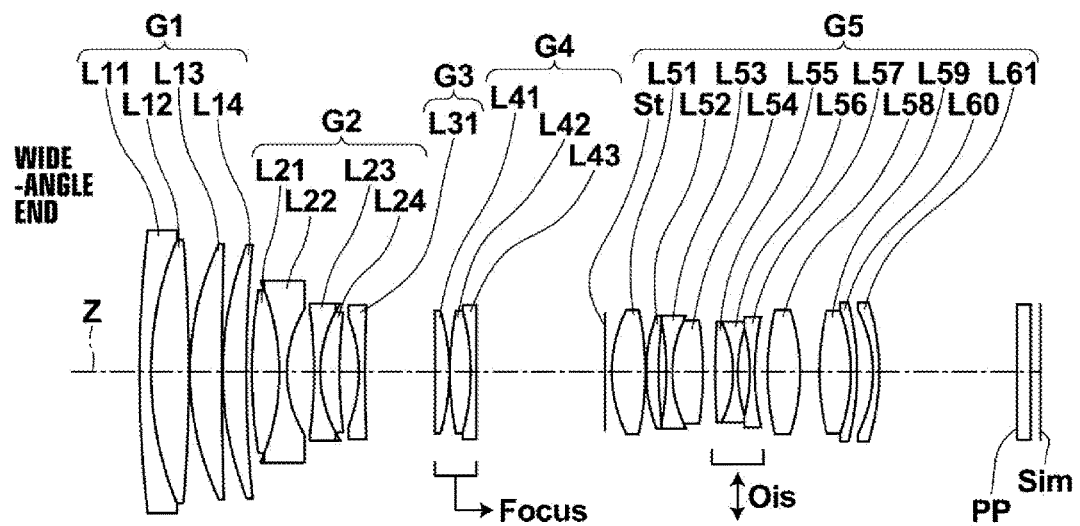
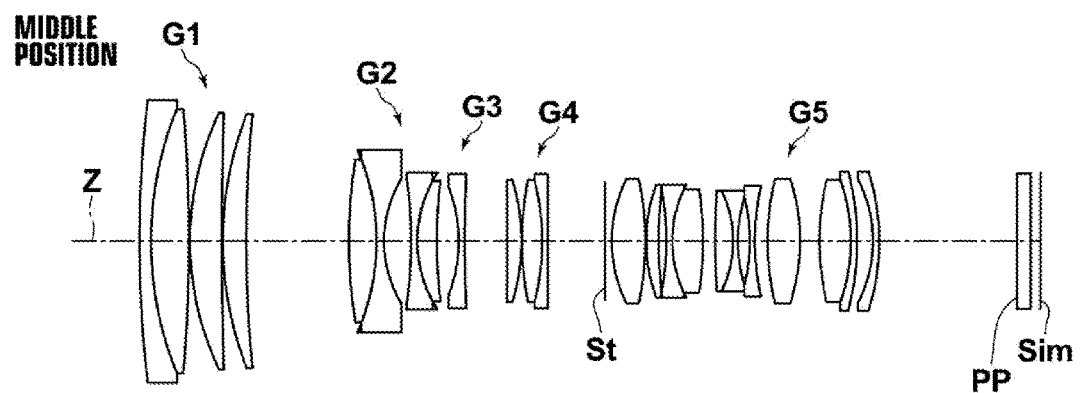
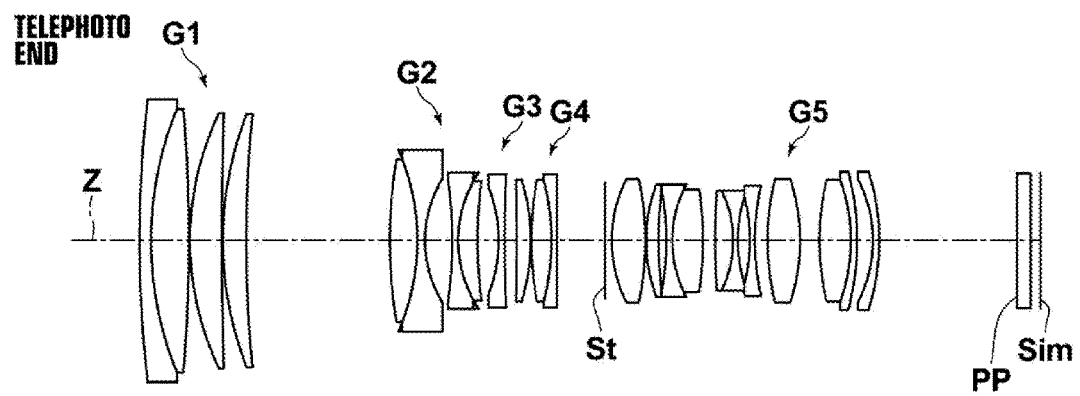

FIG.9
EXAMPLE 9
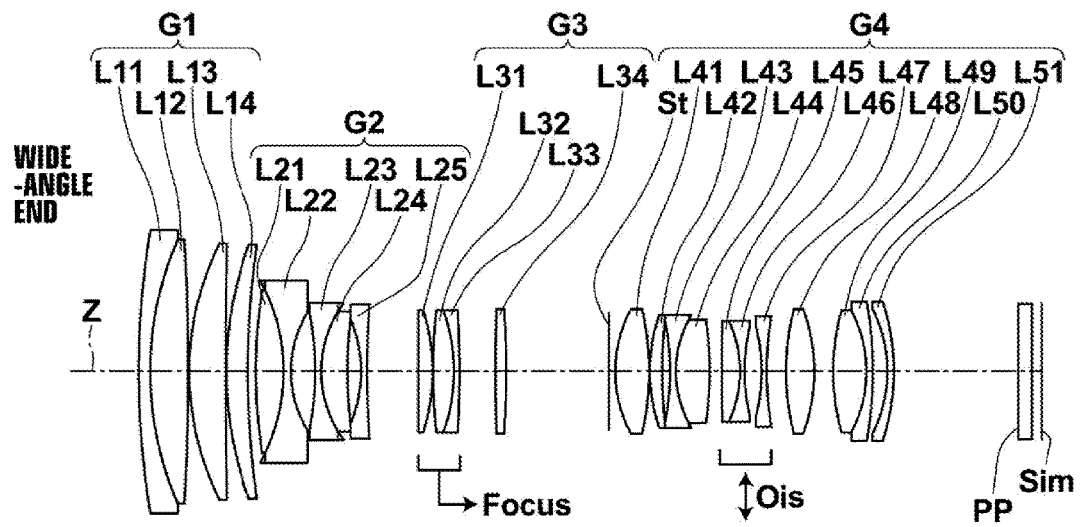
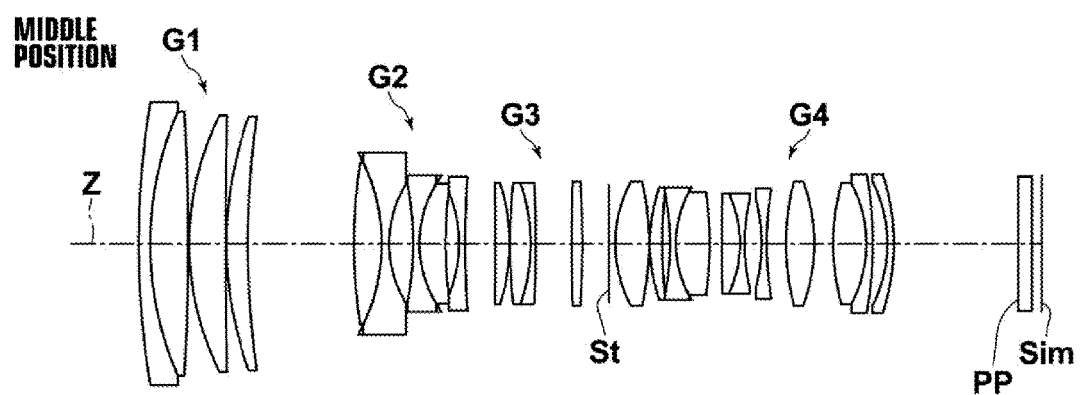
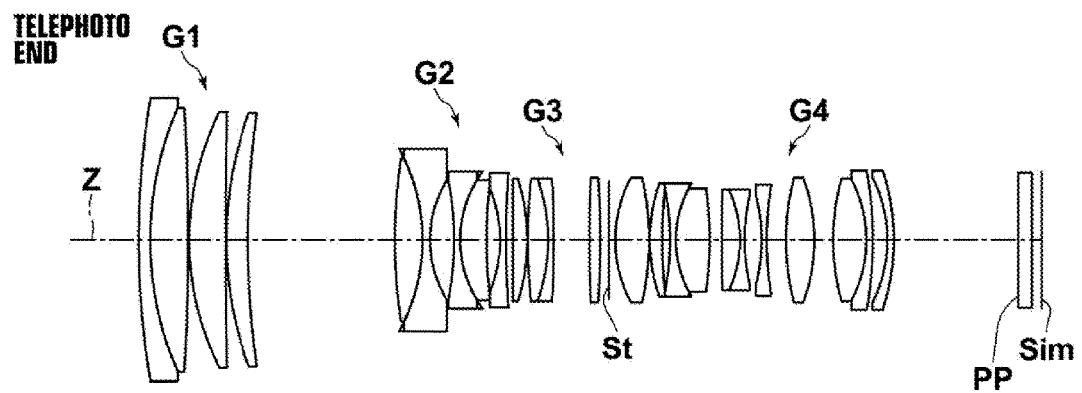

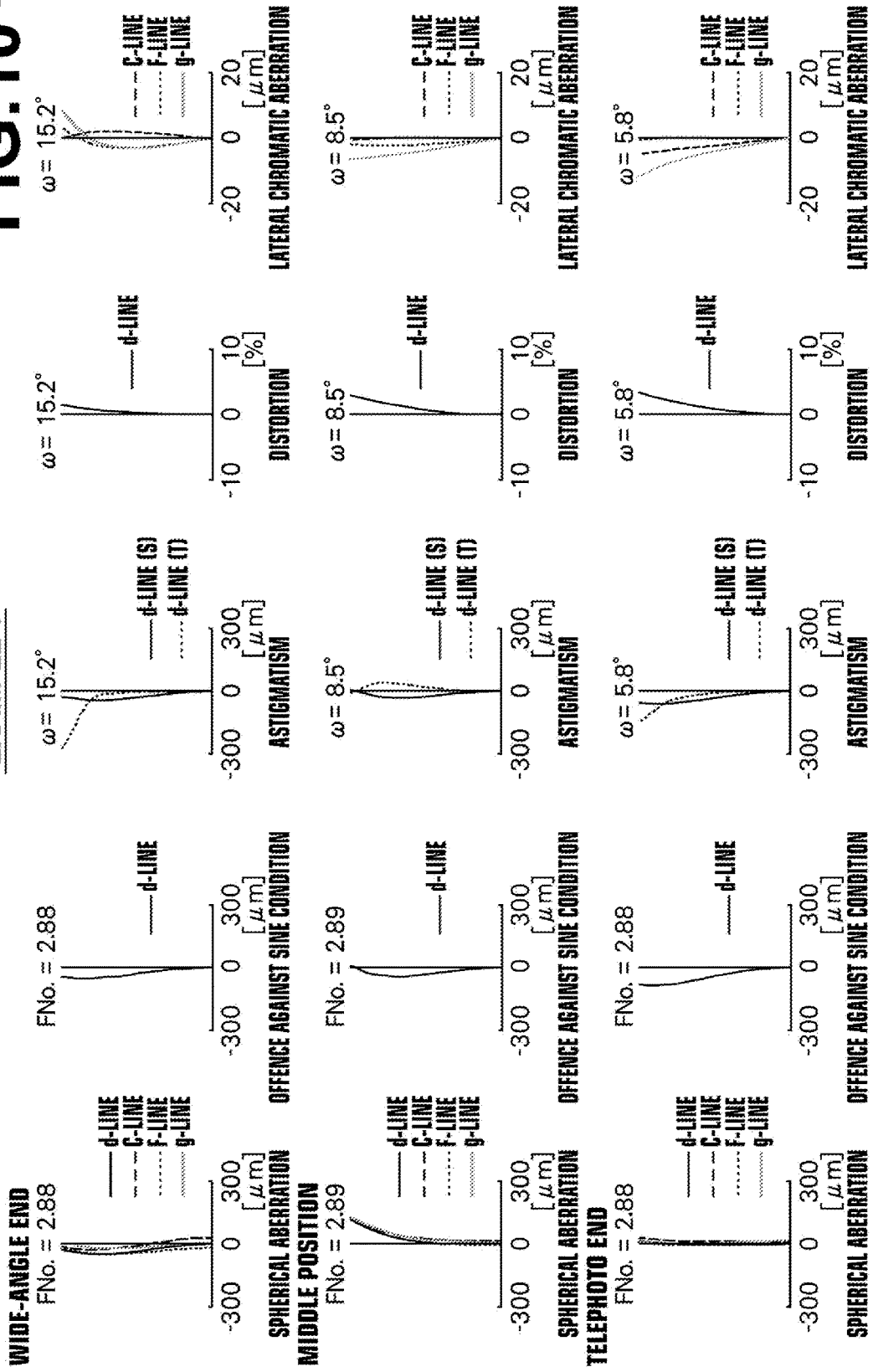

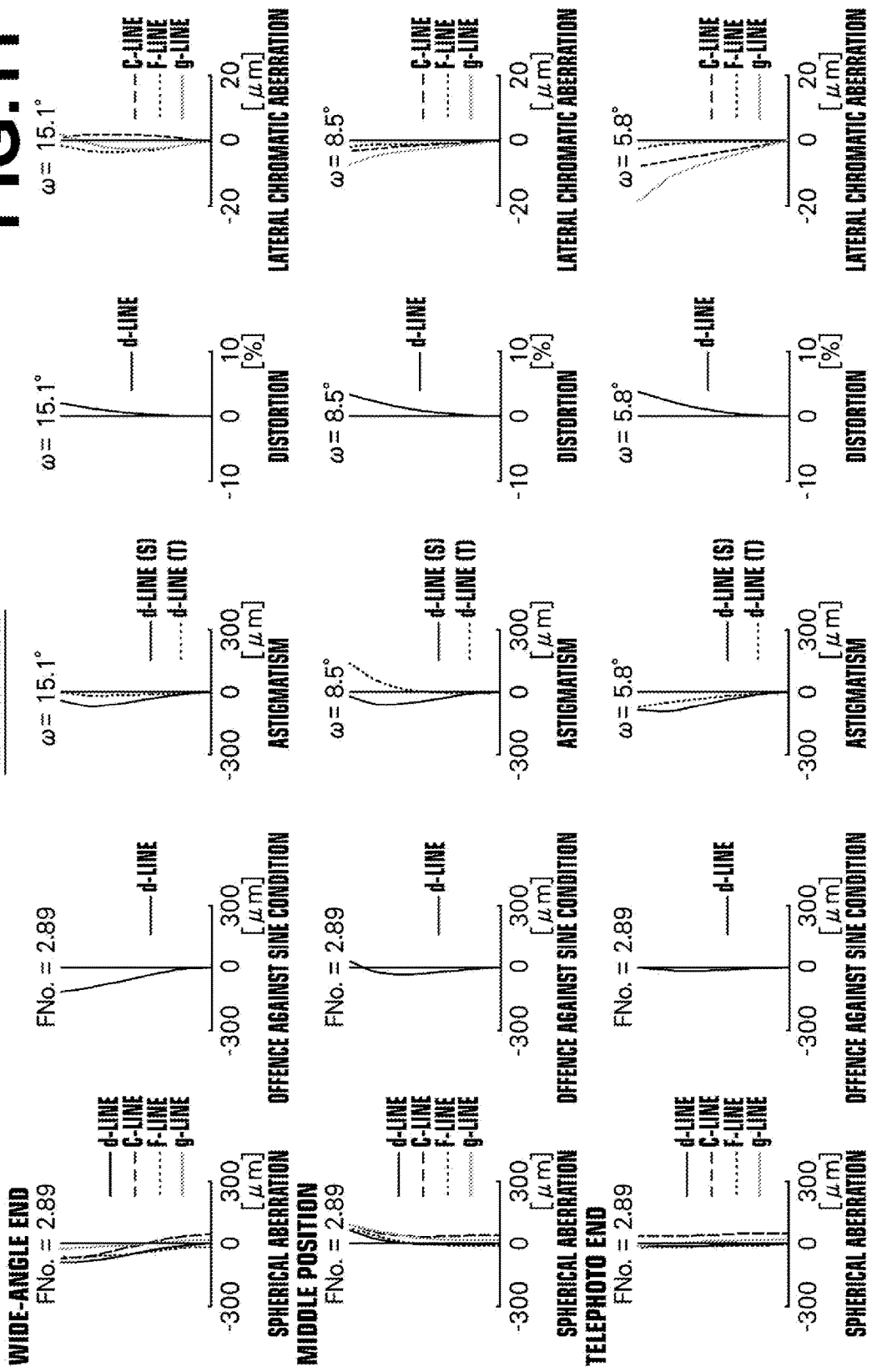

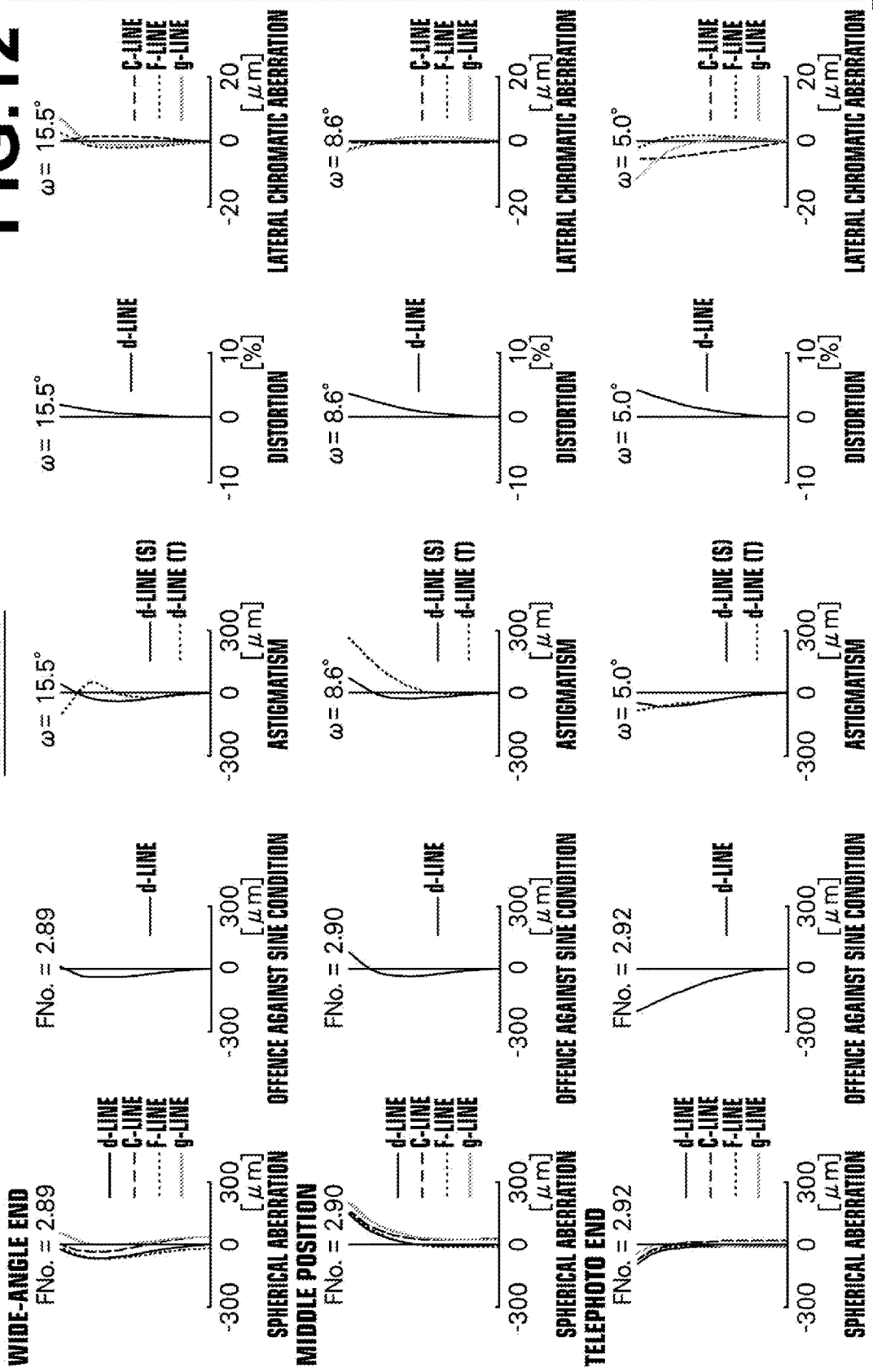

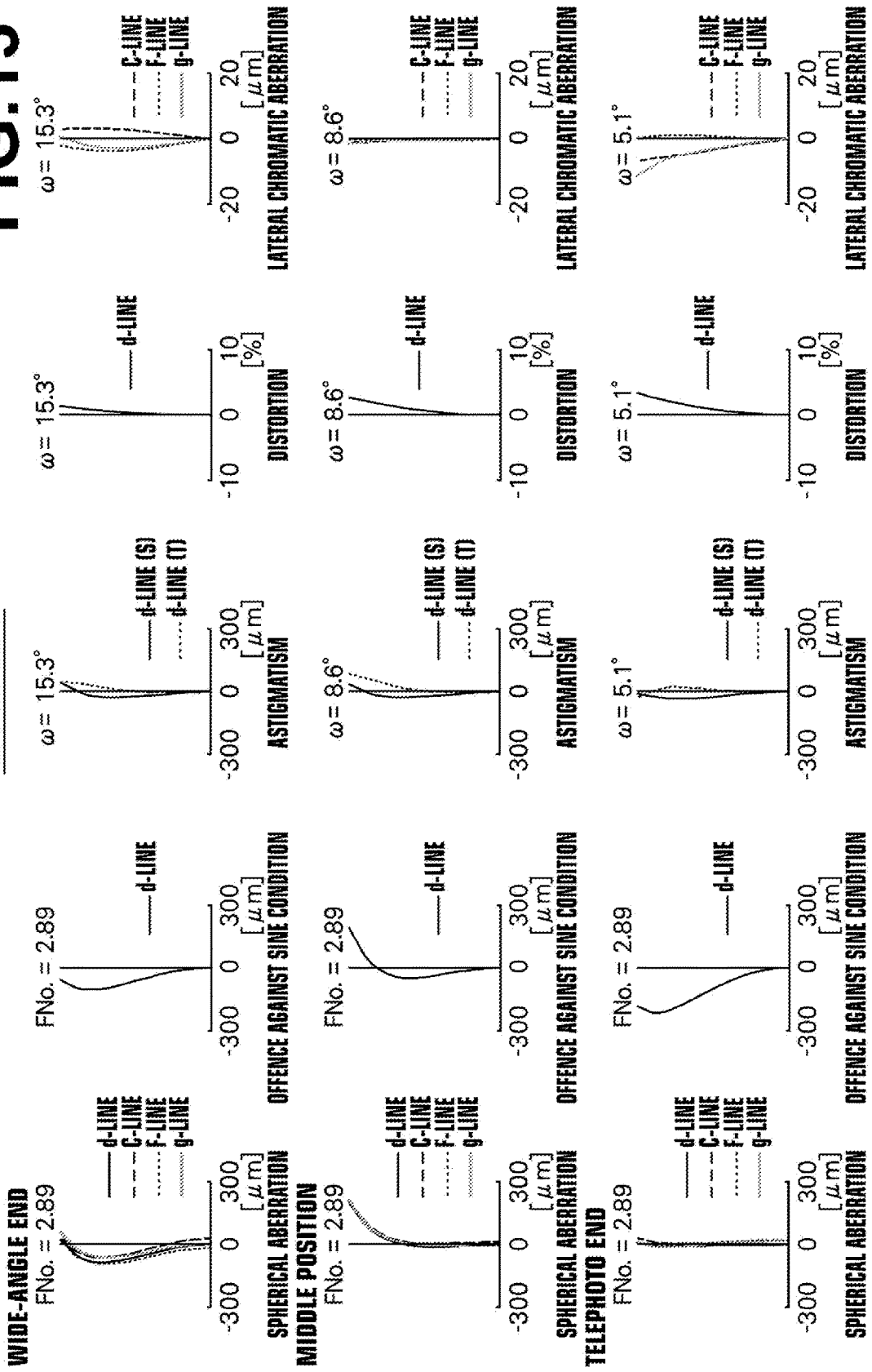

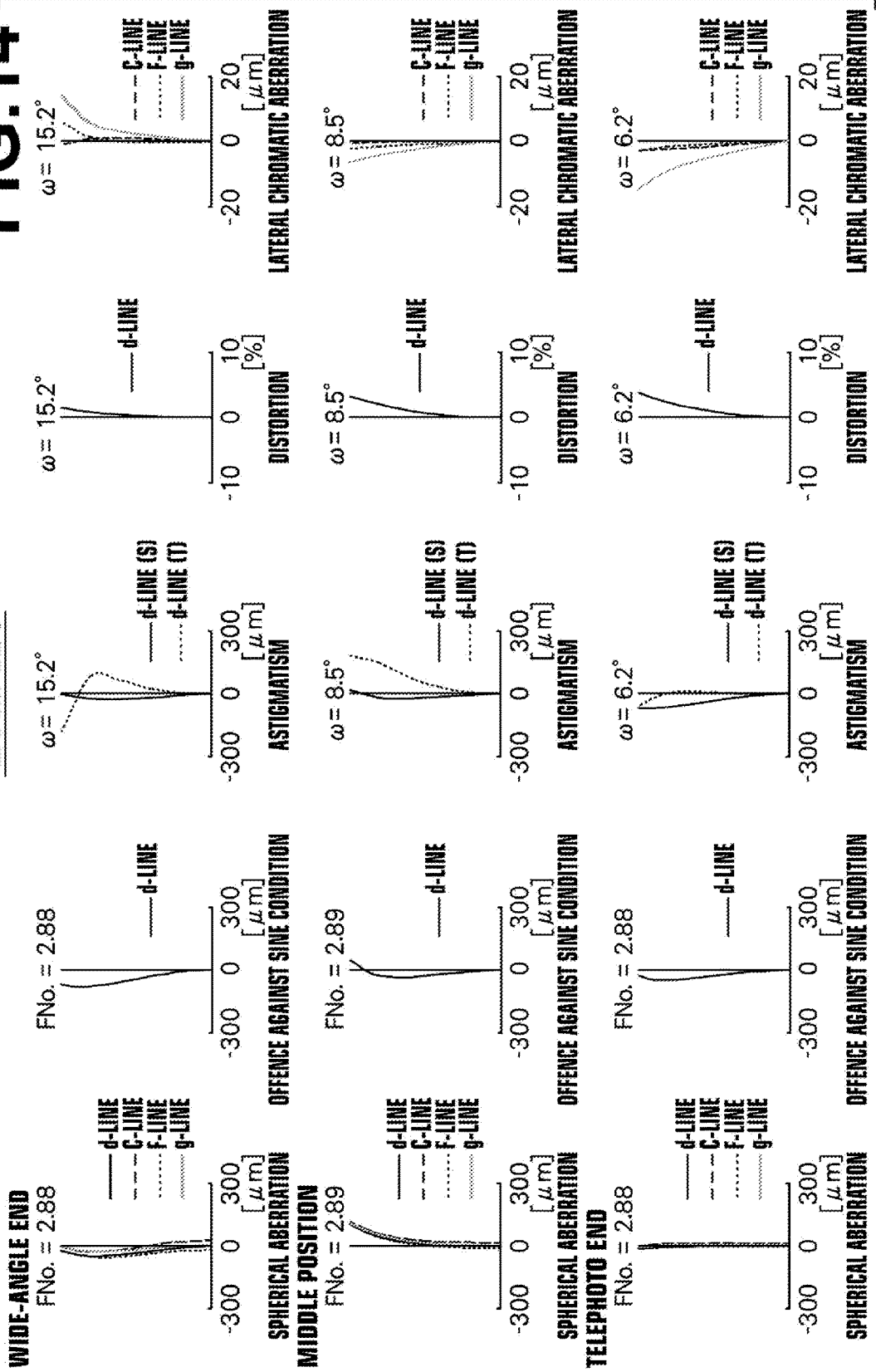

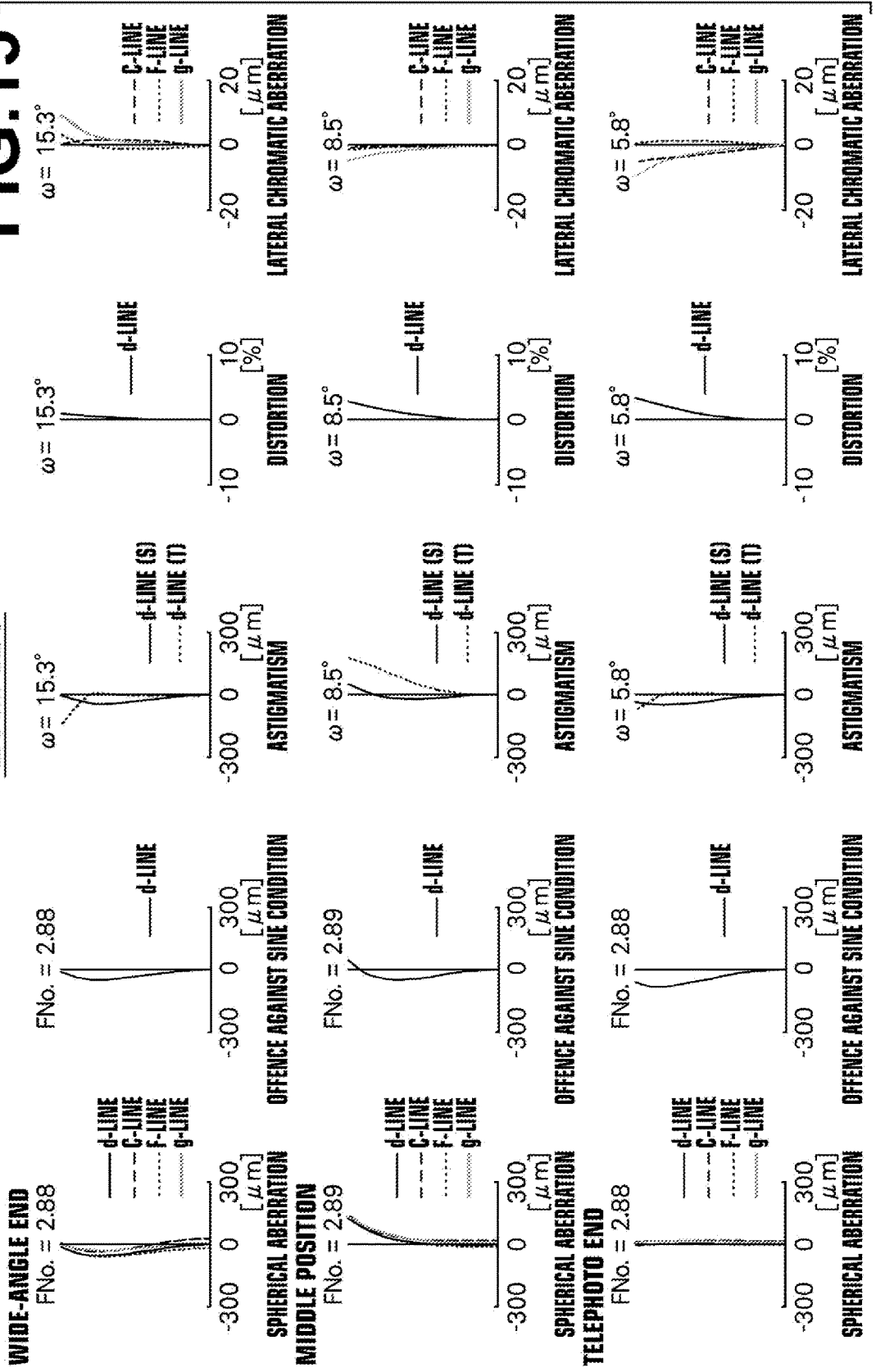

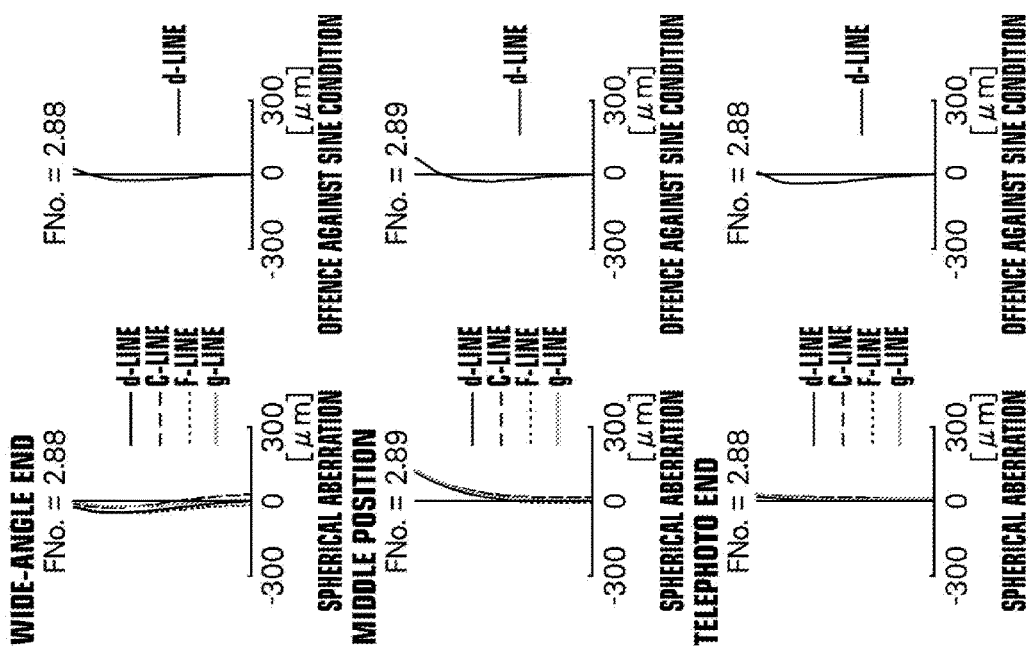

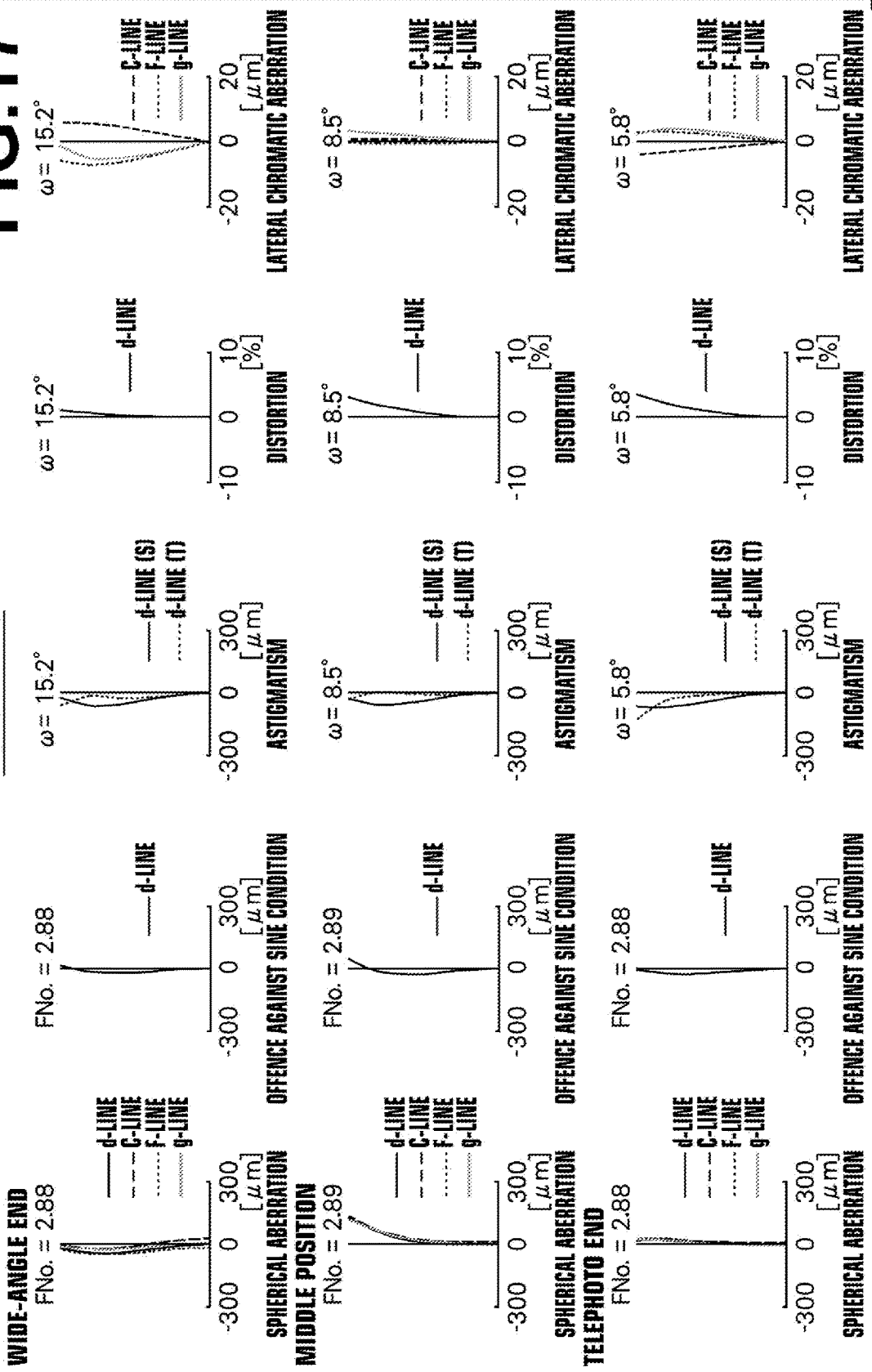

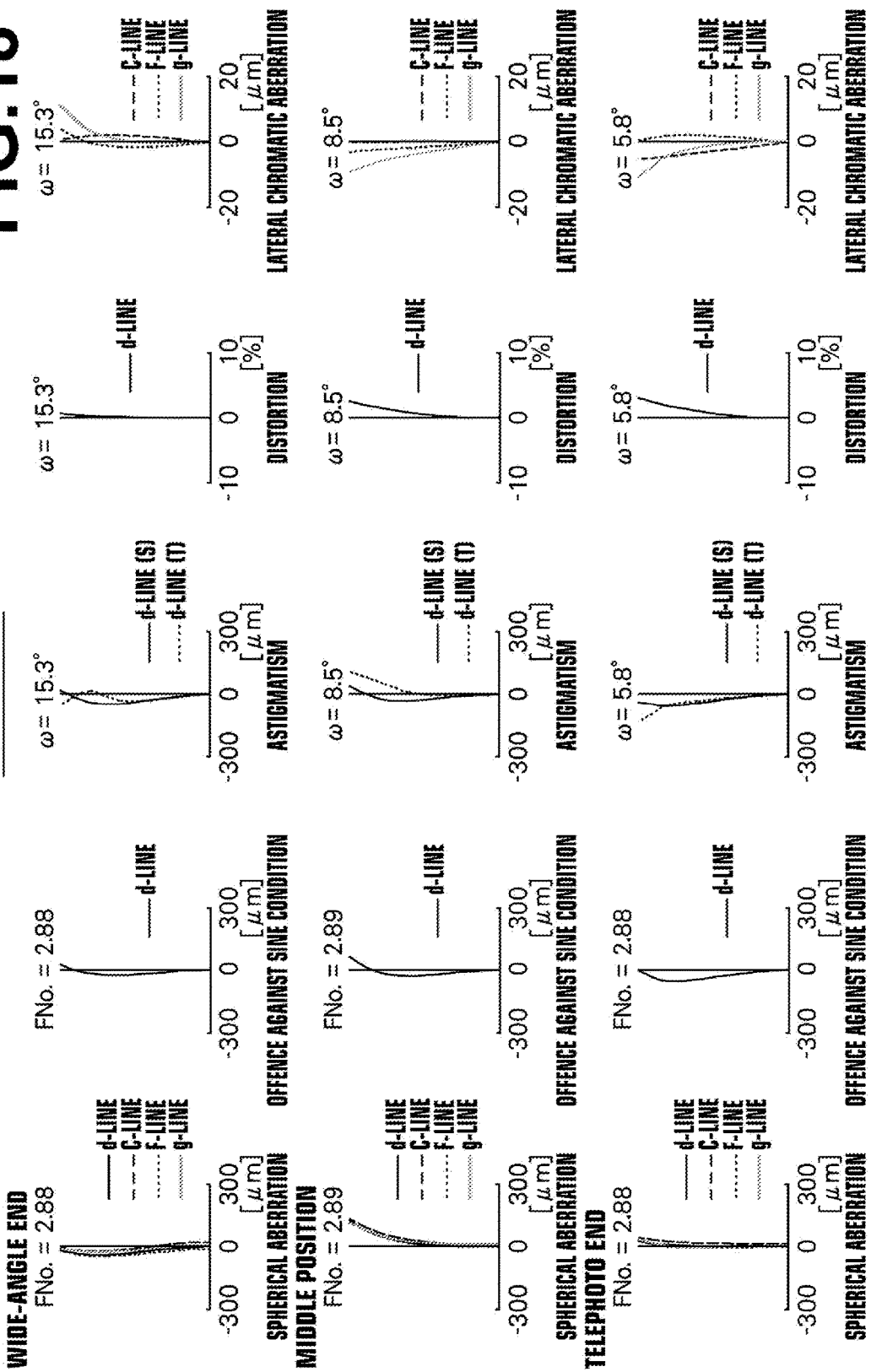

FIG.19 EXAMPLE 1
WIDE-ANGLE END
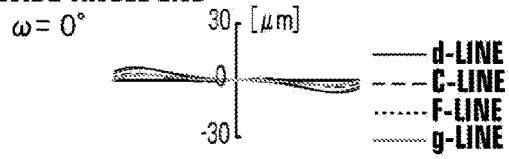
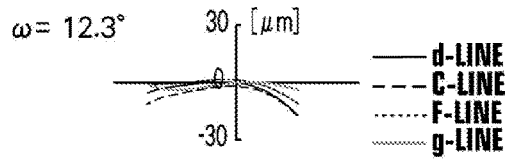
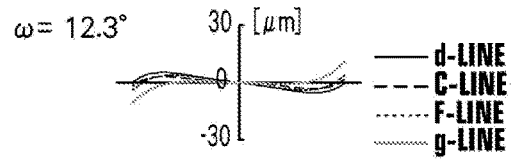
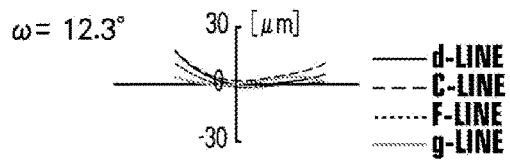
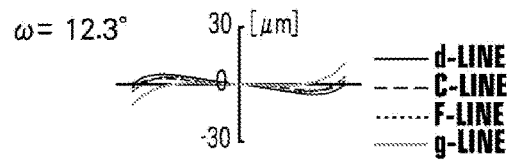
MIDDLE POSITION
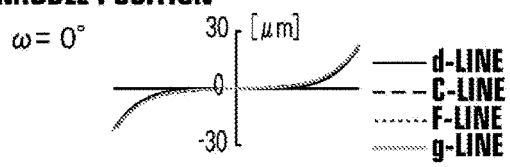
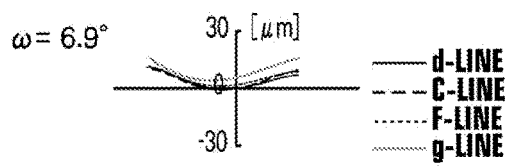
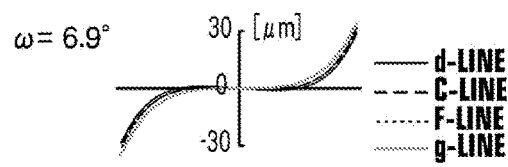
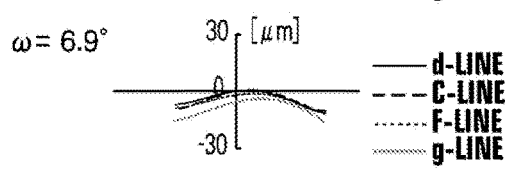
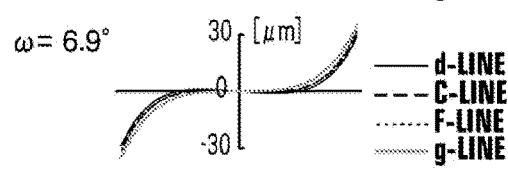
TELEPHOTO END
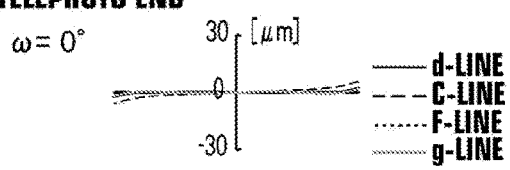
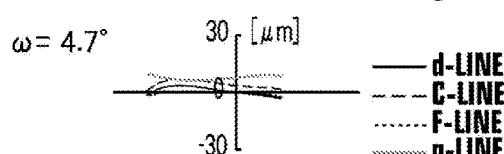
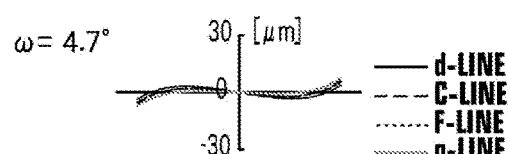
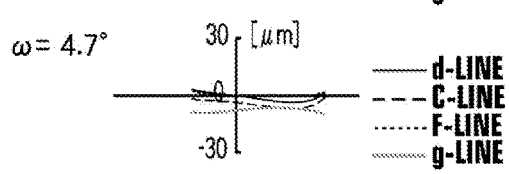
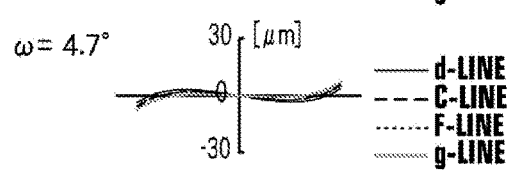

FIG.20
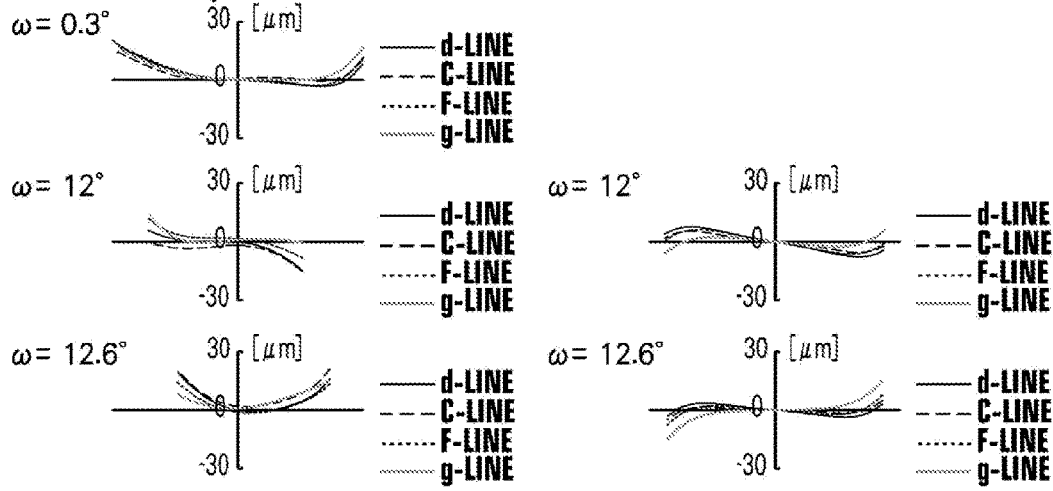
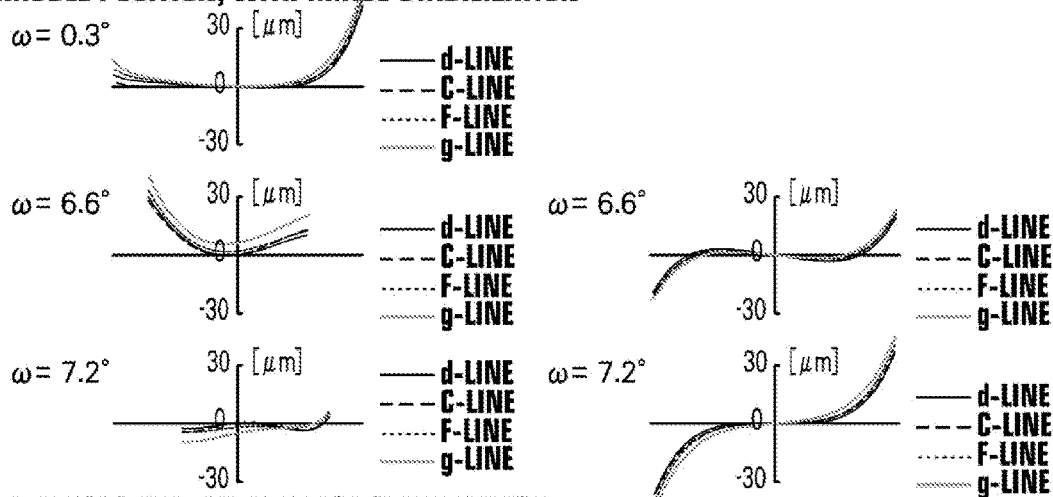
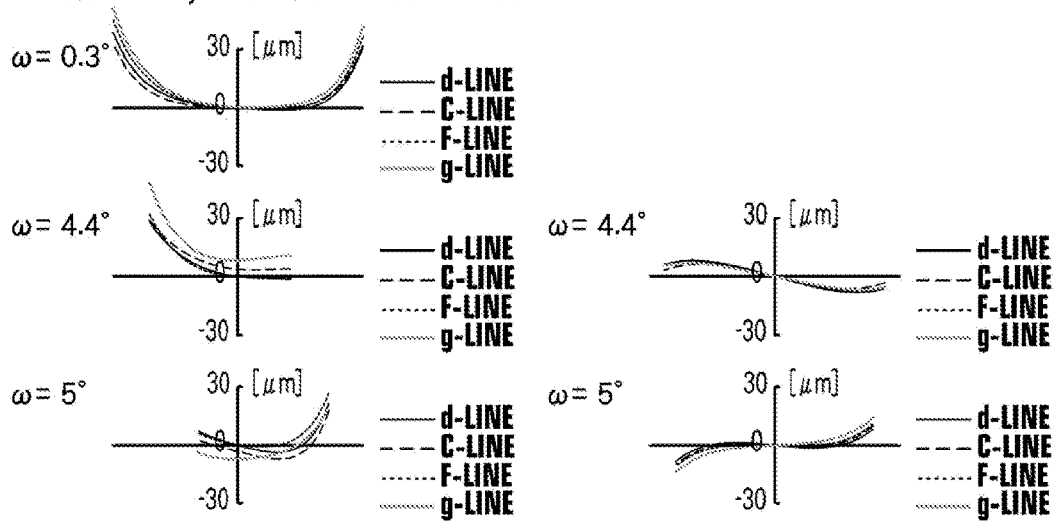

FIG.21 EXAMPLE 2

FIG.22
EXAMPLE 2
WIDE-ANGLE END, WITH IMAGE STABILIZATION
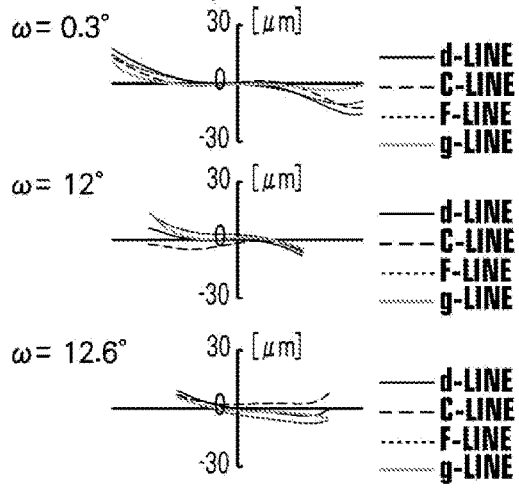
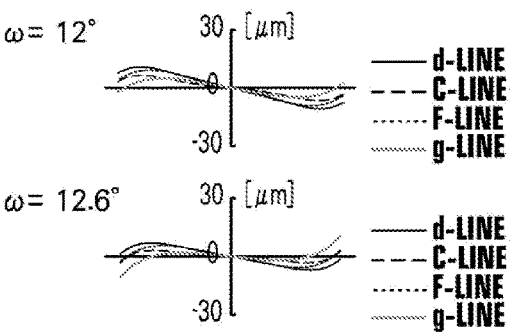
MIDDLE POSITION, WITH IMAGE STABILIZATION
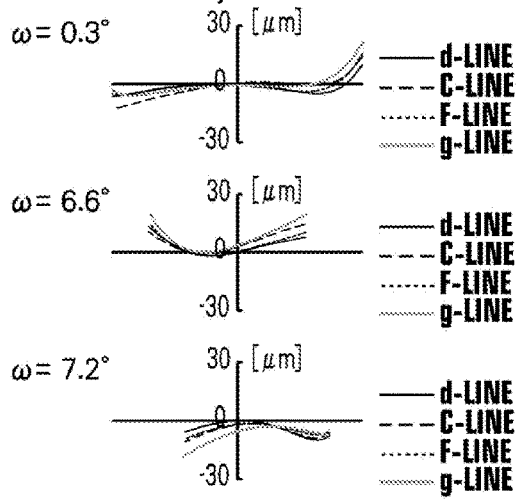
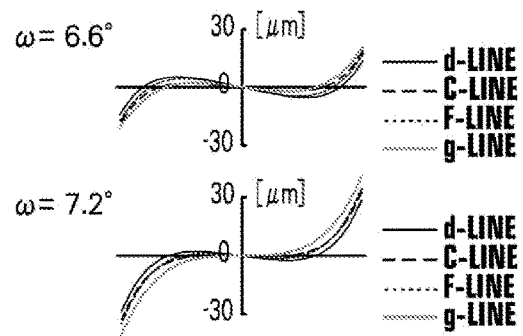
TELEPHOTO END, WITH IMAGE STABILIZATION
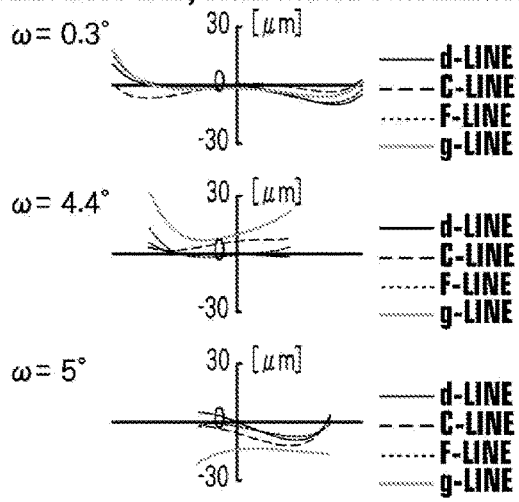
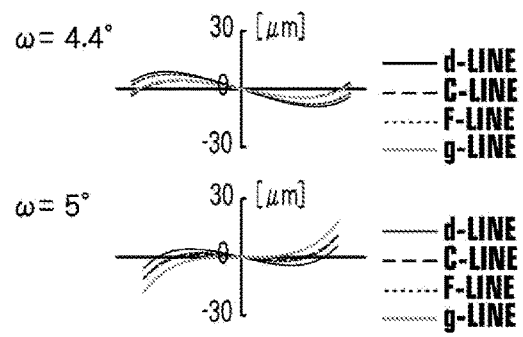

FIG.23
EXAMPLE 3
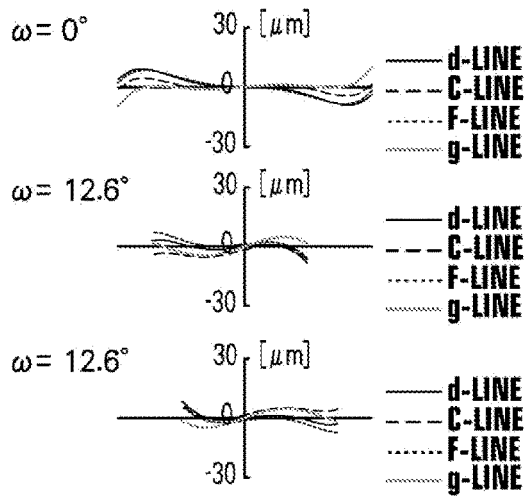
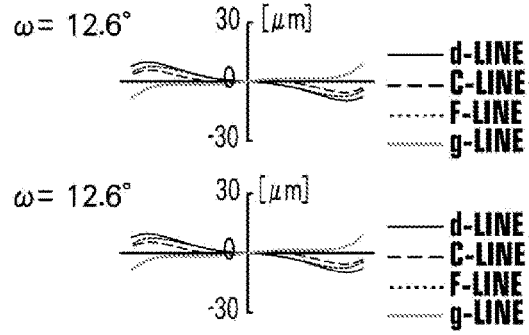
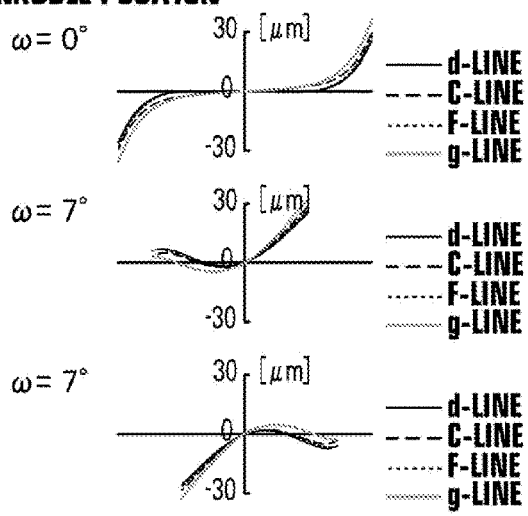
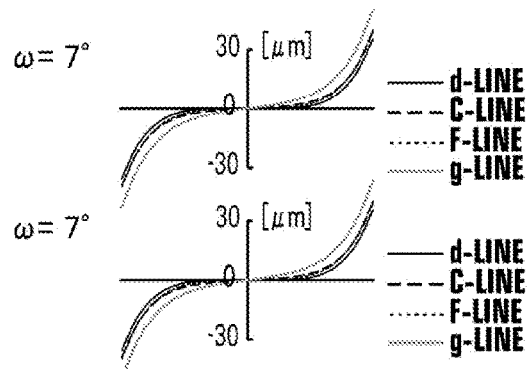
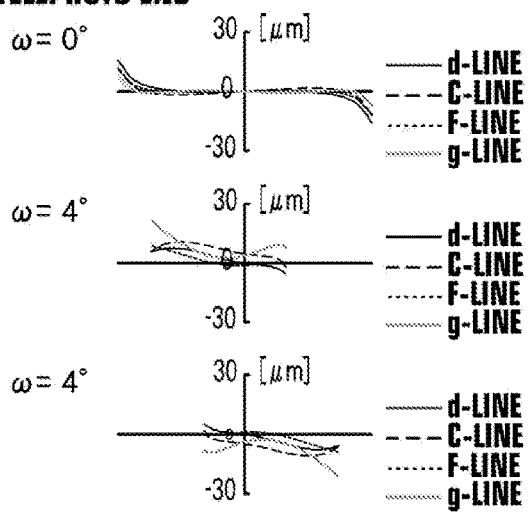
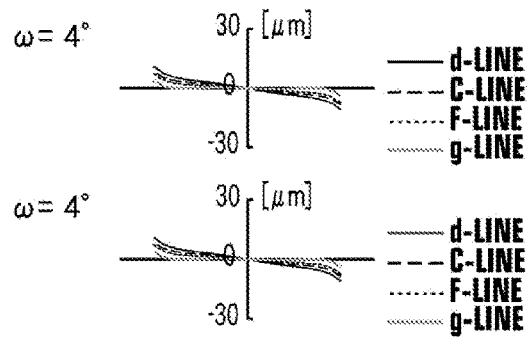

FIG.24
EXAMPLE 3
WIDE-ANGLE END, WITH IMAGE STABILIZATION
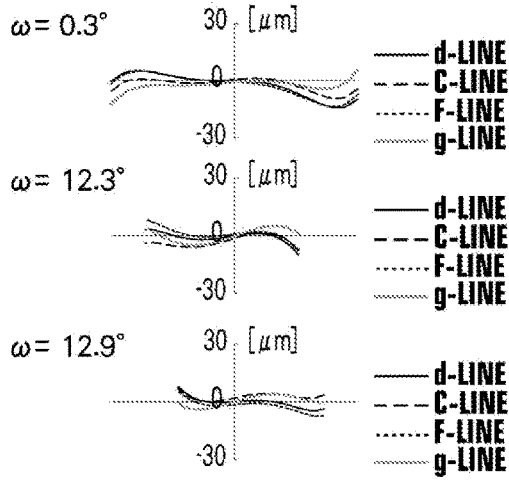
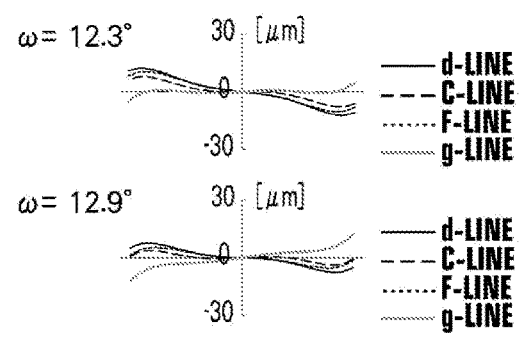
MIDDLE POSITION, WITH IMAGE STABILIZATION
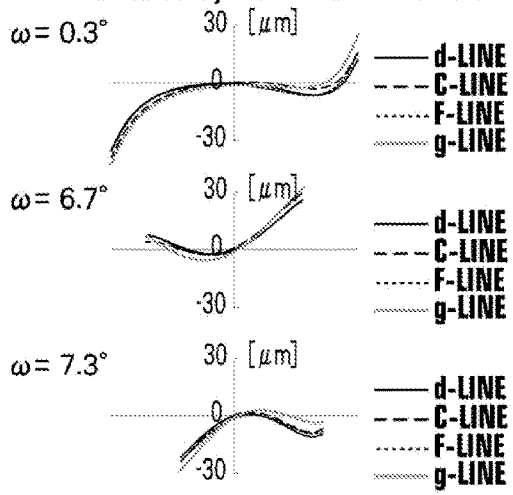
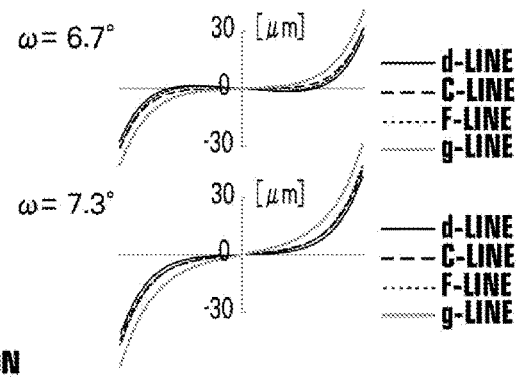
TELEPHOTO END, WITH IMAGE STABILIZATION
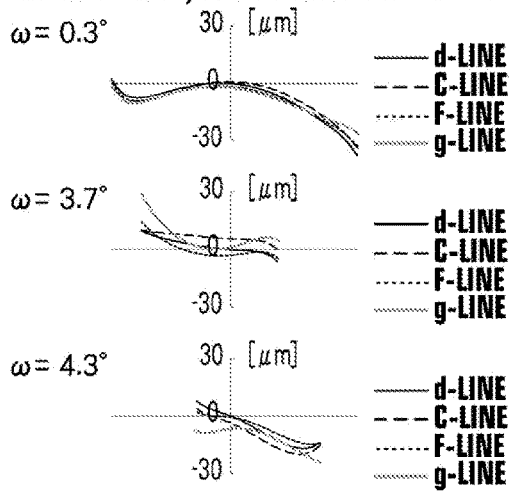
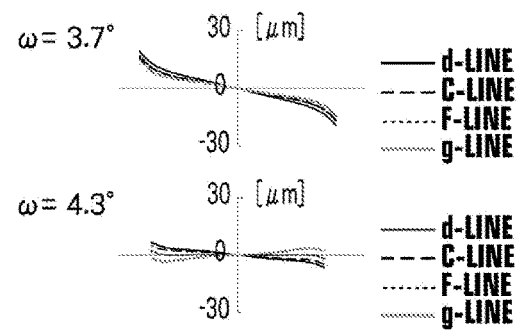

FIG.25
EXAMPLE 4
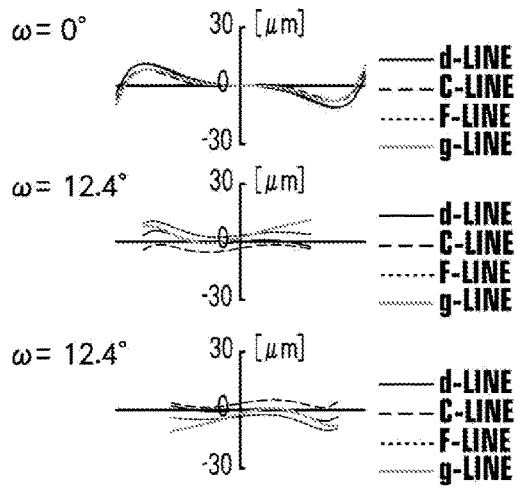
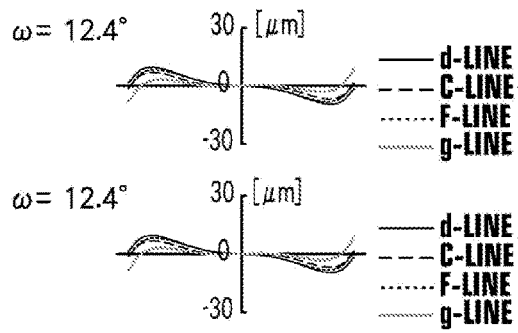
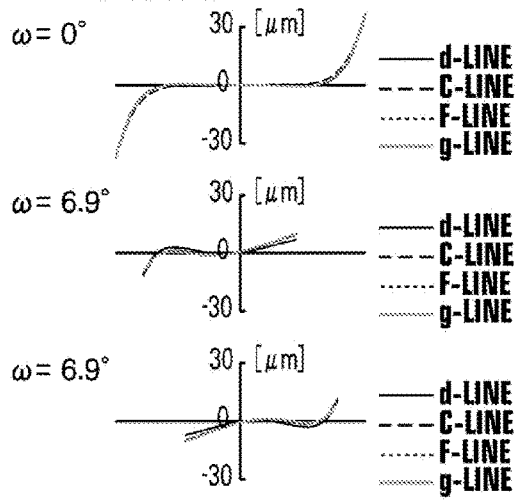
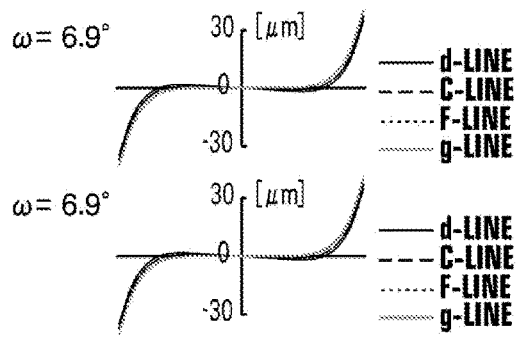
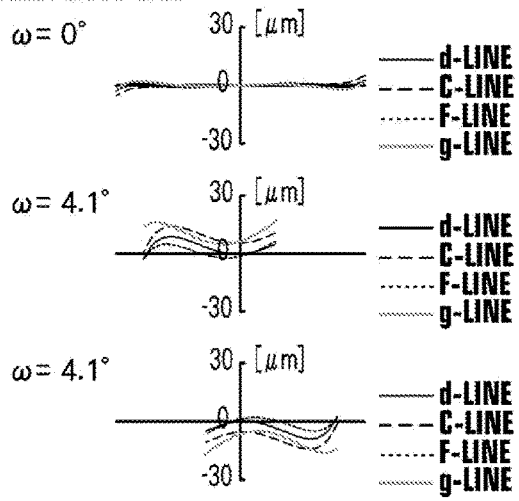
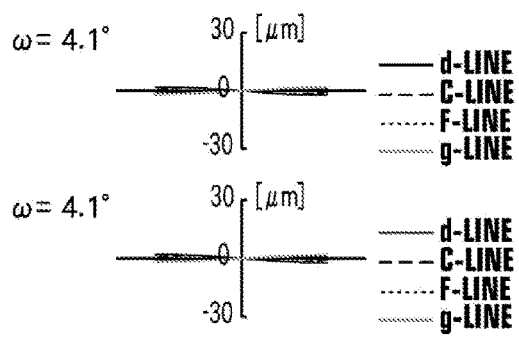

FIG.26
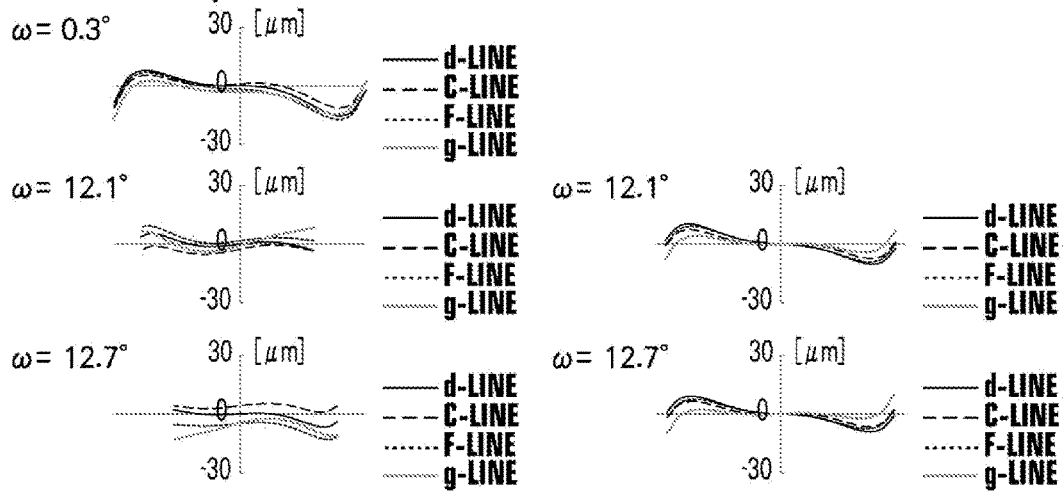
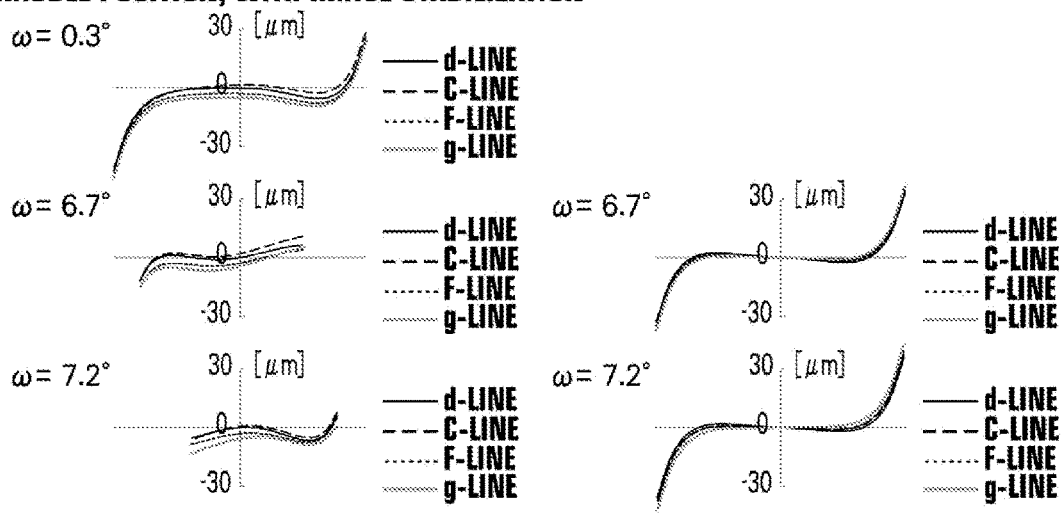
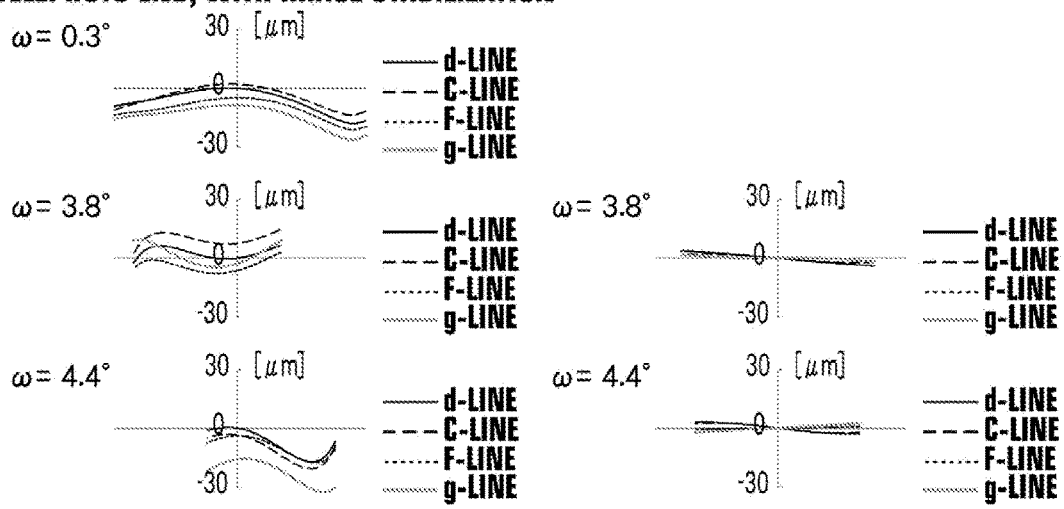

FIG.27
EXAMPLE 5
WIDE-ANGLE END
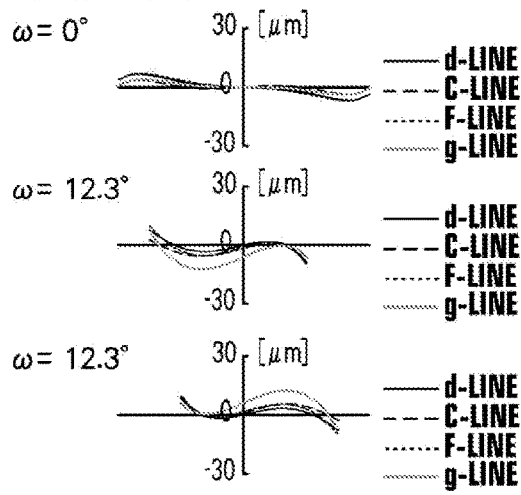
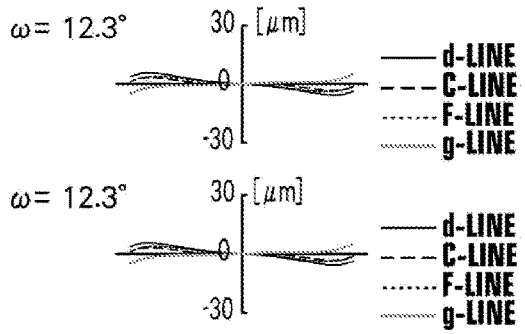
MIDDLE POSITION
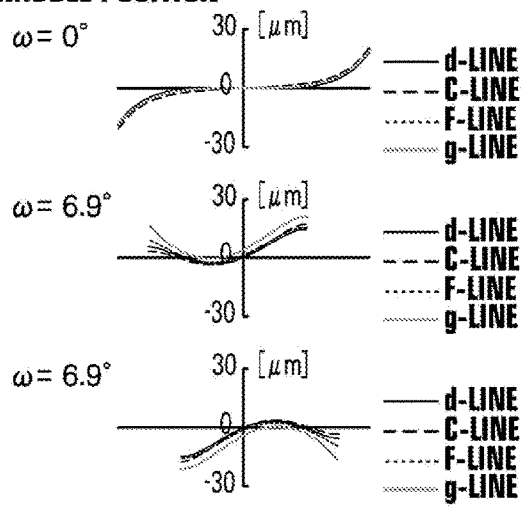
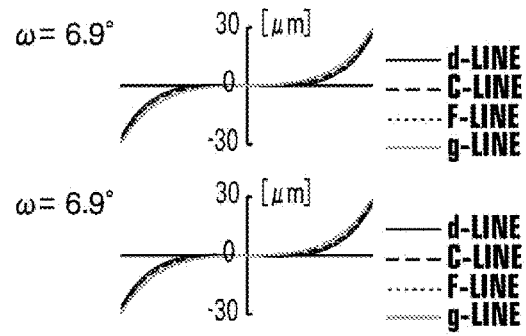
TELEPHOTO END
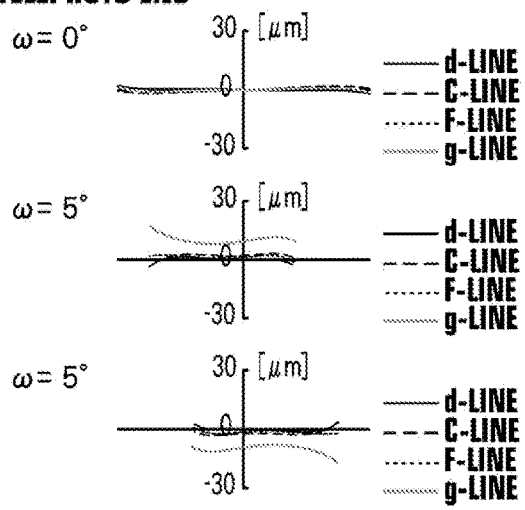
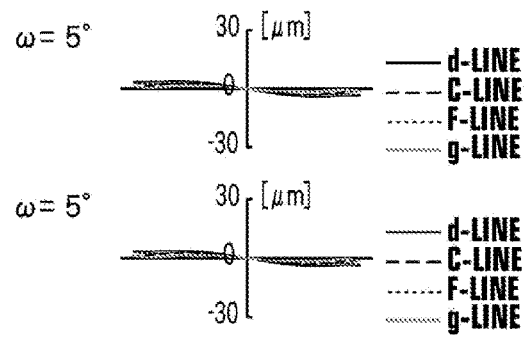

FIG.28
EXAMPLE 5
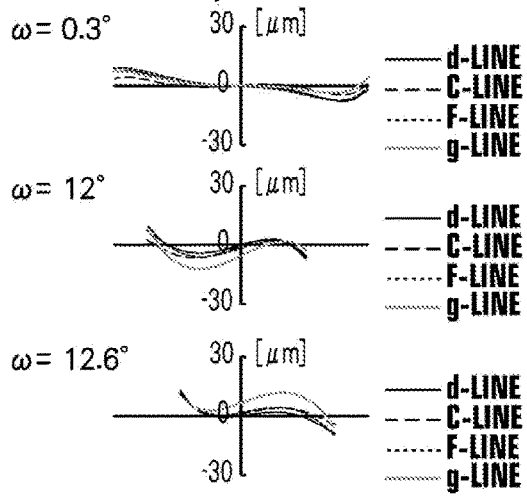
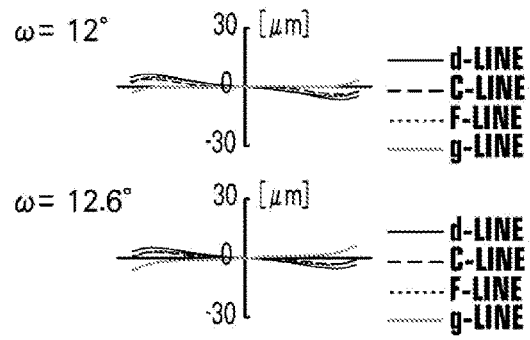
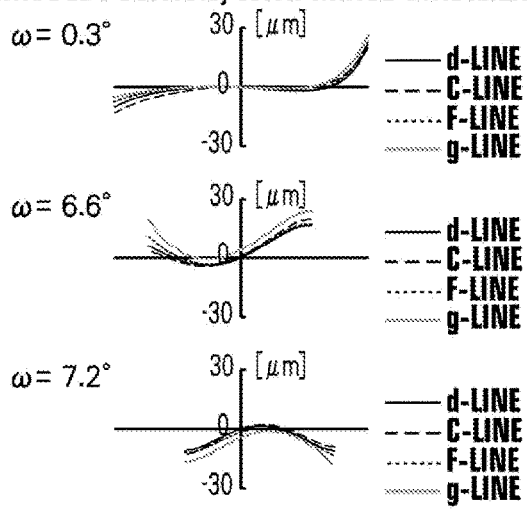
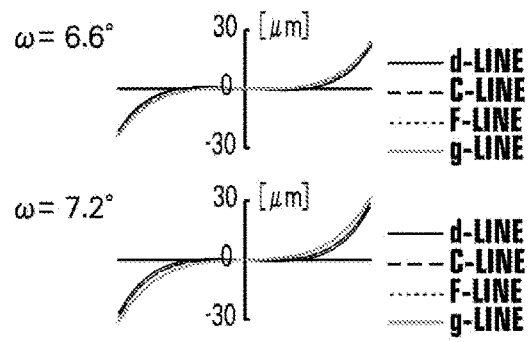
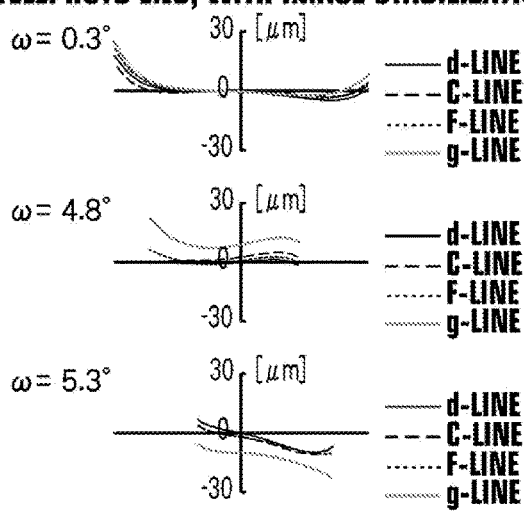
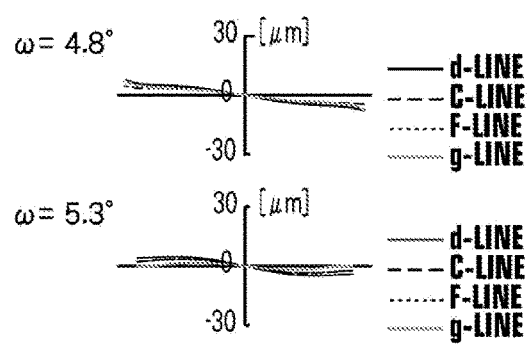

FIG.29
EXAMPLE 6
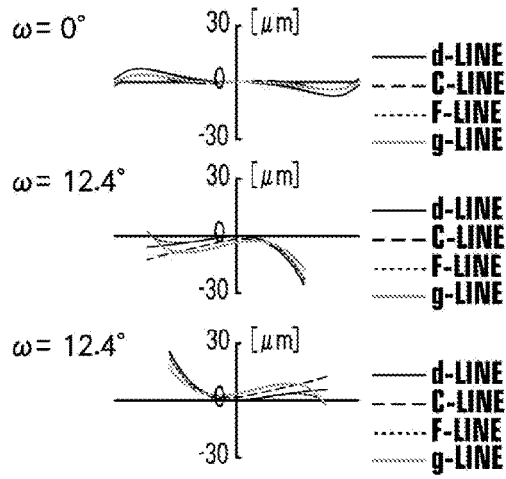
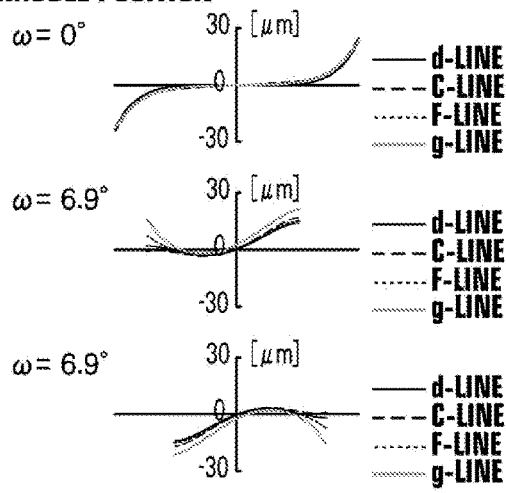
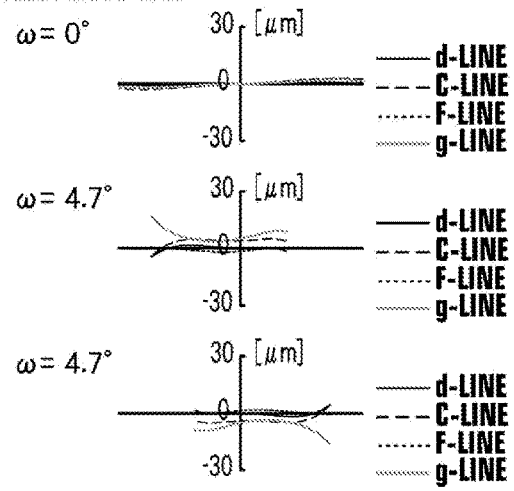
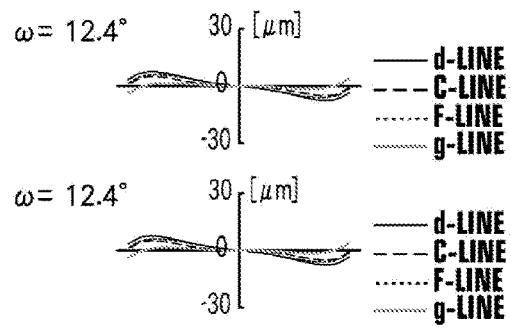
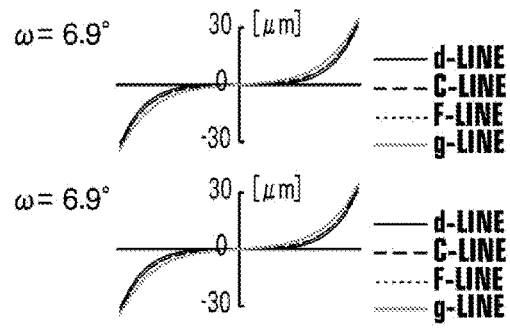
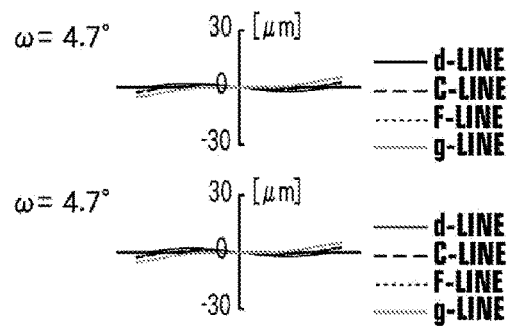

FIG.30
EXAMPLE 6
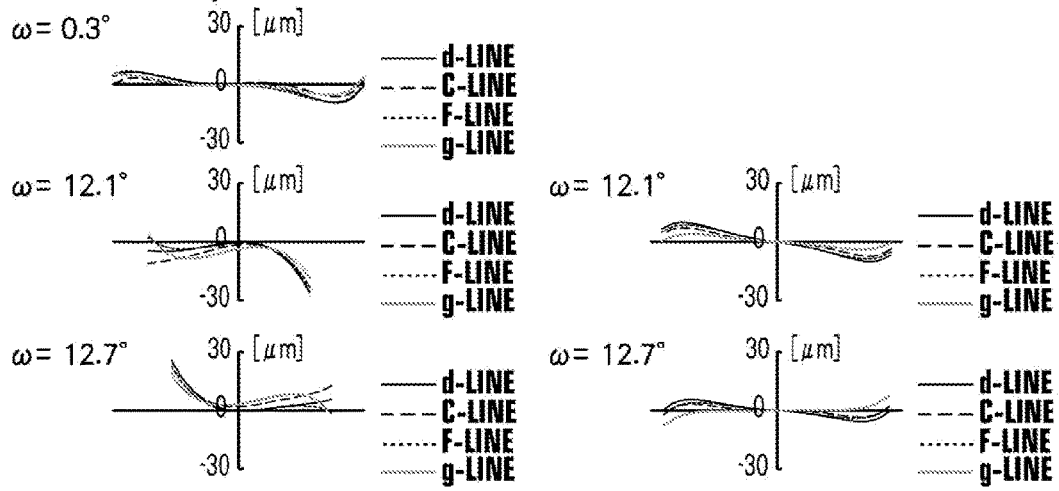
WIDE-ANGLE END, WITH IMAGE STABILIZATION
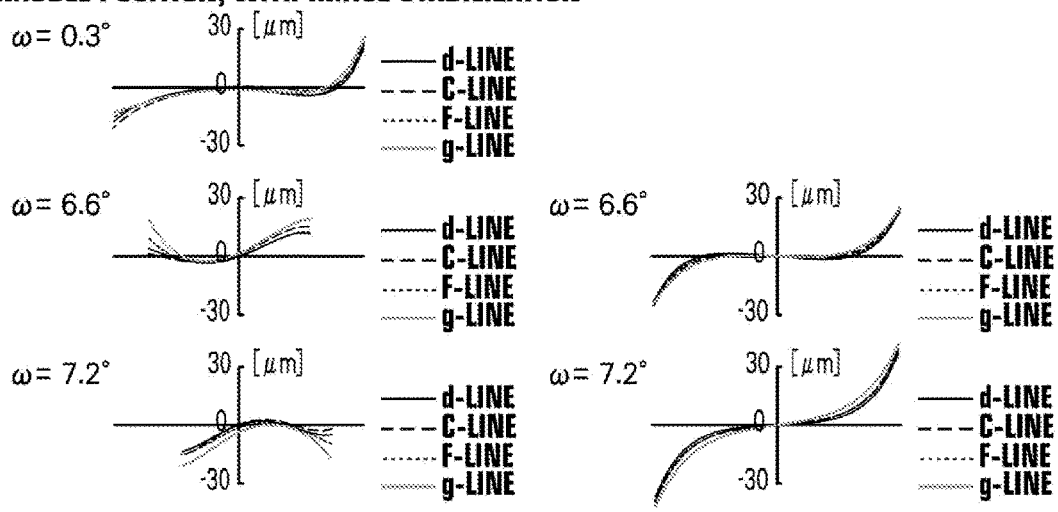
MIDDLE POSITION, WITH IMAGE STABILIZATION
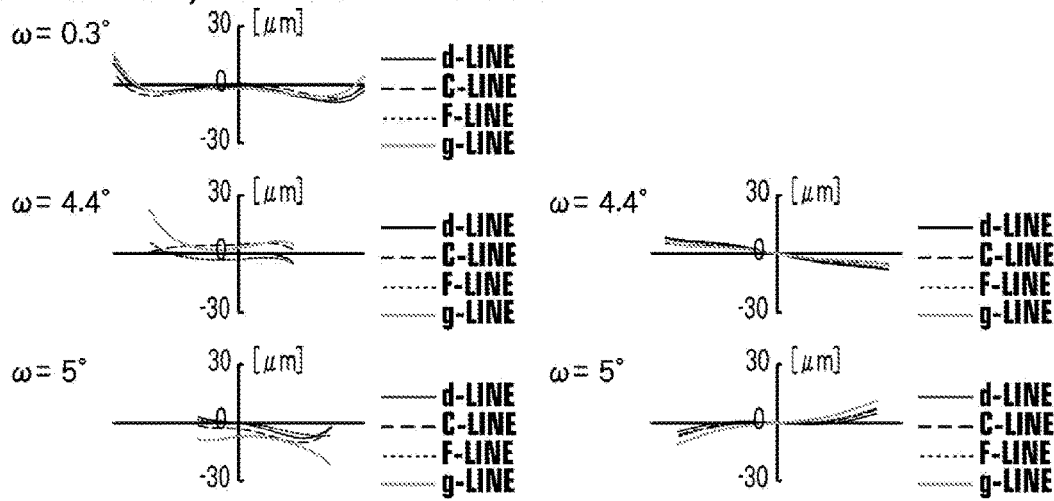
TELEPHOTO END, WITH IMAGE STABILIZATION EXAMPLE 7 FIG.31
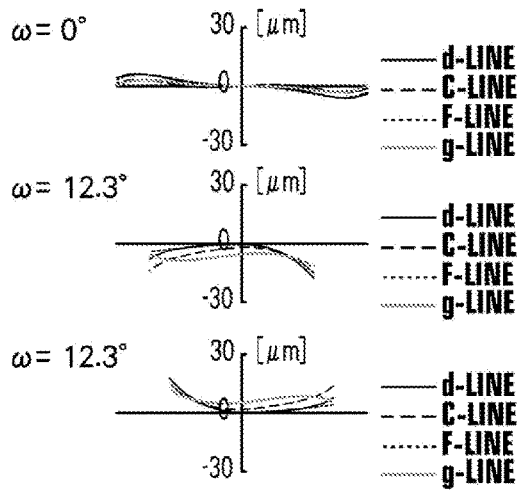
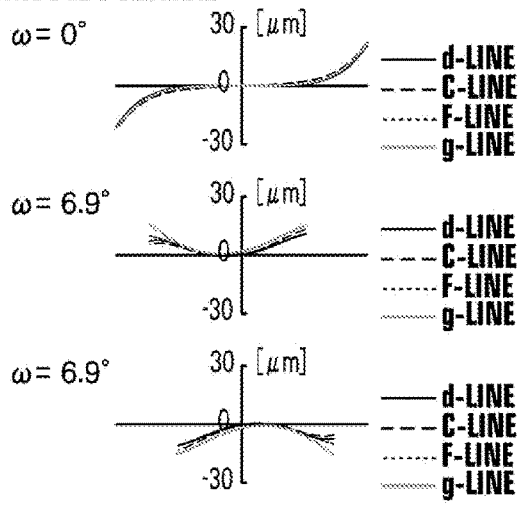
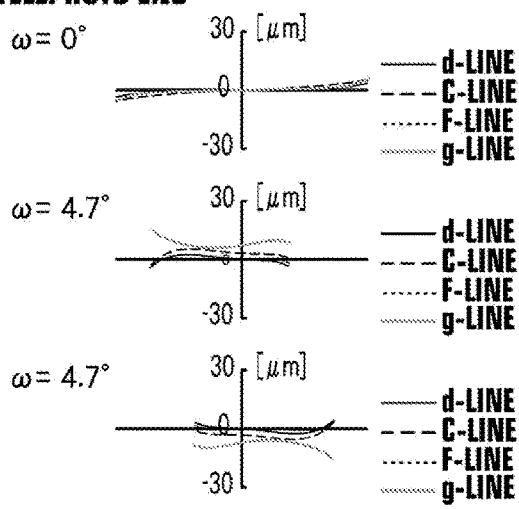
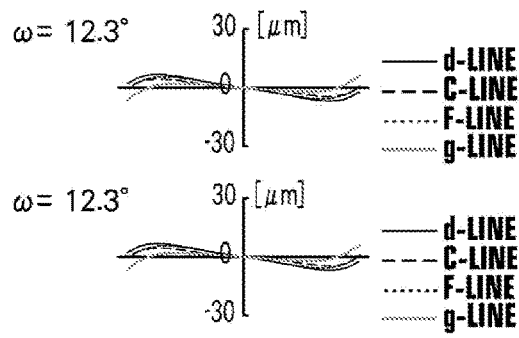
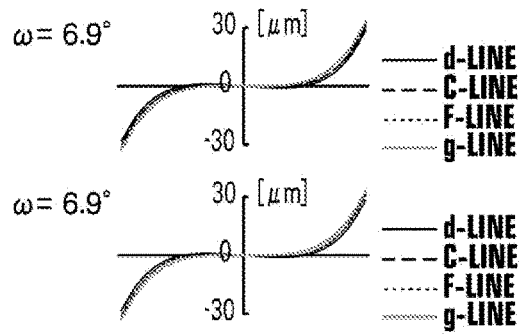
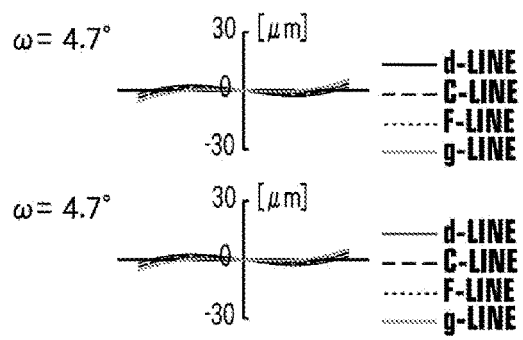

FIG.32
EXAMPLE 7
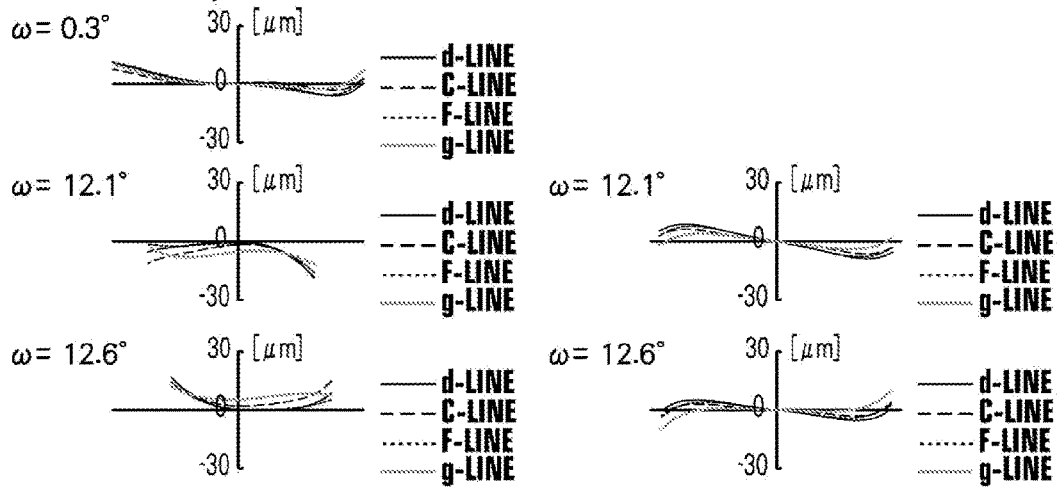
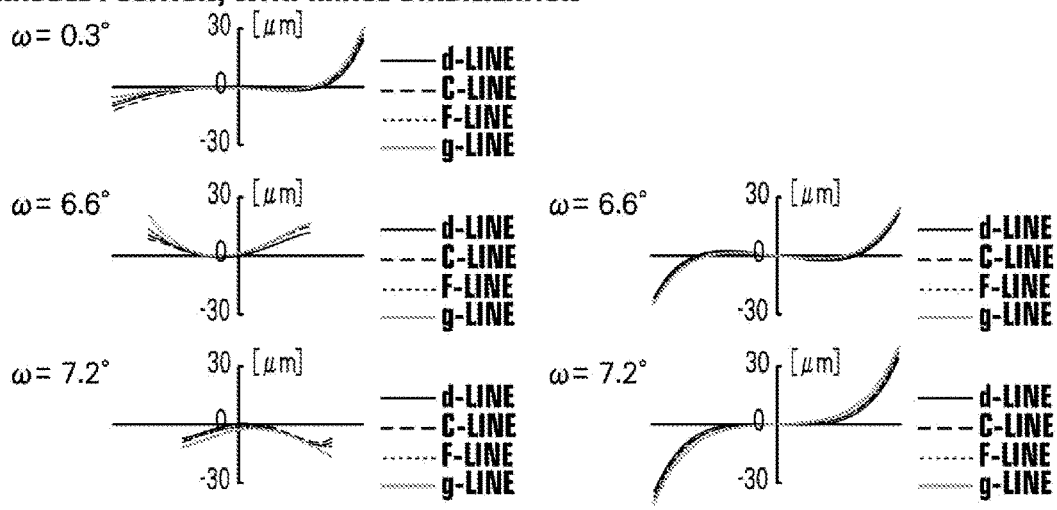
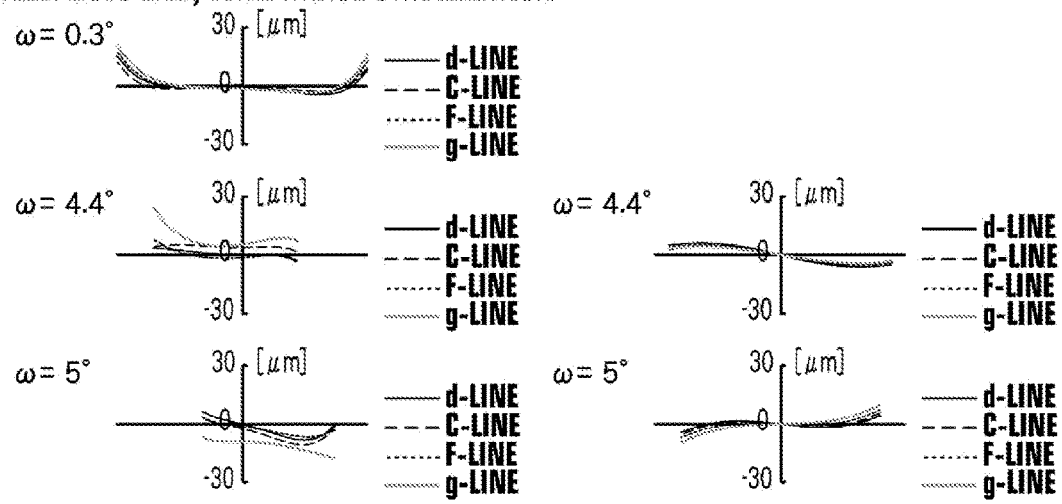

FIG. 33
EXAMPLE 8
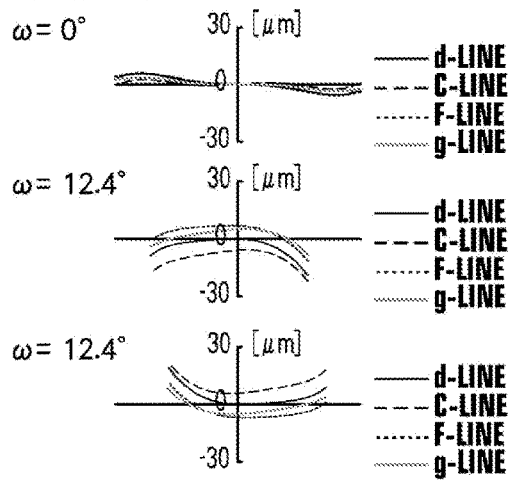
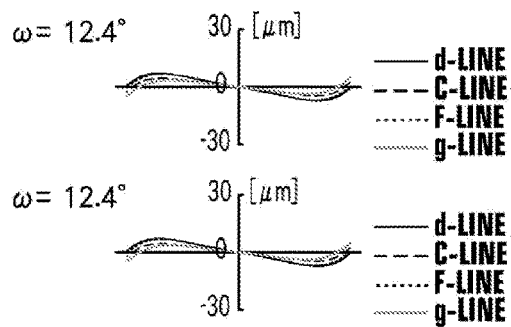
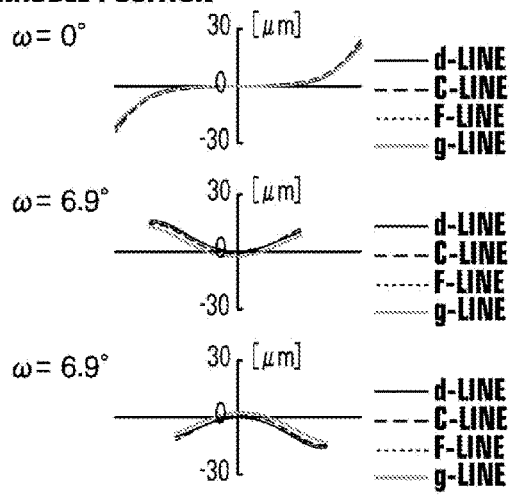
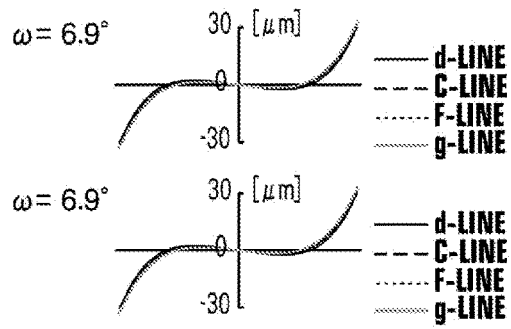
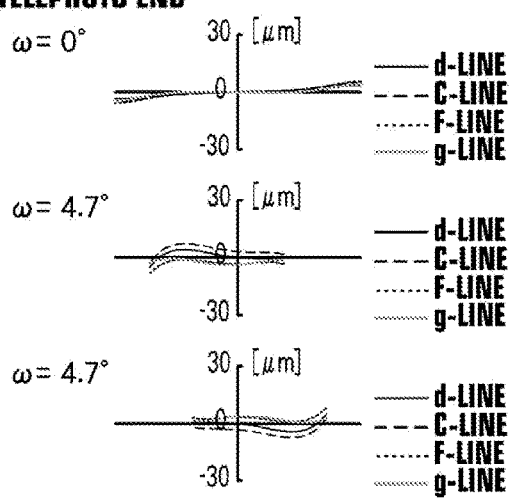
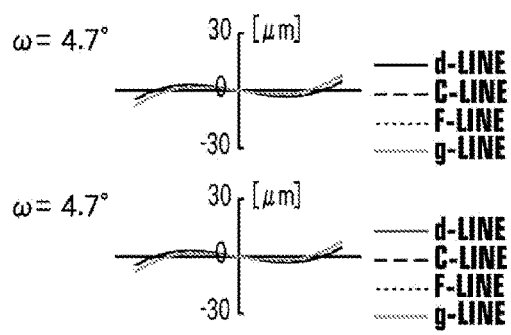

FIG.34
EXAMPLE 8
WIDE-ANGLE END, WITH IMAGE STABILIZATION
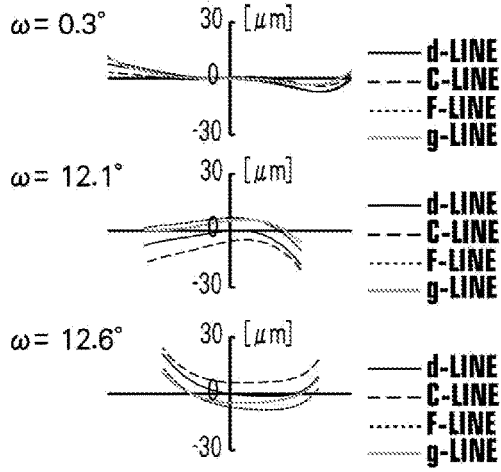
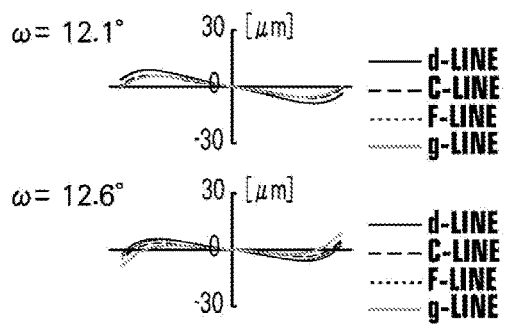
MIDDLE POSITION, WITH IMAGE STABILIZATION
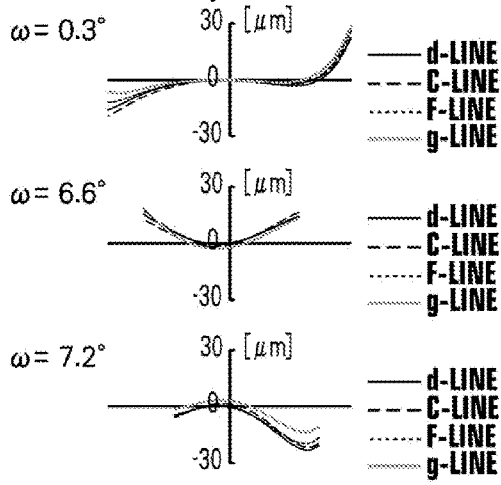
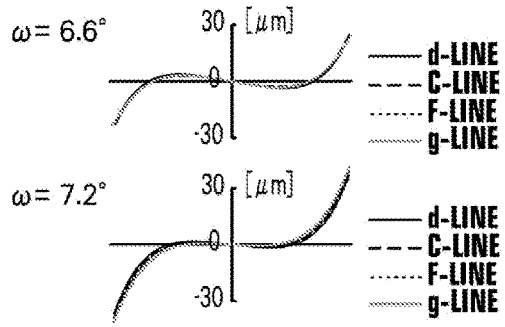
TELEPHOTO END, WITH IMAGE STABILIZATION
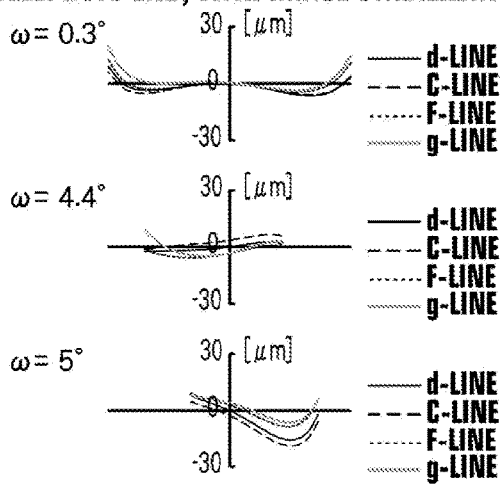
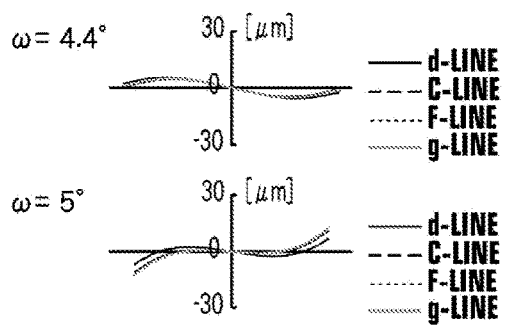

FIG.35
EXAMPLE 9
WIDE-ANGLE END
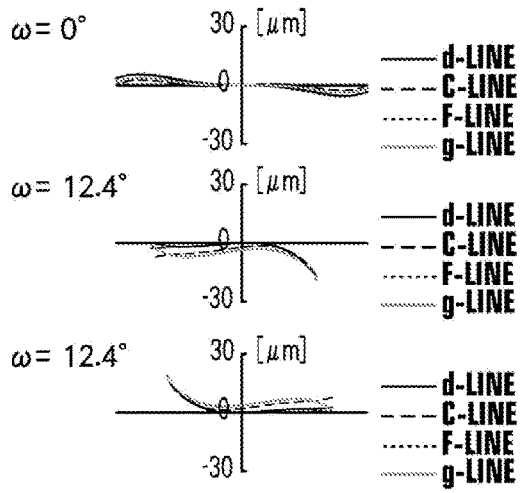
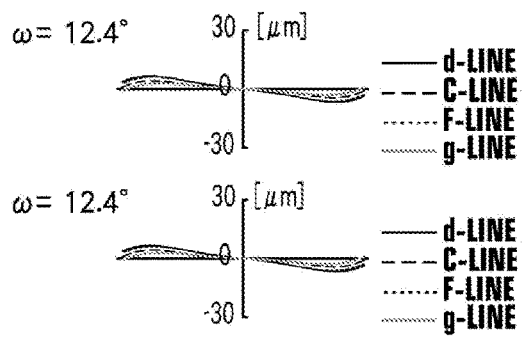
MIDDLE POSITION
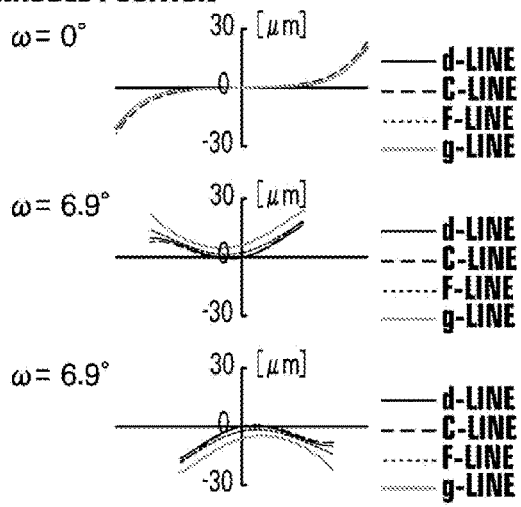
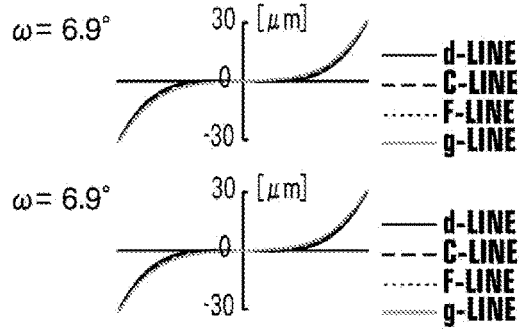
TELEPHOTO END
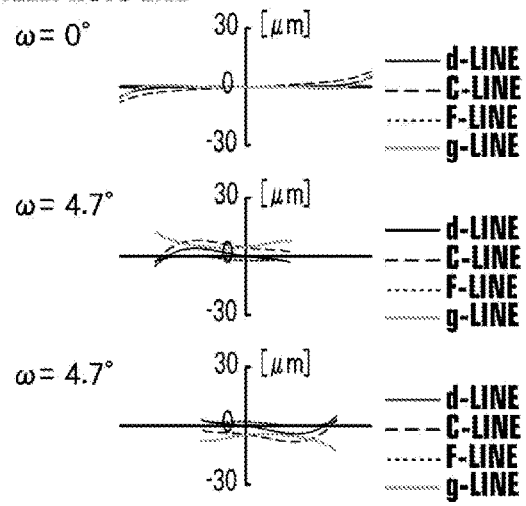
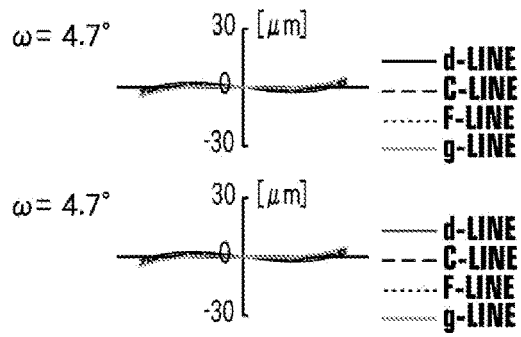

FIG.36
EXAMPLE 9
WIDE-ANGLE END, WITH IMAGE STABILIZATION
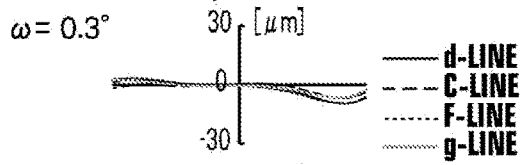
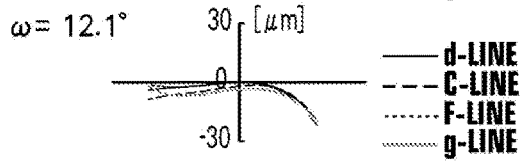
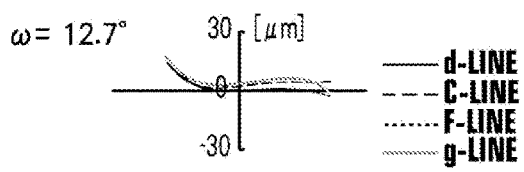
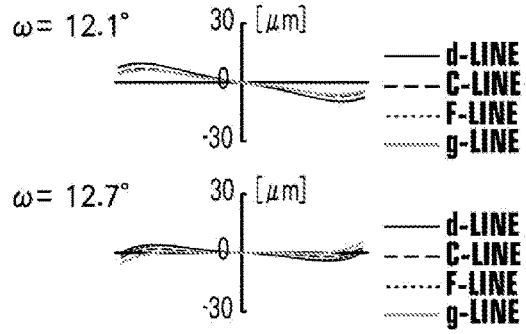
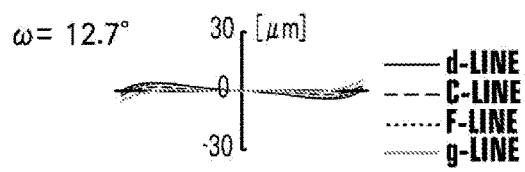
MIDDLE POSITION, WITH IMAGE STABILIZATION
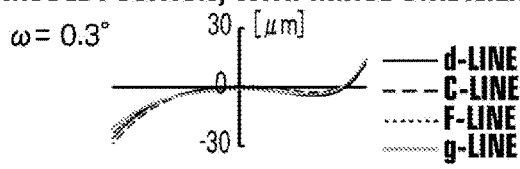
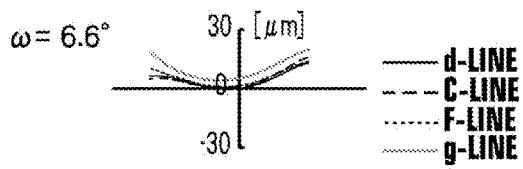
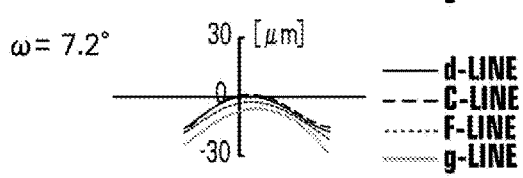
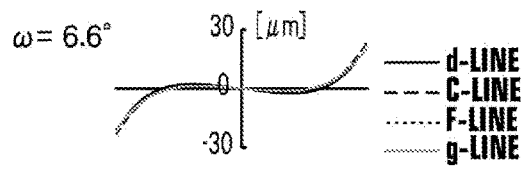
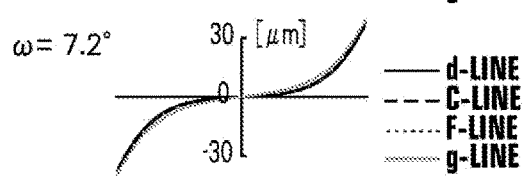
TELEPHOTO END, WITH IMAGE STABILIZATION
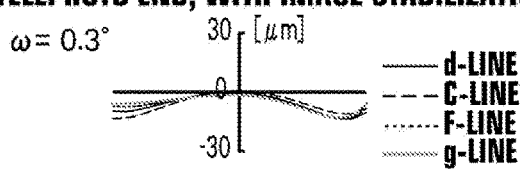
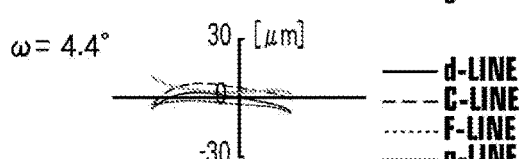
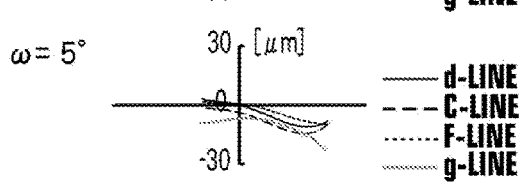
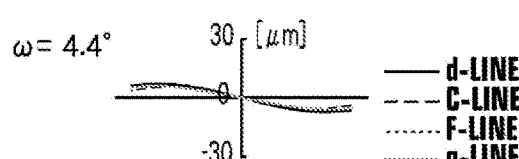
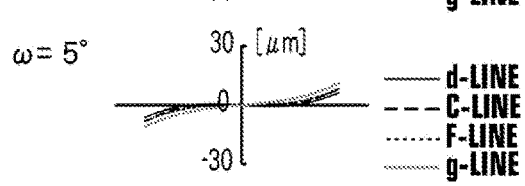

ZOOM LENS AND IMAGING APPARATUS

CROSS-REFERENCE TO RELATED APPLICATIONS

The present application claims priority under 35 U.S.C. §119 to Japanese Patent Application No. 2014-174110, filed on Aug. 28, 2014. The above application is hereby expressly incorporated by reference, in its entirety, into the present application.

BACKGROUND OF THE INVENTION

Field of the Invention

The present invention relates to a zoom lens which is suitable for use with, in particular, digital cameras, lens-replaceable digital cameras, etc., and an imaging apparatus provided with the zoom lens.

Description of the Related Art

So-called constant aperture zoom lenses having a zoom ratio of around 2.5 to 3.0, and a constant maximum aperture of around F2.8 or F4 across the entire zoom range are known.

Such a zoom lens has a four-group or five-group configuration including, for example, in order from the object side, a first lens group which has a positive refractive power and is fixed during magnification change, a second lens group which has a negative refractive power and has a strong magnification change effect, about one or two magnification change groups which are provided in addition to the second lens group and include a lens group having a positive refractive power, and a rearmost lens group which is fixed during magnification change.

In recent years, many of lenses for digital still cameras, single-lens reflex cameras, mirrorless cameras, etc., are equipped with an image stabilization mechanism, and zoom lenses of the above-described type equipped with an image stabilization mechanism are known, as taught in Japanese Unexamined Patent Publication Nos. 2011-099964, 2011-158599, and 2012-118097 (hereinafter, Patent Documents 1 to 3).

SUMMARY OF THE INVENTION

In the case where an image stabilization function is provided, it is important to reduce a load applied to the drive system by reducing the size and weight of the image stabilizing lens unit and reducing the amount of shift of the image stabilizing lens group. In order to address this problem, the rearmost lens group taught in each of Patent Documents 1 to 3 is formed by a front group having a positive refractive power, a middle group having a negative refractive power, and a rear group having a positive refractive power, and the middle group having a negative refractive power is used as the image stabilizing lens group.

By disposing the lens group having a positive refractive power in front of the image stabilizing lens group in this manner, an incident ray height on the image stabilizing lens group is reduced to achieve size reduction of the image stabilizing lens group. Further, by providing the image stabilizing lens group with a power of the opposite sign from that of the lens groups in front of and behind the image stabilizing lens group, the refractive power of the image stabilizing lens group can be increased to increase sensitivity of the image shift to shift of the image stabilizing lens group.

As described above, it is desired to achieve size reduction and weight reduction of the image stabilizing lens group and reduction of the amount of shift of the image stabilizing lens group, and it is further desired to suppress variation of chromatic aberration and suppress decentering coma along with shift of the image stabilizing lens group. Providing the image stabilizing lens group with a strong refractive power increases the sensitivity, and this allows reducing the amount of shift of the lens. In this case, however, it is difficult to suppress decentering coma, and sensitivity to assembly errors is also increased. It is therefore important to optimize the power of the image stabilizing lens group. It is also important to optimize the configuration of lens groups in front of and behind the image stabilizing lens group, which influence the refractive power (sensitivity) of the image stabilizing lens group and variation of aberrations along with shift of the lens.

Most of conventional lenses having the above-described specifications are developed as a replaceable lens for single-lens reflex cameras, and there are few such lenses optimized for use as a replaceable lens for so-called mirrorless cameras. The zoom lenses taught in Patent Documents 1 to 3 are optimized for use as replaceable lenses for single-lens reflex cameras. In the case of a replaceable lens for mirrorless cameras, it is not necessary to provide a back focus as long as that of a replaceable lens for single-lens reflex cameras, and the optimal configuration of the rearmost lens group in this case is naturally different from the conventional configuration.

In Patent Document 1, the front group of the rearmost lens group consists only of two positive lenses. In order to reduce the incident ray height on the image stabilizing lens group, to provide the image stabilizing lens group with a strong refractive power, and to achieve size reduction of the entire length of the lens, it is necessary to provide the front group of the rearmost lens group with a strong refractive power. In this case, however, it is difficult to suppress spherical aberration, coma, and chromatic aberration. In contrast, if the front group is provided with a weak refractive power to avoid the above described situation, it is difficult to ensure a sufficient power of the image stabilizing lens group and the power of the entire rearmost lens group becomes weak, resulting in a longer entire length of the optical system. The zoom lens of Patent Document 2 also has the above-described problems.

In Patent Documents 2 and 3, the image stabilizing lens group does not have a strong refractive power, and sensitivity to the image stabilizing lens group is not high. In this case, the amount of shift of the image stabilizing lens during image stabilization becomes large, or it is not expected to achieve high image stabilization effect.

In view of the above-described circumstances, the present invention is directed to providing a zoom lens having high optical performance with high sensitivity to an image stabilizing lens group and suppressed variation of aberrations during image stabilization, as well as an imaging apparatus provided with the zoom lens.

A first aspect of the zoom lens of the invention consists of four or five lens groups as a whole, which consist of, in order from the object side, a first lens group which has a positive refractive power and is fixed relative to the image plane during magnification change, a second lens group which has a negative refractive power and is moved during magnification change, one or two middle lens groups comprising a mp lens group which has a positive refractive power and is moved during magnification change, and a rearmost lens group which is disposed at the most image-side position of the entire system, has a positive refractive power and is fixed relative to the image plane during magnification change, wherein magnification change is effected by changing all distances between the adjacent lens groups, the rearmost lens group consists of, in order from the object side, a front group having a positive refractive power, a middle group having a negative refractive power, and a rear group having a positive refractive power, air spaces between the front group and the middle group, and between the middle group and the rear group are constant during magnification change and during focusing, the front group comprises at least two positive lenses and at least one negative lens, image stabilization is effected by shifting only the middle group in directions perpendicular to the optical axis direction, and the condition expressions (1) and (2) below are satisfied:

$$0.20 < FGr3/FGr < 0.45 \qquad (1), \text{ and}$$

$$1.75 < FGr1/FGr3 < 3.00 \qquad (2),$$

where FGr3 is a focal length of the rear group of the rearmost lens group, FGr is a focal length of the rearmost lens group, and FGr1 is a focal length of the front group of the rearmost lens group.

A second aspect of the zoom lens of the invention consists of four or five lens groups as a whole, which consist of, in order from the object side, a first lens group which has a positive refractive power and is fixed relative to the image plane during magnification change, a second lens group which has a negative refractive power and is moved during magnification change, one or two middle lens groups comprising a mp lens group which has a positive refractive power and is moved during magnification change, and a rearmost lens group which is disposed at the most image-side position of the entire system, has a positive refractive power and is fixed relative to the image plane during magnification change, wherein magnification change is effected by changing all distances between the adjacent lens groups, the rearmost lens group consists of, in order from the object side, a front group having a positive refractive power, a middle group having a negative refractive power, and a rear group having a positive refractive power, air spaces between the front group and the middle group, and between the middle group and the rear group are constant during magnification change and during focusing, the front group comprises at least two positive lenses, image stabilization is effected by shifting only the middle group in directions perpendicular to the optical axis direction, the rear group comprises a negative lens at the most image-side position thereof, and the condition expressions (1) and (2) below are satisfied:

$$0.20 < FGr3/FGr < 0.45 \qquad (1), \text{ and}$$

$$1.75 < FGr1/FGr3 < 3.00 \qquad (2),$$

where FGr3 is a focal length of the rear group of the rearmost lens group, FGr is a focal length of the rearmost lens group, and FGr1 is a focal length of the front group of the rearmost lens group.

It should be noted that the mp lens group is not a part of a lens group (a sub-lens group) and is one independent lens group. The "independent lens group" herein means such a lens group that the distance between the lens group and the adjacent lens group is changed during magnification change. In the case where the middle lens group consists of two lens groups, and both the two lens groups have a positive refractive power, the mp lens group may be either of the lens groups.

In the zoom lens of the invention, it is preferred that the rear group comprise, at the most image-side position thereof, a single lens having a negative meniscus shape with the concave surface toward the object side.

It is preferred that the rear group comprise a cemented lens formed by one positive lens and one negative lens which are cemented together.

It is preferred that the front group consist of three positive lenses and one negative lens.

It is preferred that the middle group consist of two negative lenses and one positive lens.

It is preferred that the most object-side lens surface of the rear group be a convex surface, and the rear group comprise a negative lens disposed at the most image-side position thereof, and a cemented lens disposed on the object side of the negative lens.

In this case, it is preferred that the rear group consist of, in order from the object side, a positive single lens, a cemented lens formed by one positive lens and one negative lens which are cemented together, and a single lens having a negative meniscus shape with the concave surface toward the object side.

It is preferred that the first lens group consist of, in order from the object side, a negative lens, a positive lens, a positive lens, and a positive lens.

It is preferred that focusing from an object at infinity to a closest object be effected by moving only the entire mp lens group or only a part of lenses forming the mp lens group along the optical axis.

It is preferred that the condition expression (3) below be satisfied:

$$0.5 < FGr1/FGr < 1.3 \qquad (3),$$

where FGr1 is a focal length of the front group of the rearmost lens group, and FGr is a focal length of the rearmost lens group.

It is preferred that the condition expression (4) below be satisfied:

$$0.25 < FGr1/Ft < 0.60 \qquad (4),$$

where FGr1 is a focal length of the front group of the rearmost lens group, and Ft is a focal length of the entire system when the zoom lens is focused on an object at infinity at the telephoto end.

It is preferred that the condition expression (5) below be satisfied:

$$0.12 < FGr3/Ft < 0.27 \qquad (5),$$

where FGr3 is a focal length of the rear group of the rearmost lens group, and Ft is a focal length of the entire system when the zoom lens is focused on an object at infinity at the telephoto end.

It is preferred that the condition expression (6) below be satisfied:

$$0.12 < BF/Ft < 0.28 \qquad (6),$$

where BF is an equivalent air distance from the rearmost lens group to the image plane, and Ft is a focal length of the entire system when the zoom lens is focused on an object at infinity at the telephoto end.

It is preferred that the condition expression (7) below be satisfied:

$$1.1 < TL/Ft < 1.6 \qquad (7),$$

where TL is an entire length of the optical system, and Ft is a focal length of the entire system when the zoom lens is focused on an object at infinity at the telephoto end. It should be noted that the entire length of the optical system herein refers to the distance from the object-side surface of the most object-side lens of the zoom lens to the image plane, where the distance from the image-side surface of the most image-side lens of the zoom lens to the image plane is an equivalent air distance.

It is preferred that the zoom lens consist of four lens groups which consist of, in order from the object side, the first lens group, the second lens group, the mp lens group, and the rearmost lens group.

An imaging apparatus of the invention comprises the above-described zoom lens of the invention.

It should be noted that the expression "consisting/consist of" as used herein means that the zoom lens may include, besides the elements recited above: lenses substantially without any power; optical elements other than lenses, such as a stop, a mask, a cover glass, and filters; and mechanical components, such as a lens flange, a lens barrel, an image sensor, an image stabilization mechanism, etc.

The sign (positive or negative) with respect to the surface shape and the refractive power of any lens including an aspheric surface are about the paraxial region.

The first aspect of the zoom lens of the invention consists of four or five lens groups as a whole, which consist of, in order from the object side, the first lens group which has a positive refractive power and is fixed relative to the image plane during magnification change, the second lens group which has a negative refractive power and is moved during magnification change, one or two middle lens groups comprising the mp lens group which has a positive refractive power and is moved during magnification change, and the rearmost lens group which is disposed at the most image-side position of the entire system, has a positive refractive power and is fixed relative to the image plane during magnification change, wherein magnification change is effected by changing all distances between the adjacent lens groups, the rearmost lens group consists of, in order from the object side, a front group having a positive refractive power, a middle group having a negative refractive power, and a rear group having a positive refractive power, air spaces between the front group and the middle group, and between the middle group and the rear group are constant during magnification change and during focusing, the front group comprises at least two positive lenses and at least one negative lens, image stabilization is effected by shifting only the middle group in directions perpendicular to the optical axis direction, and the condition expressions (1) and (2) below are satisfied:

$$0.20<FGr3/FGr<0.45 \quad (1), \text{ and}$$

$$1.75<FGr1/FGr3<3.00 \quad (2).$$

This configuration allows providing a zoom lens having high optical performance with high sensitivity to the image stabilizing lens group and suppressed variation of aberrations during image stabilization.

The second aspect of the zoom lens of the invention consists of four or five lens groups as a whole, which consist of, in order from the object side, the first lens group which has a positive refractive power and is fixed relative to the image plane during magnification change, the second lens group which has a negative refractive power and is moved during magnification change, one or two middle lens groups comprising the mp lens group which has a positive refractive power and is moved during magnification change, and the rearmost lens group which is disposed at the most image-side position of the entire system, has a positive refractive power and is fixed relative to the image plane during magnification change, wherein magnification change is effected by changing all distances between the adjacent lens groups, the rearmost lens group consists of, in order from the object side, a front group having a positive refractive power, a middle group having a negative refractive power, and a rear group having a positive refractive power, air spaces between the front group and the middle group, and between the middle group and the rear group are constant during magnification change and during focusing, the front group comprises at least two positive lenses, image stabilization is effected by shifting only the middle group in directions perpendicular to the optical axis direction, the rear group comprises a negative lens at the most image-side position thereof, and the condition expressions (1) and (2) below are satisfied:

$$0.20<FGr3/FGr<0.45 \quad (1), \text{ and}$$

$$1.75<FGr1/FGr3<3.00 \quad (2).$$

This configuration allows providing a zoom lens having high optical performance with high sensitivity to the image stabilizing lens group and suppressed variation of aberrations during image stabilization.

The imaging apparatus of the invention, which is provided with the zoom lens of the invention, can achieve a high image stabilization effect, and allows obtaining high quality images.

BRIEF DESCRIPTION OF THE DRAWINGS

FIG. 1 is a sectional view illustrating the lens configuration of a zoom lens according to one embodiment of the present invention (a zoom lens of Example 1), FIG. 2 is a sectional view illustrating the lens configuration of a zoom lens of Example 2 of the invention, FIG. 3 is a sectional view illustrating the lens configuration of a zoom lens of Example 3 of the invention, FIG. 4 is a sectional view illustrating the lens configuration of a zoom lens of Example 4 of the invention, FIG. 5 is a sectional view illustrating the lens configuration of a zoom lens of Example 5 of the invention, FIG. 6 is a sectional view illustrating the lens configuration of a zoom lens of Example 6 of the invention, FIG. 7 is a sectional view illustrating the lens configuration of a zoom lens of Example 7 of the invention, FIG. 8 is a sectional view illustrating the lens configuration of a zoom lens of Example 8 of the invention, FIG. 9 is a sectional view illustrating the lens configuration of a zoom lens of Example 9 of the invention, FIG. 10 shows aberration diagrams of the zoom lens of Example 1 of the invention, FIG. 11 shows aberration diagrams of the zoom lens of Example 2 of the invention, FIG. 12 shows aberration diagrams of the zoom lens of Example 3 of the invention, FIG. 13 shows aberration diagrams of the zoom lens of Example 4 of the invention, FIG. 14 shows aberration diagrams of the zoom lens of Example 5 of the invention, FIG. 15 shows aberration diagrams of the zoom lens of Example 6 of the invention, FIG. 16 shows aberration diagrams of the zoom lens of Example 7 of the invention, FIG. 17 shows aberration diagrams of the zoom lens of Example 8 of the invention, FIG. 18 shows aberration diagrams of the zoom lens of Example 9 of the invention, FIG. 19 shows lateral aberration diagrams of the zoom lens of Example 1 of the invention, FIG. 20 shows lateral aberration diagrams of the zoom lens of Example 1 of the invention (with image stabilization), FIG. 22 shows lateral aberration diagrams of the zoom lens of Example 2 of the invention (with image stabilization), FIG. 23 shows lateral aberration diagrams of the zoom lens of Example 3 of the invention, FIG. 24 shows lateral aberration diagrams of the zoom lens of Example 3 of the invention (with image stabilization), FIG. 25 shows lateral aberration diagrams of the zoom lens of Example 4 of the invention, FIG. 26 shows lateral aberration diagrams of the zoom lens of Example 4 of the invention (with image stabilization), FIG. 27 shows lateral aberration diagrams of the zoom lens of Example 5 of the invention, FIG. 28 shows lateral aberration diagrams of the zoom lens of Example 5 of the invention (with image stabilization), FIG. 29 shows lateral aberration diagrams of the zoom lens of Example 6 of the invention, FIG. 30 shows lateral aberration diagrams of the zoom lens of Example 6 of the invention (with image stabilization), FIG. 31 shows lateral aberration diagrams of the zoom lens of Example 7 of the invention, FIG. 32 shows lateral aberration diagrams of the zoom lens of Example 7 of the invention (with image stabilization), FIG. 33 shows lateral aberration diagrams of the zoom lens of Example 8 of the invention, FIG. 34 shows lateral aberration diagrams of the zoom lens of Example 8 of the invention (with image stabilization), FIG. 35 shows lateral aberration diagrams of the zoom lens of Example 9 of the invention, FIG. 36 shows lateral aberration diagrams of the zoom lens of Example 9 of the invention (with image stabilization)

DESCRIPTION OF THE PREFERRED EMBODIMENTS

Figure 21:
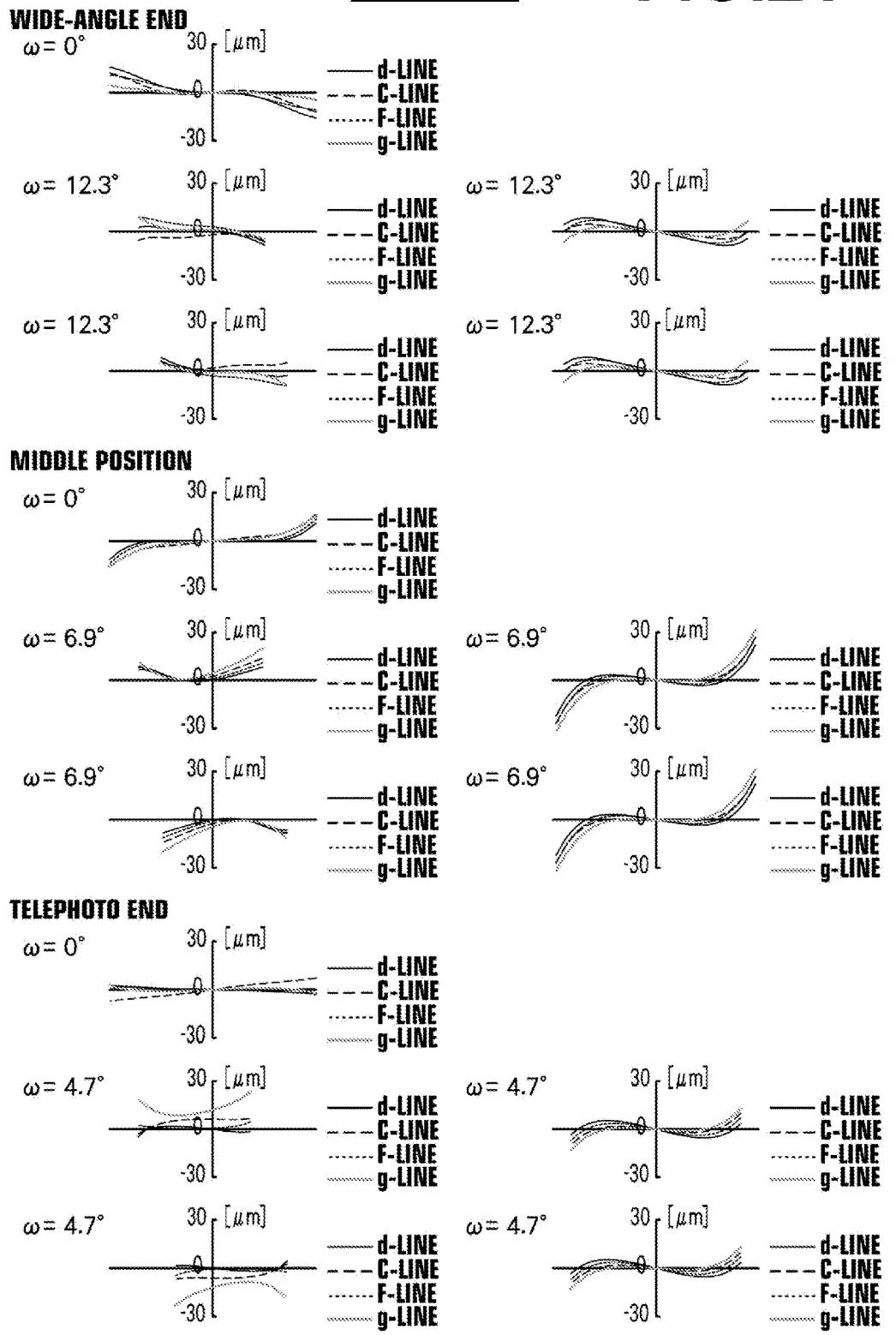
FIG. 21 shows lateral aberration diagrams of the zoom lens of Example 2 of the invention.

Hereinafter, an embodiment of the present invention will be described in detail with reference to the drawings. FIG. 1 is a sectional view illustrating the lens configuration of a zoom lens according to one embodiment of the invention. The configuration example shown in FIG. 1 is the same as the configuration of a zoom lens of Example 1, which will be described later. In FIG. 1, the left side is the object side and the right side is the image side. An aperture stop St shown in the drawing does not necessarily represent the size and the shape thereof, but represents the position thereof along the optical axis Z. The symbol "Focus" in the drawing denotes a focusing lens group used to effect focusing, and the symbol "Ois" denotes an image stabilizing lens group used to effect image stabilization.

As shown in FIG. 1, this zoom lens consists of, in order from the object side, a first lens group G1 which has a positive refractive power and is fixed relative to the image plane Sim during magnification change, a second lens group G2 which has a negative refractive power and is moved during magnification change, a third lens group G3 (which corresponds to an mp lens group of the invention) which has a positive refractive power and is moved during magnification change, and a fourth lens group G4 (the rearmost lens group) which has a positive refractive power and is fixed relative to the image plane Sim during magnification change, wherein magnification change is effected by changing all distances between the adjacent lens groups.

Fixing the first lens group G1 and the fourth lens group G4 (the rearmost lens group) during magnification change is advantageous for forming a so-called constant aperture zoom lens. Also, fixing the first lens group G1 facilities employing a dustproof, weather sealed structure.

When this zoom lens is used with an imaging apparatus, it is preferred to provide a cover glass, a prism, and various filters, such as an infrared cutoff filter and a low-pass filter, etc., between the optical system and the image plane Sim depending on the configuration of the camera on which the lens is mounted. In the example shown in FIG. 1, an optical member PP in the form of a plane-parallel plate, which is assumed to represent such elements, is disposed between the lens system and the image plane Sim.

The fourth lens group G4 (the rearmost lens group) consists of, in order from the object side, a front group having a positive refractive power (lenses L41 to L44), a middle group having a negative refractive power (lenses L45 to L47, denoted by "Ois" in FIG. 1), and a rear group having a positive refractive power (lenses L48 to L51), wherein the air spaces between the front group and the middle group, and between the middle group and the rear group are constant during magnification change and during focusing.

The front group includes at least two positive lenses. Image stabilization is effected by shifting only the middle group in directions perpendicular to the optical axis direction. The rear group includes a negative lens at the most image-side position thereof.

The front group including at least two positive lenses allows successfully correcting spherical aberration and coma even when the front group and the middle group, which is the image stabilizing lens group, are provided with a strong power. When the front group includes at least one negative lens in addition to the at least two positive lenses, successful correction of chromatic aberration can be achieved.

Further, the negative lens disposed at the most image-side position of the rear group allows increasing the outgoing ray angle of the marginal ray to reduce the entire length of the lens. This configuration is particularly suitable for a case, such as the case of a replaceable lens for so-called mirrorless cameras, where it is not necessary to provide a back focus as long as that of a replaceable lens for single-lens reflex cameras.

In the fourth lens group G4 (the rearmost lens group), the ray height is reduced by the front group having a positive refractive power to achieve size reduction and weight reduction of the middle group, which is the image stabilizing lens group, and the front group and the middle group have refractive powers of the opposite signs from each other to allow providing the image stabilizing lens group with a strong refractive power to increase the sensitivity of the image shift. This allows providing a large image stabilization effect by a small amount of shift.

The zoom lens of the invention satisfies the condition expressions (1) and (2) below.

$$0.20 < FGr3/FGr < 0.45 \quad (1),$$

$$0.23 < FGr3/FGr < 0.45 \quad (1\text{-}1),$$

$$1.75 < FGr1/FGr3 < 3.00 \quad (2),$$

$$1.80 < FGr1/FGr3 < 2.80 \quad (2\text{-}1),$$

where FGr3 is a focal length of the rear group of the rearmost lens group, FGr is a focal length of the rearmost lens group, and FGr1 is a focal length of the front group of the rearmost lens group.

The condition expression (1) defines the ratio of the power of the rear group in the fourth lens group G4 (the rearmost lens group). Satisfying the lower limit of the condition expression (1) allows preventing the refractive power of the rear group from becoming excessively strong, and this is advantageous for correcting coma and distortion. Alternatively, satisfying the lower limit of the condition expression (1) facilitates obtaining a necessary back focus. Satisfying the upper limit of the condition expression (1) allows preventing the refractive power of the fourth lens group G4 (the rearmost lens group) from becoming excessively weak, and this is advantageous for correcting astigmatism. Also, satisfying the upper limit of the condition expression (1) is advantageous for reducing the entire length of the lens.

The condition expression (2) defines the ratio of the power of the front group to the power of the rear group in the fourth lens group G4 (the rearmost lens group). Satisfying the lower limit of the condition expression (2) allows preventing the refractive power of the front group from becoming excessively strong, and this is advantageous for correcting spherical aberration and coma. Satisfying the upper limit of the condition expression (2) allows preventing the refractive power of the rear group from becoming excessively strong, and this is advantageous for correcting coma and distortion. Alternatively, satisfying the upper limit of the condition expression (2) allows preventing the refractive power of the front group from becoming excessively weak. This allows keeping the incident ray height on the middle group, which is the image stabilizing lens group, small, and providing the middle group with a strong refractive power, which are advantageous for size reduction of the image stabilizing lens unit. That is, satisfying the condition expression (2) allows achieving correction of aberrations and size reduction of the image stabilization group without increasing the size of the lens.

It should be noted that higher performance can be obtained when the condition expression (1-1) and/or (2-1) is satisfied.

In the zoom lens this embodiment, it is preferred that the rear group include, at the most image-side position thereof, a single lens having a negative meniscus shape with the concave surface toward the object side. The rear group including a negative lens at the most image-side position allows increasing the outgoing ray angle of the marginal ray, and this allows reducing the entire length of the lens. This configuration is particularly suitable for a case, such as the case of a replaceable lens for so-called mirrorless cameras, where it is not necessary to provide a back focus as long as that of a replaceable lens for single-lens reflex cameras. The negative meniscus shape with the concave surface toward the object side is advantageous for correcting field curvature and distortion.

It is preferred that the rear group include a cemented lens formed by one positive lens and one negative lens which are cemented together. Disposing the cemented lens in the rear group allows successfully correcting lateral chromatic aberration.

It is preferred that the front group consist of three positive lenses and one negative lens. This configuration allows successfully correcting spherical aberration and chromatic aberration even when the front group is provided with a strong refractive power to reduce the incident ray height on the image stabilizing lens group and to reduce the entire length of the optical system.

It is preferred that the middle group consist of two negative lenses and one positive lens. This configuration allows suppressing variation of aberrations during image stabilization.

It is preferred that the most object-side lens surface in the rear group be a convex surface, a negative lens be disposed at the most image-side position of the rear group, and a cemented lens be disposed on the object side of the negative lens. In order to increase sensitivity to the middle group, which is the image stabilizing lens group, it is necessary to provide the middle group with a strong negative refractive power. By once reducing the angle of the marginal ray going out from the middle group with the most object-side convex surface of the rear group, and disposing the cemented lens next to the convex surface, successful correction of aberrations, such as chromatic aberration, can be achieved. Further, the negative lens at the most image-side position allows increasing the outgoing ray angle of the marginal ray, and this allows reducing the entire length of the lens.

In this case, it is preferred that the rear group consist of, in order from the object side, a positive single lens, a cemented lens formed by one positive lens and one negative lens which are cemented together, and a single lens having a negative meniscus shape with the concave surface toward the object side. This configuration allows achieving the rear group having high optical performance with the minimum number of lenses, thereby allowing reducing the entire length of the lens and cost reduction.

It is preferred that the first lens group G1 consist of, in order from the object side, a negative lens, a positive lens, a positive lens, and a positive lens. The first lens group G1 including three positive lenses in this manner allows successfully correcting chromatic aberration and spherical aberration, in particular, at the telephoto side. Further, in a case where the first lens group G1 as a whole is provided with a strong power for the purpose of size reduction, etc., the above-described configuration allows distributing the power among the lenses, thereby reducing aberrations occurring at each lens surface.

It is preferred that focusing from an object at infinity to a closest object be effected by moving only the entire third lens group G3 (the mp lens group) or only a part of lenses forming the third lens group G3 (the mp lens group) along the optical axis. Employing the above-described inner focusing system allows weight reduction of the focusing lens to thereby allow speeding up the autofocus operation. Further, effecting focusing by moving the entire third lens group G3 (the mp lens group) allows suppressing variation of aberrations during focusing.

It is preferred that the condition expression (3) below be satisfied. Satisfying the lower limit of the condition expression (3) allows preventing the refractive power of the front group from becoming excessively weak. This allows keeping the incident ray height on the middle group, which is the image stabilizing lens group, small, and proving the middle group with a strong refractive power, which are advantageous for size reduction of the image stabilizing lens unit. This is also advantageous for reducing the entire length of the lens. Satisfying the upper limit of the condition expression (3) allows preventing the refractive power of the front group from becoming excessively strong, and this is advantageous for correcting spherical aberration and coma. It should be noted that higher performance can be obtained when the condition expression (3-1) below is satisfied.

$$0.5 < FGr1/FGr < 1.3 \quad (3),$$

$$0.58 < FGr1/FGr < 1.15 \quad (3-1),$$

where FGr1 is a focal length of the front group of the rearmost lens group, and FGr is a focal length of the rearmost lens group.

It is preferred that the condition expression (4) below be satisfied. Satisfying the lower limit of the condition expression (4) allows preventing the refractive power of the front group from becoming excessively weak. This allows keeping the incident ray height on the middle group, which is the image stabilizing lens group, small, and providing the middle group with a strong refractive power, which are advantageous for size reduction of the image stabilizing lens unit. This is also advantageous for reducing the entire length of the lens. Satisfying the upper limit of the condition expression (4) allows preventing the refractive power of the front group from becoming excessively strong, and this is advantageous for correcting spherical aberration and coma. It should be noted that higher performance can be obtained when the condition expression (4-1) below is satisfied.

$$0.25 < FGr1/Ft < 0.60 \quad (4),$$

$$0.29 < FGr1/Ft < 0.55 \quad (4-1),$$

where FGr1 is a focal length of the front group of the rearmost lens group, and Ft is a focal length of the entire system when the zoom lens is focused on an object at infinity at the telephoto end.

It is preferred that the condition expression (5) below be satisfied. Satisfying the lower limit of the condition expression (5) allows preventing the refractive power of the rear group from becoming excessively strong, and this is advantageous for correcting coma and distortion. Satisfying the upper limit of the condition expression (5) allows preventing the refractive power of the rear group from becoming excessively weak. This is advantageous for reducing the entire length of the lens, and facilitates providing the middle group, which is the image stabilizing lens group, with a strong refractive power. It should be noted that higher performance can be obtained when the condition expression (5-1) below is satisfied.

$$0.12 < FGr3/Ft < 0.27 \quad (5),$$

$$0.14 < FGr3/Ft < 0.25 \quad (5-1),$$

where FGr3 is a focal length of the rear group of the rearmost lens group, and Ft is a focal length of the entire system when the zoom lens is focused on an object at infinity at the telephoto end.

It is preferred that the condition expression (6) below be satisfied. Satisfying the lower limit of the condition expression (6) facilitates ensuring a flange back (flange focal length) necessary for a lens replaceable camera, and eliminates necessity of providing each lens group with a strong refractive power for the purpose of size reduction, thereby facilitating correction of aberrations. Satisfying the upper limit of the condition expression (6) is advantageous for reducing the entire length of the lens. It should be noted that higher performance can be obtained when the condition expression (6-1) below is satisfied.

$$0.12 < BF/Ft < 0.28 \quad (6),$$

$$0.14 < BF/Ft < 0.25 \quad (6-1),$$

where BF is an equivalent air distance from the rearmost lens group to the image plane, and Ft is a focal length of the entire system when the zoom lens is focused on an object at infinity at the telephoto end.

It is preferred that the condition expression (7) below be satisfied. Satisfying the lower limit of the condition expression (7) facilitates ensuring optical performance. Satisfying the upper limit of the condition expression (7) is advantageous for size reduction of the lens system. It should be noted that higher performance can be obtained when the condition expression (7-1) below is satisfied.

$$1.1 < TL/Ft < 1.6 \quad (7),$$

$$1.15 < TL/Ft < 1.55 \quad (7-1),$$

where TL is an entire length of the optical system, and Ft is a focal length of the entire system when the zoom lens is focused on an object at infinity at the telephoto end.

It is preferred that the zoom lens of the invention consist of four lens groups which consist of, in order from the object side, the first lens group, the second lens group, the mp lens group, and the rearmost lens group. Minimizing the number of lens groups and forming the zoom lens having the above-described four-group configuration allows simplifying the frame structure, and reducing influence of decentering.

In a case where the zoom lens is used in a harsh environment, it is preferred that the zoom lens be provided with a protective multi-layer coating. Besides the protective coating, the zoom lens may be provided with an antireflection coating for reducing ghost light, etc., during use.

In the example shown in FIG. 1, the optical member PP is disposed between the lens system and the image plane Sim. However, in place of disposing the various filters, such as a lowpass filter and a filter that cuts off a specific wavelength range, between the lens system and the image plane Sim, the various filters may be disposed between the lenses, or coatings having the same functions as the various filters may be applied to the lens surfaces of some of the lenses.

Next, numerical examples of the zoom lens of the invention are described.

First, a zoom lens of Example 1 is described. FIG. 1 is a sectional view illustrating the lens configuration of the zoom lens of Example 1. It should be noted that, in FIG. 1, and FIGS. 2 to 9 corresponding to Examples 2 to 9, which will be described later, the left side is the object side and the right side is the image side. The aperture stop St shown in the drawings does not necessarily represent the size and the shape thereof, but represents the position thereof along the optical axis Z. The symbol "Focus" in the drawings denotes a focusing lens group used to effect focusing, and the symbol "Ois" denotes an image stabilizing lens group used to effect image stabilization.

The zoom lens of Example 1 has a four-group configuration which consists of, in order from the object side, a first lens group G1 having a positive refractive power, a second lens group G2 having a negative refractive power, a third lens group G3 (the mp lens group) having a positive refractive power, and a fourth lens group G4 (the rearmost lens group) having a positive refractive power.

Table 1 shows basic lens data of the zoom lens of Example 1, Table 2 shows data about specifications of the zoom lens, and Table 3 shows data about distances between surfaces to be moved of the zoom lens. In the following description, meanings of symbols used in the tables are explained with respect to Example 1 as an example. The same explanations basically apply to those with respect to Examples 2 to 9.

In the lens data shown in Table 1, each value in the column of "Surface No." represents a surface number, where the object-side surface of the most object-side element is the 1st surface and the number is sequentially increased toward the image side, each value in the column of "Radius of Curvature" represents the radius of curvature of the corresponding surface, and each value in the column of "Surface Distance" represents the distance along the optical axis Z between the corresponding surface and the next surface. Each value in the column of "nd" represents the refractive index with respect to the d-line (the wavelength of 587.6 nm) of the corresponding optical element, each value in the column of "vd" represents the Abbe number with respect to the d-line (the wavelength of 587.6 nm) of the corresponding optical element, and each value in the column of "θgF" represents the partial dispersion ratio of the corresponding optical element.

It should be noted that the partial dispersion ratio θgF is expressed by the formula below:

$$\theta gF=(ng-nF)/(nF-nC),$$

where ng is a refractive index with respect to the g-line (the wavelength of 435.8 nm), nF is a refractive index with respect to the F-line (the wavelength of 486.1 nm), and nC is a refractive index with respect to the C-line (the wavelength of 656.3 nm).

The sign with respect to the radius of curvature is provided such that a positive radius of curvature indicates a surface shape that is convex toward the object side, and a negative radius of curvature indicates a surface shape that is convex toward the image side. The basic lens data also includes data of the aperture stop St and the optical member PP, and the surface number and the text "(stop)" are shown at the position in the column of the surface number corresponding to the aperture stop St. In the lens data shown in Table 1, the value of each surface distance that is changed during magnification change is represented by the symbol "DD[surface number]". The numerical values corresponding to each DD[surface number] at the wide-angle end, at the middle position, and at the telephoto end are shown in Table 3.

The data about specifications shown in Table 2 show values of zoom magnification, focal length f, back focus Bf, F-number FNo., and total angle of view 2ω at the wide-angle end, at the middle position, and at the telephoto end.

With respect to the basic lens data, the data about specifications, and the data about distances between surfaces to be moved, the unit of angle is degrees, and the unit of length is millimeters; however, any other suitable units may be used since optical systems are usable when they are proportionally enlarged or reduced.

TABLE 1

Example 1 - Lens Data

| Surface No. | Radius of Curvature | Surface Distance | nd | vd | θgF |
|---|---|---|---|---|---|
| 1 | 274.96102 | 2.390 | 1.80100 | 34.97 | 0.58642 |
| 2 | 77.90148 | 7.850 | 1.49700 | 81.54 | 0.53748 |
| 3 | −1203.47290 | 0.200 | | | |
| 4 | 97.12166 | 5.000 | 1.43875 | 94.94 | 0.53433 |
| 5 | 3892.40898 | 0.200 | | | |
| 6 | 62.76476 | 6.000 | 1.49700 | 81.54 | 0.53748 |
| 7 | 583.05158 | DD[7] | | | |
| 8 | 110.71627 | 5.710 | 1.72047 | 34.71 | 0.58350 |
| 9 | −42.66766 | 1.550 | 1.62230 | 53.17 | 0.55424 |
| 10 | 24.37958 | 4.958 | | | |
| 11 | −78.43069 | 1.260 | 1.49700 | 81.54 | 0.53748 |
| 12 | 25.54612 | 5.501 | 1.84661 | 23.88 | 0.62072 |
| 13 | 105.31259 | 4.001 | | | |
| 14 | −28.87373 | 1.250 | 1.91082 | 35.25 | 0.58224 |
| 15 | 391.32559 | DD[15] | | | |
| 16 | −349.16836 | 2.950 | 1.80100 | 34.97 | 0.58642 |
| 17 | −38.22034 | 0.100 | | | |
| 18 | 63.65733 | 4.310 | 1.61800 | 63.33 | 0.54414 |
| 19 | −39.25049 | 1.150 | 1.80518 | 25.42 | 0.61616 |
| 20 | ∞ | DD[20] | | | |
| 21 (stop) | ∞ | 1.300 | | | |
| 22 | 27.59915 | 6.985 | 1.49700 | 81.54 | 0.53748 |
| 23 | −58.46986 | 0.150 | | | |
| 24 | 34.60348 | 2.550 | 1.65412 | 39.68 | 0.57378 |
| 25 | 95.96990 | 1.610 | | | |
| 26 | −53.62431 | 1.210 | 1.90366 | 31.31 | 0.59481 |
| 27 | 22.84961 | 6.512 | 1.49700 | 81.54 | 0.53748 |
| 28 | −84.57206 | 2.500 | | | |
| 29 | 293.69564 | 3.771 | 1.80518 | 25.42 | 0.61616 |
| 30 | −23.04083 | 0.950 | 1.58913 | 61.13 | 0.54067 |
| 31 | 33.63593 | 2.693 | | | |
| 32 | −43.53615 | 1.050 | 1.80100 | 34.97 | 0.58642 |
| 33 | 62.25169 | 3.752 | | | |
| 34 | 51.53927 | 6.921 | 1.80000 | 29.84 | 0.60178 |
| 35 | −39.86271 | 3.848 | | | |
| 36 | 50.27571 | 7.368 | 1.48749 | 70.24 | 0.53007 |
| 37 | −26.02866 | 1.310 | 1.80518 | 25.42 | 0.61616 |
| 38 | −69.72800 | 3.069 | | | |
| 39 | −30.18711 | 1.310 | 1.91082 | 35.25 | 0.58224 |
| 40 | −51.30966 | 26.063 | | | |
| 41 | ∞ | 2.850 | 1.51633 | 64.14 | 0.53531 |
| 42 | ∞ | | | | |

TABLE 2

Example 1 - Specifications (d-line)

| | Wide-Angle End | Middle | Telephoto End |
|---|---|---|---|
| Zoom Magnification | 1.0 | 1.8 | 2.6 |
| f | 51.517 | 92.224 | 135.968 |
| Bf | 29.940 | 29.940 | 29.940 |
| FNo. | 2.88 | 2.89 | 2.88 |
| 2ω[°] | 30.4 | 17.0 | 11.6 |

TABLE 3

Example 1 - Distances with respect to Zoom

| | Wide-Angle End | Middle | Telephoto End |
|---|---|---|---|
| DD[7] | 1.647 | 24.961 | 34.686 |
| DD[15] | 11.849 | 7.355 | 2.477 |
| DD[20] | 32.001 | 13.182 | 8.334 |

FIG. 10 shows aberration diagrams of the zoom lens of Example 1. The aberration diagrams shown at the top of FIG. 10 are those of spherical aberration, offense against the sine condition, astigmatism, distortion, and lateral chromatic aberration at the wide-angle end in this order from the left side, the aberration diagrams shown at the middle of FIG. 10 are those of spherical aberration, offense against the sine condition, astigmatism, distortion, and lateral chromatic aberration at the middle position in this order from the left side, and the aberration diagrams shown at the bottom of FIG. 10 are those of spherical aberration, offense against the sine condition, astigmatism, distortion, and lateral chromatic aberration at the telephoto end in this order from the left side. The aberration diagrams of spherical aberration, offense against the sine condition, astigmatism, and distortion show those with respect to the d-line (the wavelength of 587.6 nm), which is used as a reference wavelength. The aberration diagrams of spherical aberration show those with respect to the d-line (the wavelength of 587.6 nm), the C-line (the wavelength of 656.3 nm), the F-line (the wavelength of 486.1 nm), and the g-line (the wavelength of 435.8 nm) in the solid line, the long dashed line, the short dashed line, and the gray line, respectively. The aberration diagrams of astigmatism show those in the sagittal direction and the tangential direction in the solid line and the short dashed line, respectively. The aberration diagrams of lateral chromatic aberration show those with respect to the C-line (the wavelength of 656.3 nm), the F-line (the wavelength of 486.1 nm), and the g-line (the wavelength of 435.8 nm) in the long dashed line, the short dashed line, and the gray line, respectively. It should be noted that these longitudinal aberration diagrams show aberrations when the zoom lens is focused on an object at infinity. The symbol "FNo." in the aberration diagrams of spherical aberration and offense against the sine condition means "F-number", and the symbol "ω" in the other aberration diagrams means "half angle of view".

FIG. 19 shows lateral aberration diagrams of the zoom lens of Example 1 without image stabilization. FIG. 19 shows, in order from the top, lateral aberration diagrams at the wide-angle end, at the middle position, and at the telephoto end. Among the lateral aberration diagrams shown in two columns, the lateral aberration diagrams on the left show those with respect to the tangential direction, and the lateral aberration diagrams on the right show those with respect to the sagittal direction. Among the lateral aberration diagrams, one at the top shows aberrations at the center of the image plane, two at the middle show aberrations at the position where the image height is 80% of the maximum image height on the positive (+) side, and two at the bottom show aberrations at the position where the image height is 80% of the maximum image height on the negative (−) side. FIG. 20 shows lateral aberration diagrams of the zoom lens of Example 1 with image stabilization. The contents of the aberration diagrams are similar to those without image stabilization. It should be noted that, in FIGS. 19 and 20, aberrations with respect to the d-line (the wavelength of 587.6 nm), the C-line (the wavelength of 656.3 nm), the F-line (the wavelength of 486.1=), and the g-line (the wavelength of 435.8 nm) are shown in the solid line, the long dashed line, the short dashed line, and the gray line, respectively. These lateral aberration diagrams show lateral aberrations when the zoom lens is focused on an object at infinity. The symbol "ω" in the aberration diagrams means "half angle of view".

The above-described symbols, meanings and manners of description of the various data of Example 1 apply also to the examples described below, unless otherwise noted, and the same explanations are not repeated in the following description.

Next, a zoom lens of Example 2 is described. The zoom lens of Example 2 has a lens group configuration similar to that of the zoom lens of Example 1. FIG. 2 is a sectional view illustrating the lens configuration of the zoom lens of Example 2. Table 4 shows basic lens data of the zoom lens of Example 2, Table 5 shows data about specifications of the zoom lens, Table 6 shows data about distances between surfaces to be moved of the zoom lens, FIG. 11 shows aberration diagrams of the zoom lens, FIG. 21 shows lateral aberration diagrams of the zoom lens without image stabilization, and FIG. 22 shows lateral aberration diagrams of the zoom lens with image stabilization.

TABLE 4

Example 2 - Lens Data

| Surface No. | Radius of Curvature | Surface Distance | nd | vd | θgF |
|---|---|---|---|---|---|
| 1 | 147.14684 | 2.312 | 1.90366 | 31.31 | 0.59481 |
| 2 | 71.34579 | 6.799 | 1.49700 | 81.54 | 0.53748 |
| 3 | 4466.14983 | 0.262 | | | |
| 4 | 82.92060 | 4.599 | 1.45562 | 91.31 | 0.53429 |
| 5 | 222.61947 | 0.209 | | | |
| 6 | 72.46651 | 7.001 | 1.48749 | 70.24 | 0.53007 |
| 7 | 2229.87611 | DD[7] | | | |
| 8 | 83.14047 | 6.305 | 1.64769 | 33.79 | 0.59393 |
| 9 | −54.99973 | 1.501 | 1.61772 | 49.81 | 0.56035 |
| 10 | 22.65737 | 6.228 | | | |
| 11 | −129.46710 | 1.009 | 1.53775 | 74.70 | 0.53936 |
| 12 | 23.41440 | 5.501 | 1.84661 | 23.88 | 0.62072 |
| 13 | 90.28797 | 3.246 | | | |
| 14 | −32.56444 | 0.999 | 1.91082 | 35.25 | 0.58224 |
| 15 | −754.10763 | DD[15] | | | |
| 16 | −139.28102 | 3.100 | 1.91082 | 35.25 | 0.58224 |
| 17 | −37.20322 | 0.100 | | | |
| 18 | 45.57357 | 5.511 | 1.48749 | 70.24 | 0.53007 |
| 19 | −45.00113 | 1.100 | 1.80518 | 25.42 | 0.61616 |
| 20 | 302.73331 | DD[20] | | | |
| 21 (stop) | ∞ | 1.300 | | | |
| 22 | 29.00638 | 5.564 | 1.53775 | 74.70 | 0.53936 |
| 23 | −83.12098 | 0.182 | | | |
| 24 | 28.22418 | 2.499 | 1.65412 | 39.68 | 0.57378 |
| 25 | 48.84185 | 1.900 | | | |
| 26 | −76.98887 | 1.210 | 1.90366 | 31.31 | 0.59481 |
| 27 | 20.91613 | 7.501 | 1.53775 | 74.70 | 0.53936 |
| 28 | −71.39743 | 3.663 | | | |
| 29 | 101.15891 | 4.706 | 1.80518 | 25.42 | 0.61616 |
| 30 | −24.63022 | 0.882 | 1.60300 | 65.44 | 0.54022 |
| 31 | 26.11599 | 3.199 | | | |
| 32 | −41.59530 | 0.899 | 1.80100 | 34.97 | 0.58642 |
| 33 | 49.70954 | 2.255 | | | |
| 34 | 43.72156 | 5.600 | 1.80000 | 29.84 | 0.60178 |
| 35 | −36.00246 | 2.992 | | | |
| 36 | 36.16338 | 5.708 | 1.48749 | 70.24 | 0.53007 |
| 37 | −25.22381 | 1.199 | 1.80518 | 25.42 | 0.61616 |
| 38 | −148.78795 | 4.102 | | | |
| 39 | −27.60609 | 1.199 | 1.91082 | 35.25 | 0.58224 |
| 40 | −43.25152 | 23.562 | | | |
| 41 | ∞ | 2.850 | 1.51633 | 64.14 | 0.53531 |
| 42 | ∞ | | | | |

TABLE 5

Example 2 - Specifications (d-line)

| | Wide-Angle End | Middle | Telephoto End |
|---|---|---|---|
| Zoom Magnification | 1.0 | 1.8 | 2.6 |
| f | 51.492 | 92.178 | 135.901 |
| Bf | 27.440 | 27.440 | 27.440 |
| FNo. | 2.89 | 2.89 | 2.89 |
| 2ω[°] | 30.2 | 17.0 | 11.6 |

TABLE 6

Example 2 - Distances with respect to Zoom

|  | Wide-Angle End | Middle | Telephoto End |
|---|---|---|---|
| DD[7] | 1.199 | 24.644 | 34.908 |
| DD[15] | 12.356 | 7.391 | 1.751 |
| DD[20] | 31.802 | 13.322 | 8.698 |

Next, a zoom lens of Example 3 is described. The zoom lens of Example 3 has a lens group configuration similar to that of the zoom lens of Example 1. FIG. 3 is a sectional view illustrating the lens configuration of the zoom lens of Example 3. Table 7 shows basic lens data of the zoom lens of Example 3, Table 8 shows data about specifications of the zoom lens, Table 9 shows data about distances between surfaces to be moved of the zoom lens, FIG. 12 shows aberration diagrams of the zoom lens, FIG. 23 shows lateral aberration diagrams of the zoom lens without image stabilization, and FIG. 24 shows lateral aberration diagrams of the zoom lens with image stabilization.

TABLE 7

Example 3 - Lens Data

| Surface No. | Radius of Curvature | Surface Distance | nd | vd | θgF |
|---|---|---|---|---|---|
| 1 | 263.09263 | 2.312 | 1.88100 | 40.14 | 0.57010 |
| 2 | 65.86876 | 7.199 | 1.49700 | 81.54 | 0.53748 |
| 3 | −571.64100 | 0.262 | | | |
| 4 | 65.97392 | 6.200 | 1.45562 | 91.31 | 0.53429 |
| 5 | 1175.27258 | 0.209 | | | |
| 6 | 81.36467 | 5.500 | 1.53775 | 74.70 | 0.53936 |
| 7 | 614.16494 | DD[7] | | | |
| 8 | 120.18724 | 5.912 | 1.72047 | 34.71 | 0.58350 |
| 9 | −42.77946 | 1.200 | 1.62230 | 53.17 | 0.55424 |
| 10 | 26.30170 | 5.468 | | | |
| 11 | −3031.67199 | 1.009 | 1.43875 | 94.94 | 0.53433 |
| 12 | 24.69032 | 4.403 | 1.84661 | 23.88 | 0.62072 |
| 13 | 52.10852 | 4.001 | | | |
| 14 | −29.01944 | 0.999 | 1.88300 | 40.76 | 0.56679 |
| 15 | 677.75184 | DD[15] | | | |
| 16 | −624.58221 | 3.099 | 1.91082 | 35.25 | 0.58224 |
| 17 | −48.99609 | 0.100 | | | |
| 18 | 84.61141 | 4.859 | 1.62041 | 60.29 | 0.54266 |
| 19 | −45.52887 | 1.100 | 1.84666 | 23.78 | 0.62054 |
| 20 | −11814.82817 | DD[20] | | | |
| 21 (stop) | ∞ | 1.300 | | | |
| 22 | 28.94841 | 7.001 | 1.49700 | 81.54 | 0.53748 |
| 23 | −70.94964 | 2.298 | | | |
| 24 | 35.48837 | 2.499 | 1.65412 | 39.68 | 0.57378 |
| 25 | 125.19811 | 1.799 | | | |
| 26 | −55.44889 | 1.210 | 1.90366 | 31.31 | 0.59481 |
| 27 | 24.47948 | 7.501 | 1.49700 | 81.54 | 0.53748 |
| 28 | −71.45146 | 2.001 | | | |
| 29 | 93.11345 | 4.160 | 1.80518 | 25.42 | 0.61616 |
| 30 | −26.87211 | 0.849 | 1.58313 | 59.37 | 0.54345 |
| 31 | 26.83474 | 3.501 | | | |
| 32 | −31.98401 | 0.901 | 1.80100 | 34.97 | 0.58642 |
| 33 | 64.79704 | 2.718 | | | |
| 34 | 52.34160 | 5.499 | 1.80000 | 29.84 | 0.60178 |
| 35 | −36.46191 | 4.001 | | | |
| 36 | 56.45949 | 7.310 | 1.48749 | 70.24 | 0.53007 |
| 37 | −23.44294 | 1.199 | 1.80518 | 25.42 | 0.61616 |
| 38 | −60.82914 | 2.999 | | | |
| 39 | −26.37941 | 1.199 | 1.91082 | 35.25 | 0.58224 |
| 40 | −35.96318 | 22.238 | | | |
| 41 | ∞ | 2.850 | 1.51633 | 64.14 | 0.53531 |
| 42 | ∞ | | | | |

TABLE 8

Example 3 - Specifications (d-line)

|  | Wide-Angle End | Middle | Telephoto End |
|---|---|---|---|
| Zoom Magnification | 1.0 | 1.8 | 3.1 |
| f | 50.359 | 90.150 | 157.119 |
| Bf | 26.122 | 26.122 | 26.122 |
| FNo. | 2.89 | 2.90 | 2.92 |
| 2ω[°] | 31.0 | 17.2 | 10.0 |

TABLE 9

Example 3 - Distances with respect to Zoom

|  | Wide-Angle End | Middle | Telephoto End |
|---|---|---|---|
| DD[7] | 1.199 | 24.327 | 37.203 |
| DD[15] | 16.502 | 10.829 | 1.100 |
| DD[20] | 32.001 | 14.546 | 11.399 |

Next, a zoom lens of Example 4 is described. The zoom lens of Example 4 has a lens group configuration similar to that of the zoom lens of Example 1. FIG. 4 is a sectional view illustrating the lens configuration of the zoom lens of Example 4. Table 10 shows basic lens data of the zoom lens of Example 4, Table 11 shows data about specifications of the zoom lens, Table 12 shows data about distances between surfaces to be moved of the zoom lens, FIG. 13 shows aberration diagrams of the zoom lens, FIG. 25 shows lateral aberration diagrams of the zoom lens without image stabilization, and FIG. 36 shows lateral aberration diagrams of the zoom lens with image stabilization.

TABLE 10

Example 4 - Lens Data

| Surface No. | Radius of Curvature | Surface Distance | nd | vd | θgF |
|---|---|---|---|---|---|
| 1 | 188.13090 | 2.312 | 1.80610 | 33.27 | 0.58845 |
| 2 | 76.50883 | 7.200 | 1.49700 | 81.54 | 0.53748 |
| 3 | −3204.67292 | 0.262 | | | |
| 4 | 71.91851 | 6.200 | 1.43875 | 94.94 | 0.53433 |
| 5 | 718.81472 | 0.209 | | | |
| 6 | 63.83157 | 5.500 | 1.43875 | 94.94 | 0.53433 |
| 7 | 286.11890 | DD[7] | | | |
| 8 | 127.11673 | 5.510 | 1.72047 | 34.71 | 0.58350 |
| 9 | −52.90722 | 1.200 | 1.62230 | 53.17 | 0.55424 |
| 10 | 24.99227 | 6.501 | | | |
| 11 | −273.45110 | 1.511 | 1.59522 | 67.74 | 0.54426 |
| 12 | 26.07897 | 5.501 | 1.84661 | 23.88 | 0.62072 |
| 13 | 90.43692 | 4.000 | | | |
| 14 | −28.20939 | 1.001 | 1.88300 | 40.76 | 0.56679 |
| 15 | −219.42843 | DD[15] | | | |
| 16 | 4368.42118 | 3.099 | 1.91082 | 35.25 | 0.58224 |
| 17 | −45.70178 | 0.100 | | | |
| 18 | 75.53670 | 5.511 | 1.49700 | 81.54 | 0.53748 |
| 19 | −37.32451 | 1.100 | 1.80518 | 25.42 | 0.61616 |
| 20 | −582.89400 | DD[20] | | | |
| 21 (stop) | ∞ | 1.300 | | | |
| 22 | 31.57617 | 7.001 | 1.49700 | 81.54 | 0.53748 |
| 23 | −84.25408 | 1.501 | | | |
| 24 | 32.66369 | 2.500 | 1.65412 | 39.68 | 0.57378 |
| 25 | 452.11337 | 1.799 | | | |
| 26 | −77.71874 | 1.210 | 1.90366 | 31.31 | 0.59481 |
| 27 | 23.15115 | 5.500 | 1.49700 | 81.54 | 0.53748 |
| 28 | −93.31207 | 2.001 | | | |
| 29 | 664.84163 | 4.161 | 1.80518 | 25.42 | 0.61616 |
| 30 | −28.96139 | 1.201 | 1.58313 | 59.37 | 0.54345 |
| 31 | 23.87736 | 3.200 | | | |
| 32 | −37.84433 | 0.899 | 1.80100 | 34.97 | 0.58642 |
| 33 | 66.37072 | 2.215 | | | |

TABLE 10-continued

Example 4 - Lens Data

| Surface No. | Radius of Curvature | Surface Distance | nd | vd | θgF |
|---|---|---|---|---|---|
| 34 | 45.41616 | 8.001 | 1.80518 | 25.42 | 0.61616 |
| 35 | −36.36637 | 1.453 | | | |
| 36 | 44.07982 | 7.310 | 1.48749 | 70.24 | 0.53007 |
| 37 | −23.31946 | 1.200 | 1.80518 | 25.42 | 0.61616 |
| 38 | −147.09849 | 2.999 | | | |
| 39 | −27.43891 | 1.200 | 1.91082 | 35.25 | 0.58224 |
| 40 | −35.75126 | 22.213 | | | |
| 41 | ∞ | 2.850 | 1.51633 | 64.14 | 0.53531 |
| 42 | ∞ | | | | |

TABLE 11

Example 4 - Specifications (d-line)

| | Wide-Angle End | Middle | Telephoto End |
|---|---|---|---|
| Zoom Magnification | 1.0 | 1.8 | 3.0 |
| f′ | 51.153 | 91.572 | 154.995 |
| Bf′ | 26.096 | 26.096 | 26.096 |
| FNo. | 2.89 | 2.89 | 2.89 |
| 2ω[°] | 30.6 | 17.2 | 10.2 |

TABLE 12

Example 4 - Distances with respect to Zoom

| | Wide-Angle End | Middle | Telephoto End |
|---|---|---|---|
| DD[7] | 1.199 | 22.851 | 34.047 |
| DD[15] | 17.079 | 11.080 | 1.673 |
| DD[20] | 28.994 | 13.341 | 11.552 |

Next, a zoom lens of Example 5 is described. The zoom lens of Example 5 has a lens group configuration similar to that of the zoom lens of Example 1. FIG. 5 is a sectional view illustrating the lens configuration of the zoom lens of Example 5. Table 13 shows basic lens data of the zoom lens of Example 5, Table 14 shows data about specifications of the zoom lens, Table 15 shows data about distances between surfaces to be moved of the zoom lens, FIG. 14 shows aberration diagrams of the zoom lens, FIG. 27 shows lateral aberration diagrams of the zoom lens without image stabilization, and FIG. 28 shows lateral aberration diagrams of the zoom lens with image stabilization.

TABLE 13

Example 5 - Lens Data

| Surface No. | Radius of Curvature | Surface Distance | nd | vd | θgF |
|---|---|---|---|---|---|
| 1 | 379.59503 | 2.390 | 1.80100 | 34.97 | 0.58642 |
| 2 | 87.06343 | 7.850 | 1.49700 | 81.54 | 0.53748 |
| 3 | −423.40525 | 0.200 | | | |
| 4 | 77.08956 | 6.600 | 1.43875 | 94.94 | 0.53433 |
| 5 | 505.15031 | 0.200 | | | |
| 6 | 74.14509 | 4.950 | 1.49700 | 81.54 | 0.53748 |
| 7 | 428.65265 | DD[7] | | | |
| 8 | 95.00168 | 5.710 | 1.72047 | 34.71 | 0.58350 |
| 9 | −42.18184 | 1.550 | 1.62230 | 53.17 | 0.55424 |
| 10 | 25.82252 | 4.852 | | | |
| 11 | −127.50772 | 1.260 | 1.49700 | 81.54 | 0.53748 |
| 12 | 27.56506 | 4.000 | 1.84661 | 23.88 | 0.62072 |
| 13 | 102.12490 | 3.395 | | | |
| 14 | −31.04306 | 1.250 | 1.91082 | 35.25 | 0.58224 |
| 15 | 593.08219 | DD[15] | | | |
| 16 | −587.37289 | 2.950 | 1.80100 | 34.97 | 0.58642 |
| 17 | −43.88242 | 0.100 | | | |
| 18 | 78.12881 | 4.310 | 1.61800 | 63.33 | 0.54414 |
| 19 | −42.34007 | 1.150 | 1.80518 | 25.42 | 0.61616 |
| 20 | ∞ | DD[20] | | | |
| 21 (stop) | ∞ | 1.300 | | | |
| 22 | 27.72433 | 6.373 | 1.49700 | 81.54 | 0.53748 |
| 23 | −59.65321 | 0.150 | | | |
| 24 | 34.01198 | 2.550 | 1.65412 | 39.68 | 0.57378 |
| 25 | 93.88248 | 1.610 | | | |
| 26 | −54.41210 | 1.210 | 1.90366 | 31.31 | 0.59481 |
| 27 | 23.35543 | 5.569 | 1.49700 | 81.54 | 0.53748 |
| 28 | −77.98799 | 2.500 | | | |
| 29 | 394.61491 | 3.771 | 1.80518 | 25.42 | 0.61616 |
| 30 | −24.49939 | 0.950 | 1.58913 | 61.13 | 0.54067 |
| 31 | 37.65964 | 2.511 | | | |
| 32 | −48.39346 | 1.050 | 1.80100 | 34.97 | 0.58642 |
| 33 | 60.29812 | 4.948 | | | |
| 34 | 52.39389 | 5.299 | 1.80000 | 29.84 | 0.60178 |
| 35 | −39.28541 | 3.134 | | | |
| 36 | 53.75550 | 7.501 | 1.48749 | 70.24 | 0.53007 |
| 37 | −26.62926 | 1.310 | 1.80518 | 25.42 | 0.61616 |
| 38 | −98.73317 | 6.921 | | | |
| 39 | −26.89205 | 1.310 | 1.91082 | 35.25 | 0.58224 |
| 40 | −46.99846 | 18.856 | | | |
| 41 | ∞ | 2.850 | 1.51633 | 64.14 | 0.53531 |
| 42 | ∞ | | | | |

TABLE 14

Example 5 - Specifications (d-line)

| | Wide-Angle End | Middle | Telephoto End |
|---|---|---|---|
| Zoom Magnification | 1.0 | 1.8 | 2.4 |
| f′ | 51.515 | 92.219 | 125.696 |
| Bf′ | 22.736 | 22.736 | 22.736 |
| FNo. | 2.88 | 2.89 | 2.88 |
| 2ω[°] | 30.4 | 17.0 | 12.4 |

TABLE 15

Example 5 - Distances with respect to Zoom

| | Wide-Angle End | Middle | Telephoto End |
|---|---|---|---|
| DD[7] | 1.199 | 26.087 | 34.640 |
| DD[15] | 13.697 | 7.573 | 2.495 |
| DD[20] | 32.001 | 13.236 | 9.762 |

Next, a zoom lens of Example 6 is described. The zoom lens of Example 6 has a lens group configuration similar to that of the zoom lens of Example 1. FIG. 6 is a sectional view illustrating the lens configuration of the zoom lens of Example 6. Table 16 shows basic lens data of the zoom lens of Example 6, Table 17 shows data about specifications of the zoom lens, Table 18 shows data about distances between surfaces to be moved of the zoom lens, FIG. 15 shows aberration diagrams of the zoom lens, FIG. 29 shows lateral aberration diagrams of the zoom lens without image stabilization, and FIG. 30 shows lateral aberration diagrams of the zoom lens with image stabilization.

TABLE 16

Example 6 - Lens Data

| Surface No. | Radius of Curvature | Surface Distance | nd | vd | θgF |
|---|---|---|---|---|---|
| 1 | 358.57195 | 2.320 | 1.80100 | 34.97 | 0.58642 |
| 2 | 85.09780 | 7.200 | 1.49700 | 81.54 | 0.53748 |
| 3 | −386.19076 | 0.200 | | | |
| 4 | 72.25745 | 6.972 | 1.43875 | 94.94 | 0.53433 |
| 5 | ∞ | 0.200 | | | |
| 6 | 69.93587 | 5.200 | 1.49700 | 81.54 | 0.53748 |
| 7 | 235.70554 | DD[7] | | | |
| 8 | 96.21157 | 6.291 | 1.72047 | 34.71 | 0.58350 |
| 9 | −43.59489 | 1.530 | 1.62230 | 53.17 | 0.55424 |
| 10 | 24.59706 | 5.600 | | | |
| 11 | −73.29120 | 1.410 | 1.49700 | 81.54 | 0.53748 |
| 12 | 27.09637 | 4.000 | 1.84661 | 23.88 | 0.62072 |
| 13 | 123.98633 | 2.799 | | | |
| 14 | −30.96977 | 1.200 | 1.91082 | 35.25 | 0.58224 |
| 15 | 353.74684 | DD[15] | | | |
| 16 | −406.80952 | 2.850 | 1.80100 | 34.97 | 0.58642 |
| 17 | −43.60631 | 0.100 | | | |
| 18 | 74.86402 | 4.260 | 1.61800 | 63.33 | 0.54414 |
| 19 | −43.68363 | 1.170 | 1.80518 | 25.42 | 0.61616 |
| 20 | ∞ | DD[20] | | | |
| 21 (stop) | ∞ | 1.300 | | | |
| 22 | 28.04424 | 7.050 | 1.49700 | 81.54 | 0.53748 |
| 23 | −59.60296 | 0.150 | | | |
| 24 | 34.77250 | 2.570 | 1.65412 | 39.68 | 0.57378 |
| 25 | 89.21437 | 1.800 | | | |
| 26 | −51.39895 | 1.110 | 1.90366 | 31.31 | 0.59481 |
| 27 | 24.25217 | 5.266 | 1.49700 | 81.54 | 0.53748 |
| 28 | −60.88125 | 2.800 | | | |
| 29 | 733.80887 | 3.771 | 1.80518 | 25.42 | 0.61616 |
| 30 | −23.29690 | 0.950 | 1.58913 | 61.13 | 0.54067 |
| 31 | 39.10301 | 2.801 | | | |
| 32 | −39.71546 | 1.000 | 1.80100 | 34.97 | 0.58642 |
| 33 | 62.34880 | 4.199 | | | |
| 34 | 54.23606 | 5.285 | 1.80000 | 29.84 | 0.60178 |
| 35 | −37.12789 | 4.367 | | | |
| 36 | 51.75623 | 6.461 | 1.48749 | 70.24 | 0.53007 |
| 37 | −25.77385 | 1.310 | 1.80518 | 25.42 | 0.61616 |
| 38 | −86.83396 | 4.400 | | | |
| 39 | −27.43970 | 1.260 | 1.91082 | 35.25 | 0.58224 |
| 40 | −40.98080 | 25.514 | | | |
| 41 | ∞ | 2.850 | 1.51633 | 64.14 | 0.53531 |
| 42 | ∞ | | | | |

TABLE 17

Example 6 - Specifications (d-line)

| | Wide-Angle End | Middle | Telephoto End |
|---|---|---|---|
| Zoom Magnification | 1.0 | 1.8 | 2.6 |
| f | 51.516 | 92.222 | 135.965 |
| Bf | 29.393 | 29.393 | 29.393 |
| FNo. | 2.88 | 2.89 | 2.88 |
| 2ω[°] | 30.6 | 17.0 | 11.6 |

TABLE 18

Example 6 - Distances with respect to Zoom

| | Wide-Angle End | Middle | Telephoto End |
|---|---|---|---|
| DD[7] | 1.191 | 22.931 | 32.107 |
| DD[15] | 14.409 | 8.821 | 2.687 |
| DD[20] | 29.090 | 12.939 | 9.896 |

Next, a zoom lens of Example 7 is described. The zoom lens of Example 7 has a five-group configuration which consists of, in order from the object side, a first lens group G1 having a positive refractive power, a second lens group G2 having a negative refractive power, a third lens group G3 having a negative refractive power, a fourth lens group G4 (the mp lens group) having a positive refractive power, and a fifth lens group G5 (the rearmost lens group) having a positive refractive power. FIG. 7 is a sectional view illustrating the lens configuration of the zoom lens of Example 7. Table 19 shows basic lens data of the zoom lens of Example 7, Table 20 shows data about specifications of the zoom lens, Table 21 shows data about distances between surfaces to be moved of the zoom lens, FIG. 16 shows aberration diagrams of the zoom lens, FIG. 31 shows lateral aberration diagrams of the zoom lens without image stabilization, and FIG. 32 shows lateral aberration diagrams of the zoom lens with image stabilization.

TABLE 19

Example 7 - Lens Data

| Surface No. | Radius of Curvature | Surface Distance | nd | vd | θgF |
|---|---|---|---|---|---|
| 1 | 303.47850 | 2.390 | 1.80100 | 34.97 | 0.58642 |
| 2 | 75.71759 | 7.850 | 1.49700 | 81.54 | 0.53748 |
| 3 | −338.62836 | 0.200 | | | |
| 4 | 67.27723 | 6.600 | 1.43875 | 94.94 | 0.53433 |
| 5 | 706.55071 | 0.200 | | | |
| 6 | 67.16666 | 4.950 | 1.49700 | 81.54 | 0.53748 |
| 7 | 287.46150 | DD[7] | | | |
| 8 | 98.18370 | 5.710 | 1.72047 | 34.71 | 0.58350 |
| 9 | −49.05401 | 1.550 | 1.62230 | 53.17 | 0.55424 |
| 10 | 24.62771 | DD[10] | | | |
| 11 | −75.51985 | 1.260 | 1.49700 | 81.54 | 0.53748 |
| 12 | 25.58057 | 5.388 | 1.84661 | 23.88 | 0.62072 |
| 13 | 106.72525 | 3.704 | | | |
| 14 | −31.24101 | 1.250 | 1.91082 | 35.25 | 0.58224 |
| 15 | 268.03486 | DD[15] | | | |
| 16 | −521.95122 | 2.950 | 1.80100 | 34.97 | 0.58642 |
| 17 | −44.70833 | 0.100 | | | |
| 18 | 73.37158 | 4.310 | 1.61800 | 63.33 | 0.54414 |
| 19 | −43.22381 | 1.150 | 1.80518 | 25.42 | 0.61616 |
| 20 | ∞ | DD[20] | | | |
| 21 (stop) | ∞ | 1.300 | | | |
| 22 | 27.81729 | 6.868 | 1.49700 | 81.54 | 0.53748 |
| 23 | −57.84476 | 0.150 | | | |
| 24 | 34.09999 | 2.550 | 1.65412 | 39.68 | 0.57378 |
| 25 | 102.68991 | 1.610 | | | |
| 26 | −54.83237 | 1.210 | 1.90366 | 31.31 | 0.59481 |
| 27 | 23.14151 | 5.662 | 1.49700 | 81.54 | 0.53748 |
| 28 | −87.93105 | 2.500 | | | |
| 29 | 372.91281 | 3.771 | 1.80518 | 25.42 | 0.61616 |
| 30 | −24.31863 | 0.950 | 1.58913 | 61.13 | 0.54067 |
| 31 | 36.29877 | 3.256 | | | |
| 32 | −44.08151 | 1.050 | 1.80100 | 34.97 | 0.58642 |
| 33 | 60.80519 | 3.831 | | | |
| 34 | 50.53032 | 5.748 | 1.80000 | 29.84 | 0.60178 |
| 35 | −39.43779 | 4.000 | | | |
| 36 | 48.86127 | 8.012 | 1.48749 | 70.24 | 0.53007 |
| 37 | −26.40743 | 1.310 | 1.80518 | 25.42 | 0.61616 |
| 38 | −86.68447 | 3.157 | | | |
| 39 | −27.70770 | 1.310 | 1.91082 | 35.25 | 0.58224 |
| 40 | −44.10429 | 24.901 | | | |
| 41 | ∞ | 2.850 | 1.51633 | 64.14 | 0.53531 |
| 42 | ∞ | | | | |

TABLE 20

Example 7 - Specifications (d-line)

| | Wide-Angle End | Middle | Telephoto End |
|---|---|---|---|
| Zoom Magnification | 1.0 | 1.8 | 2.6 |
| f | 51.514 | 92.218 | 135.960 |
| Bf | 28.781 | 28.781 | 28.781 |
| FNo. | 2.88 | 2.89 | 2.88 |
| 2ω[°] | 30.4 | 17.0 | 11.6 |

TABLE 21

Example 7 - Distances with respect to Zoom

|  | Wide-Angle End | Middle | Telephoto End |
|---|---|---|---|
| DD[7] | 1.199 | 20.933 | 29.242 |
| DD[10] | 6.235 | 6.638 | 6.783 |
| DD[15] | 14.153 | 8.593 | 2.488 |
| DD[20] | 26.710 | 12.132 | 9.785 |

Next, a zoom lens of Example 8 is described. The zoom lens of Example 8 has a lens group configuration similar to that of the zoom lens of Example 7. FIG. 8 is a sectional view illustrating the lens configuration of the zoom lens of Example 8. Table 22 shows basic lens data of the zoom lens of Example 8, Table 23 shows data about specifications of the zoom lens, Table 24 shows data about distances between surfaces to be moved of the zoom lens, FIG. 17 shows aberration diagrams of the zoom lens, FIG. 33 shows lateral aberration diagrams of the zoom lens without image stabilization, and FIG. 34 shows lateral aberration diagrams of the zoom lens with image stabilization.

TABLE 22

Example 8 - Lens Data

| Surface No. | Radius of Curvature | Surface Distance | nd | vd | θgF |
|---|---|---|---|---|---|
| 1 | 257.91881 | 2.390 | 1.83400 | 37.16 | 0.57759 |
| 2 | 73.18612 | 7.850 | 1.49700 | 81.54 | 0.53748 |
| 3 | −329.42308 | 0.200 | | | |
| 4 | 62.30117 | 6.600 | 1.43700 | 95.10 | 0.53364 |
| 5 | 849.43043 | 0.200 | | | |
| 6 | 72.87230 | 4.950 | 1.49700 | 81.54 | 0.53748 |
| 7 | 263.78540 | DD[7] | | | |
| 8 | 107.78333 | 5.710 | 1.72047 | 34.71 | 0.58350 |
| 9 | −47.76821 | 1.550 | 1.62230 | 53.17 | 0.55424 |
| 10 | 25.18309 | 5.631 | | | |
| 11 | −93.23488 | 1.260 | 1.49700 | 81.54 | 0.53748 |
| 12 | 26.34063 | 3.999 | 1.84661 | 23.88 | 0.62072 |
| 13 | 99.67576 | DD[13] | | | |
| 14 | −31.09640 | 1.250 | 1.91082 | 35.25 | 0.58224 |
| 15 | 318.83279 | DD[15] | | | |
| 16 | −974.57258 | 2.950 | 1.80100 | 34.97 | 0.58642 |
| 17 | −43.76266 | 0.100 | | | |
| 18 | 65.14269 | 4.310 | 1.53775 | 74.70 | 0.53936 |
| 19 | −49.97731 | 1.150 | 1.80518 | 25.42 | 0.61616 |
| 20 | ∞ | DD[20] | | | |
| 21 (stop) | ∞ | 1.300 | | | |
| 22 | 28.69392 | 7.001 | 1.49700 | 81.54 | 0.53748 |
| 23 | −59.87797 | 0.150 | | | |
| 24 | 34.09590 | 2.550 | 1.65412 | 39.68 | 0.57378 |
| 25 | 85.63948 | 1.610 | | | |
| 26 | −54.93056 | 1.210 | 1.90366 | 31.31 | 0.59481 |
| 27 | 24.95033 | 6.359 | 1.49700 | 81.54 | 0.53748 |
| 28 | −76.31225 | 2.500 | | | |
| 29 | 141.63653 | 3.771 | 1.80518 | 25.42 | 0.61616 |
| 30 | −23.83965 | 0.950 | 1.58913 | 61.13 | 0.54067 |
| 31 | 30.73799 | 2.499 | | | |
| 32 | −37.50492 | 1.050 | 1.80100 | 34.97 | 0.58642 |
| 33 | 53.05759 | 2.617 | | | |
| 34 | 55.65453 | 6.802 | 1.83400 | 37.16 | 0.57759 |
| 35 | −41.09507 | 4.001 | | | |
| 36 | 52.54294 | 6.611 | 1.48749 | 70.24 | 0.53007 |
| 37 | −38.16059 | 1.310 | 1.80518 | 25.42 | 0.61616 |
| 38 | −57.00236 | 3.270 | | | |
| 39 | −28.19030 | 1.310 | 1.91082 | 35.25 | 0.58224 |
| 40 | −47.93144 | 28.451 | | | |
| 41 | ∞ | 2.850 | 1.51633 | 64.14 | 0.53531 |
| 42 | ∞ | | | | |

TABLE 23

Example 8 - Specifications (d-line)

|  | Wide-Angle End | Middle | Telephoto End |
|---|---|---|---|
| Zoom Magnification | 1.0 | 1.8 | 2.6 |
| f′ | 51.526 | 92.240 | 135.992 |
| Bf′ | 32.332 | 32.332 | 32.332 |
| FNo. | 2.88 | 2.89 | 2.88 |
| 2ω[°] | 30.4 | 17.0 | 11.6 |

TABLE 24

Example 8 - Distances with respect to Zoom

|  | Wide-Angle End | Middle | Telephoto End |
|---|---|---|---|
| DD[7] | 1.199 | 21.287 | 29.769 |
| DD[13] | 4.000 | 4.585 | 4.348 |
| DD[15] | 14.542 | 8.794 | 2.472 |
| DD[20] | 26.846 | 11.921 | 9.998 |

Next, a zoom lens of Example 9 is described. The zoom lens of Example 9 has a lens group configuration similar to that of the zoom lens of Example 1. FIG. 9 is a sectional view illustrating the lens configuration of the zoom lens of Example 9. Table 25 shows basic lens data of the zoom lens of Example 9, Table 26 shows data about specifications of the zoom lens, Table 27 shows data about distances between surfaces to be moved of the zoom lens, FIG. 18 shows aberration diagrams of the zoom lens, FIG. 35 shows lateral aberration diagrams of the zoom lens without image stabilization, and FIG. 36 shows lateral aberration diagrams of the zoom lens with image stabilization.

TABLE 25

Example 9 - Lens Data

| Surface No. | Radius of Curvature | Surface Distance | nd | vd | θgF |
|---|---|---|---|---|---|
| 1 | 180.37474 | 2.390 | 1.80100 | 34.97 | 0.58642 |
| 2 | 69.14868 | 7.850 | 1.49700 | 81.54 | 0.53748 |
| 3 | −481.66507 | 0.200 | | | |
| 4 | 60.15068 | 7.500 | 1.43875 | 94.94 | 0.53433 |
| 5 | 1142.76498 | 0.200 | | | |
| 6 | 76.86117 | 4.500 | 1.49700 | 81.54 | 0.53748 |
| 7 | 187.53228 | DD[7] | | | |
| 8 | 111.60159 | 5.710 | 1.72047 | 34.71 | 0.58350 |
| 9 | −39.89381 | 1.550 | 1.62230 | 53.17 | 0.55424 |
| 10 | 24.07077 | 4.980 | | | |
| 11 | −64.75230 | 1.260 | 1.49700 | 81.54 | 0.53748 |
| 12 | 24.25512 | 5.408 | 1.84661 | 23.88 | 0.62072 |
| 13 | 94.37171 | 2.799 | | | |
| 14 | −28.39083 | 1.250 | 1.91082 | 35.25 | 0.58224 |
| 15 | 193.35819 | DD[15] | | | |
| 16 | −2763.02905 | 2.950 | 1.80100 | 34.97 | 0.58642 |
| 17 | −42.42344 | 0.100 | | | |
| 18 | 118.96564 | 4.310 | 1.59282 | 68.62 | 0.54414 |
| 19 | −37.94715 | 1.150 | 1.84666 | 23.78 | 0.62054 |
| 20 | −229.69252 | 7.412 | | | |
| 21 | 389.16162 | 2.200 | 1.68893 | 31.07 | 0.60041 |
| 22 | −215.34129 | DD[22] | | | |
| 23 (stop) | ∞ | 1.300 | | | |
| 24 | 27.53581 | 7.001 | 1.49700 | 81.54 | 0.53748 |
| 25 | −57.95147 | 0.150 | | | |
| 26 | 36.50795 | 2.550 | 1.65412 | 39.68 | 0.57378 |
| 27 | 105.69164 | 1.610 | | | |
| 28 | −54.28866 | 1.210 | 1.90366 | 31.31 | 0.59481 |
| 29 | 22.84035 | 6.968 | 1.49700 | 81.54 | 0.53748 |
| 30 | −80.66013 | 2.500 | | | |
| 31 | 381.31349 | 3.771 | 1.80518 | 25.42 | 0.61616 |
| 32 | −25.25989 | 0.950 | 1.58913 | 61.13 | 0.54067 |

TABLE 25-continued

Example 9 - Lens Data

| Surface No. | Radius of Curvature | Surface Distance | nd | vd | θgF |
|---|---|---|---|---|---|
| 33 | 39.74943 | 3.501 | | | |
| 34 | −39.07424 | 1.050 | 1.80100 | 34.97 | 0.58642 |
| 35 | 67.59646 | 4.073 | | | |
| 36 | 53.40416 | 5.837 | 1.80000 | 29.84 | 0.60178 |
| 37 | −38.04851 | 4.001 | | | |
| 38 | 47.49724 | 6.893 | 1.48749 | 70.24 | 0.53007 |
| 39 | −27.13146 | 1.310 | 1.80518 | 25.42 | 0.61616 |
| 40 | −85.37597 | 3.001 | | | |
| 41 | −29.19153 | 1.310 | 1.91082 | 35.25 | 0.58224 |
| 42 | −47.66122 | 25.665 | | | |
| 43 | ∞ | 2.850 | 1.51633 | 64.14 | 0.53531 |
| 44 | ∞ | | | | |

TABLE 26

Example 9 - Specifications (d-line)

| | Wide-Angle End | Middle | Telephoto End |
|---|---|---|---|
| Zoom Magnification | 1.0 | 1.8 | 2.6 |
| f | 51.511 | 92.212 | 135.951 |
| Bf | 29.545 | 29.545 | 29.545 |
| FNo. | 2.88 | 2.89 | 2.88 |
| 2ω[°] | 30.6 | 17.0 | 11.6 |

TABLE 27

Example 9 - Distances with respect to Zoom

| | Wide-Angle End | Middle | Telephoto End |
|---|---|---|---|
| DD[7] | 1.697 | 21.960 | 30.401 |
| DD[15] | 10.593 | 6.211 | 1.452 |
| DD[22] | 21.360 | 5.480 | 1.796 |

Table 28 shows values corresponding to the condition expressions (1) to (7) of the zoom lenses of Examples 1 to 9. In all the examples, the d-line is used as a reference wavelength, and the values shown in Table 28 below are with respect to the reference wavelength.

TABLE 28

| No. | Condition Expression | Example 1 | Example 2 | Example 3 | Example 4 | Example 5 |
|---|---|---|---|---|---|---|
| (1) | FGr3/FGr | 0.276 | 0.271 | 0.257 | 0.369 | 0.448 |
| (2) | FGr1/FGr3 | 2.446 | 2.355 | 2.408 | 1.963 | 2.253 |
| (3) | FGr1/FGr | 0.676 | 0.639 | 0.619 | 0.724 | 1.010 |
| (4) | FGr1/Ft | 0.504 | 0.430 | 0.402 | 0.331 | 0.518 |
| (5) | FGr3/Ft | 0.206 | 0.183 | 0.167 | 0.169 | 0.230 |
| (6) | BF/Ft | 0.220 | 0.202 | 0.166 | 0.169 | 0.181 |
| (7) | TL/Ft | 1.388 | 1.362 | 1.207 | 1.208 | 1.450 |

| No. | Condition Expression | Example 6 | Example 7 | Example 8 | Example 9 |
|---|---|---|---|---|---|
| (1) | FGr3/FGr | 0.428 | 0.435 | 0.398 | 0.420 |
| (2) | FGr1/FGr3 | 2.286 | 2.311 | 2.550 | 2.446 |
| (3) | FGr1/FGr | 0.978 | 1.006 | 1.015 | 1.027 |
| (4) | FGr1/Ft | 0.468 | 0.475 | 0.487 | 0.503 |
| (5) | FGr3/Ft | 0.205 | 0.205 | 0.191 | 0.206 |
| (6) | BF/Ft | 0.216 | 0.212 | 0.238 | 0.217 |
| (7) | TL/Ft | 1.362 | 1.360 | 1.367 | 1.367 |

As can be seen from the above-described data, each of the zoom lenses of Examples 1 to 9 satisfies the condition expressions (1) to (7), and is a telephoto zoom lens having an angle of view of about 10 to 13 degrees at the telephoto end, a zoom ratio of about 2.4 to 3.1, and a large aperture with a maximum aperture of about F2.8 across the entire zoom range, and having high optical performance with high sensitivity to the image stabilizing lens group and suppressed variation of aberrations during image stabilization.

Figure 37:
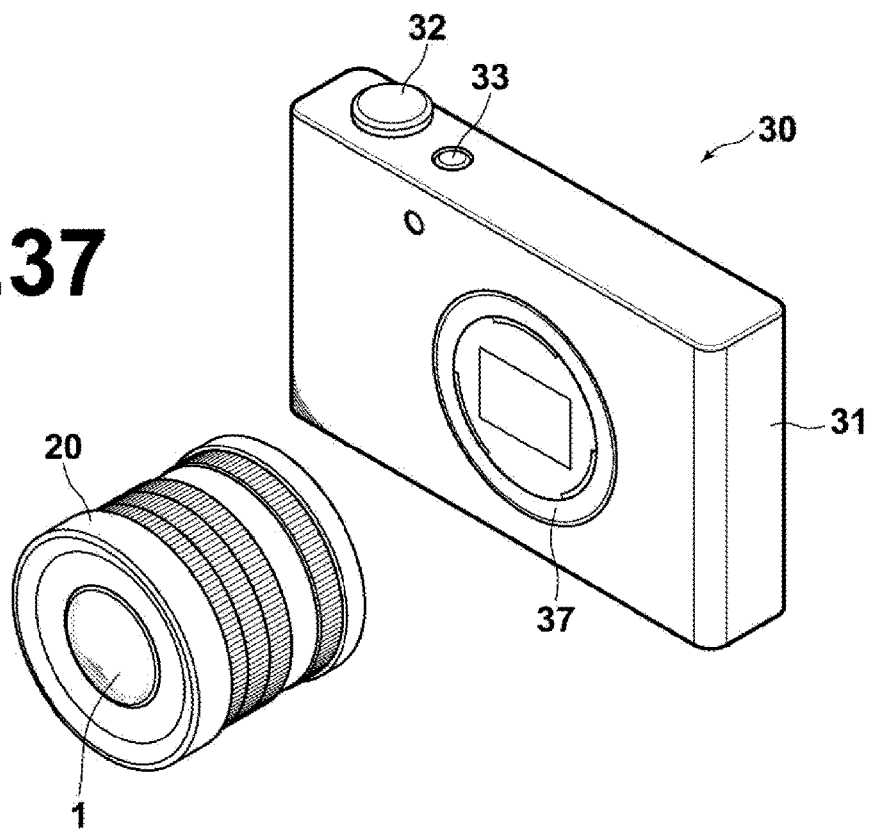
FIG. 37 is a perspective view showing the front side of an imaging apparatus according to one embodiment of the invention.
Figure 38:
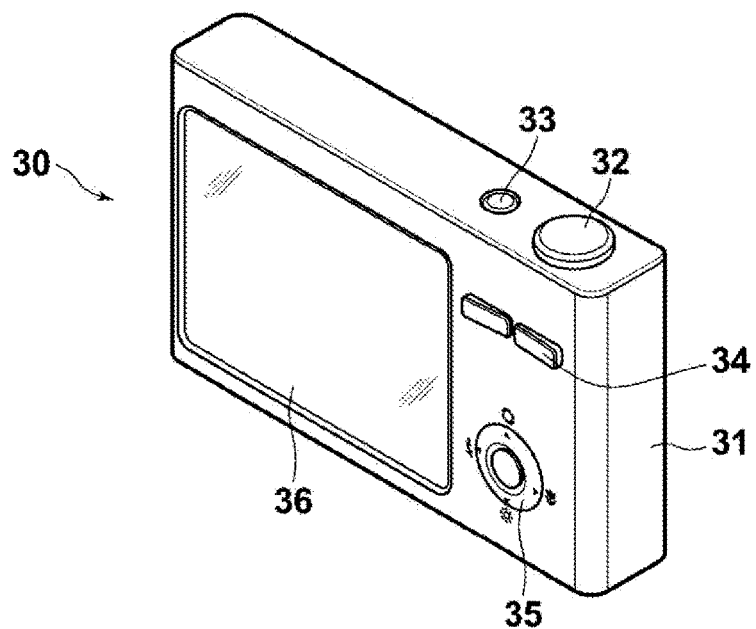
FIG. 38 is a perspective view showing the rear side of the imaging apparatus shown in FIG. 37.

Next, one embodiment of an imaging apparatus according to the invention is described with reference to FIGS. 37 and 38. FIGS. 37 and 38 are perspective views showing the front side and the rear side, respectively, of a camera 30. The camera 30 is a non-reflex digital camera, to which a replaceable lens 20 formed by a zoom lens 1 according to the embodiment of the invention housed in a lens barrel is removably mounted.

The camera 30 includes a camera body 31, and a shutter button 32 and a power button 33 are disposed on the top side of the camera body 31. On the rear side of the camera body 31, operation sections 34 and 35, and a display section 36 are disposed. The display section 36 displays a taken image, and an image within the angle of view before an imaging operation is performed.

At the center of the front side of the camera body 31, an imaging aperture, through which light from the subject enters, is formed, and a mount 37 is disposed at the position corresponding to the imaging aperture. The replaceable lens 20 is mounted on the camera body 31 via the mount 37.

In the camera body 31, an image sensor (not shown), such as a CCD, for receiving an image of the subject formed by the replaceable lens 20 and outputting an image signal according to the image of the subject, a signal processing circuit for processing the image signal outputted from the image sensor to generate an image, a recording medium for recording the generated image, etc., are disposed. With this camera 30, a still image or a moving image can be taken when the shutter button 32 is pressed, and the image data obtained by the imaging operation is recorded in the recording medium.

The camera 30 of this embodiment, which is provided with the zoom lens 1 of the invention, can achieve a high image stabilization effect, and allows obtaining high quality images.

The present invention has been described with reference to the embodiments and the examples. However, the invention is not limited to the above-described embodiments and examples, and various modifications may be made to the invention. For example, the values of the radius of curvature, the surface distance, the refractive index, the Abbe number, the aspheric coefficients, etc., of each lens are not limited to the values shown in the above-described examples and may take different values.

While the embodiment of the imaging apparatus is described and shown in the drawings as a non-reflex (so-called mirrorless) digital camera as an example, this is not intended to limit the imaging apparatus of the invention. For example, the invention is also applicable to imaging apparatuses, such as video cameras, digital cameras, motion picture cameras, and broadcasting cameras.

What is claimed is:

1. A zoom lens consisting of four or five lens groups as a whole, which consist of, in order from an object side, a first lens group which has a positive refractive power and is fixed relative to an image plane during magnification change, a second lens group which has a negative refractive power and is moved during magnification change, one or two middle lens groups comprising a mp lens group which has a positive refractive power and is moved during magnification change, and a rearmost lens group which is disposed at the most image-side position of the entire system, has a positive refractive power and is fixed relative to the image plane during magnification change,
wherein magnification change is effected by changing all distances between the adjacent lens groups,
the rearmost lens group consists of, in order from the object side, a front group having a positive refractive power, an image stabilizing group having a negative refractive power, and a rear group having a positive refractive power,
air spaces between the front group and the image stabilizing group, and between the image stabilizing group and the rear group are constant during magnification change and during focusing,
the front group comprises at least two positive lenses and at least one negative lens,
the most object-side lens surface of the rear group is a convex surface, and the rear group comprises a negative lens disposed at the most image-side position thereof, and a cemented lens disposed on the object side of the negative lens,
the rear group comprises, in order from the object side, a positive single lens, a cemented lens formed by one positive lens and one negative lens which are cemented together, and a single lens having a negative meniscus shape with the concave surface toward the object side,
image stabilization is effected by shifting only the image stabilizing group in directions perpendicular to the optical axis direction, and
the condition expressions (1) and (2) below are satisfied:

$$0.20 < FGr3/FGr < 0.45 \qquad (1), \text{and}$$

$$1.75 < FGr1/FGr3 < 3.00 \qquad (2),$$

where FGr3 is a focal length of the rear group of the rearmost lens group, FGr is a focal length of the rearmost lens group, and FGr1 is a focal length of the front group of the rearmost lens group.

2. The zoom lens as claimed in claim 1, wherein the rear group comprises, at the most image-side position thereof, a single lens having a negative meniscus shape with the concave surface toward the object side.

3. The zoom lens as claimed in claim 1, wherein the rear group comprises a cemented lens formed by one positive lens and one negative lens which are cemented together.

4. The zoom lens as claimed in claim 1, wherein the front group consists of three positive lenses and one negative lens.

5. The zoom lens as claimed in claim 1, wherein the image stabilizing group consists of two negative lenses and one positive lens.

6. The zoom lens as claimed in claim 1, wherein the first lens group consists of, in order from the object side, a negative lens, a positive lens, a positive lens, and a positive lens.

7. The zoom lens as claimed in claim 1, wherein focusing from an object at infinity to a closest object is effected by moving only the entire mp lens group or only a part of lenses forming the mp lens group along the optical axis.

8. The zoom lens as claimed in claim 1, wherein the condition expression (3) below is satisfied:

$$0.5 < FGr1/FGr < 1.3 \qquad (3).$$

9. The zoom lens as claimed in claim 1, wherein the condition expression (4) below is satisfied:

$$0.25 < FGr1/Ft < 0.60 \qquad (4),$$

where Ft is a focal length of the entire system when the zoom lens is focused on an object at infinity at the telephoto end.

10. The zoom lens as claimed in claim 1, wherein the condition expression (5) below is satisfied:

$$0.12 < FGr3/Ft < 0.27 \qquad (5),$$

where Ft is a focal length of the entire system when the zoom lens is focused on an object at infinity at the telephoto end.

11. The zoom lens as claimed in claim 1, wherein the condition expression (6) below is satisfied:

$$0.12 < BF/Ft < 0.28 \qquad (6),$$

where BF is an equivalent air distance from the rearmost lens group to the image plane, and Ft is a focal length of the entire system when the zoom lens is focused on an object at infinity at the telephoto end.

12. The zoom lens as claimed in claim 1, wherein the condition expression (7) below is satisfied:

$$1.1 < TL/Ft < 1.6 \qquad (7),$$

where TL is an entire length of the optical system, and Ft is a focal length of the entire system when the zoom lens is focused on an object at infinity at the telephoto end.

13. The zoom lens as claimed in claim 1, consisting of four lens groups which consist of, in order from the object side, the first lens group, the second lens group, the mp lens group, and the rearmost lens group.

14. An imaging apparatus comprising the zoom lens as claimed in claim 1.

15. A zoom lens consisting of four or five lens groups as a whole, which consist of, in order from an object side, a first lens group which has a positive refractive power and is fixed relative to an image plane during magnification change, a second lens group which has a negative refractive power and is moved during magnification change, one or two middle lens groups comprising a mp lens group which has a positive refractive power and is moved during magnification change, and a rearmost lens group which is disposed at the most image-side position of the entire system, has a positive refractive power and is fixed relative to the image plane during magnification change,
wherein magnification change is effected by changing all distances between the adjacent lens groups,
the rearmost lens group consists of, in order from the object side, a front group having a positive refractive power, an image stabilizing group having a negative refractive power, and a rear group having a positive refractive power,
air spaces between the front group and the image stabilizing group, and between the image stabilizing group and the rear group are constant during magnification change and during focusing,
the front group comprises at least two positive lenses,
image stabilization is effected by shifting only the image stabilizing group in directions perpendicular to the optical axis direction,
the rear group comprises a negative lens at the most image-side position thereof,
the most object-side lens surface of the rear group is a convex surface, and the rear group comprises a negative lens disposed at the most image-side position thereof, and a cemented lens disposed on the object side of the negative lens,
the rear group comprises, in order from the object side, a positive single lens, a cemented lens formed by one positive lens and one negative lens which are cemented together, and a single lens having a negative meniscus shape with the concave surface toward the object side, and the condition expressions (1) and (2) below are satisfied:

$$0.20 < FGr3/FGr < 0.45 \qquad (1), \text{ and}$$

$$1.75 < FGr1/FGr3 < 3.00 \qquad (2),$$

where FGr3 is a focal length of the rear group of the rearmost lens group, FGr is a focal length of the rearmost lens group, and FGr1 is a focal length of the front group of the rearmost lens group.

16. An imaging apparatus comprising the zoom lens as claimed in claim 15.

* * * * *